United States Patent
Singh et al.

(10) Patent No.: US 11,674,376 B2
(45) Date of Patent: Jun. 13, 2023

(54) WELLBORE TO FRACTURE CONNECTIVITY

(71) Applicant: CHEVRON U.S.A. INC., San Ramon, CA (US)

(72) Inventors: Amit Kumar Singh, Sugarland, TX (US); Xinghui Liu, Houston, TX (US); Jiehao Wang, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 17/089,613

(22) Filed: Nov. 4, 2020

(65) Prior Publication Data

US 2021/0131250 A1    May 6, 2021

Related U.S. Application Data

(60) Provisional application No. 62/930,055, filed on Nov. 4, 2019.

(51) Int. Cl.
| | |
|---|---|
| *E21B 33/13* | (2006.01) |
| *E21B 47/003* | (2012.01) |
| *E21B 43/267* | (2006.01) |
| *G06F 30/28* | (2020.01) |
| *G06N 3/08* | (2023.01) |

(Continued)

(52) U.S. Cl.
CPC ............ *E21B 47/003* (2020.05); *E21B 33/13* (2013.01); *E21B 43/14* (2013.01); *E21B 43/26* (2013.01); *E21B 43/261* (2013.01); *E21B 43/267* (2013.01); *E21B 49/006* (2013.01); *E21B 49/08* (2013.01); *G06F 30/27* (2020.01); *G06F 30/28* (2020.01); *G06N 3/08* (2013.01);

(Continued)

(58) Field of Classification Search
CPC .............................. E21B 33/13; E21B 43/261
USPC ...................................................... 166/250.1
See application file for complete search history.

(56) References Cited

U.S. PATENT DOCUMENTS

| | | |
|---|---|---|
| 6,795,773 B2 | 9/2004 | Soliman |
| 8,200,465 B2 | 6/2012 | Suarez-Rivera |

(Continued)

FOREIGN PATENT DOCUMENTS

| | | |
|---|---|---|
| CN | 107237616 A | 10/2017 |
| CN | 107506840 A | 12/2017 |

(Continued)

OTHER PUBLICATIONS

Ahmad, Faraj, et al.; "Experimental Investigation of Proppant Placement in Multiple Perforation Clusters for Horizontal Fracturing Applications"; URTeC: 5298, Jul. 2021, pp. 1-19.

(Continued)

*Primary Examiner* — Zakiya W Bates
*Assistant Examiner* — Ashish K Varma
(74) *Attorney, Agent, or Firm* — Ana C. Jaquez

(57) ABSTRACT

One embodiment of a wellbore to fracture connectivity apparatus comprises an opening portion representing an opening in a wellbore for receiving fluid, proppant, or any combination thereof to generate at least one fracture in a formation; a fracture portion representing the at least one fracture in the formation; and a coupling portion representing wellbore to fracture connectivity between the opening portion and the fracture portion. The coupling portion couples the opening portion and the fracture portion.

20 Claims, 74 Drawing Sheets

(51) Int. Cl.
| | |
|---|---|
| *G06F 30/27* | (2020.01) |
| *E21B 43/26* | (2006.01) |
| *E21B 49/08* | (2006.01) |
| *E21B 43/14* | (2006.01) |
| *E21B 49/00* | (2006.01) |
| *G06N 7/01* | (2023.01) |
| *G06F 113/08* | (2020.01) |
| *E21B 43/116* | (2006.01) |

(52) U.S. Cl.
CPC ............. *G06N 7/01* (2023.01); *E21B 43/116* (2013.01); *E21B 2200/20* (2020.05); *G06F 2113/08* (2020.01)

(56) References Cited

U.S. PATENT DOCUMENTS

| | | | |
|---|---|---|---|
| 8,532,969 | B2 | 9/2013 | Li |
| 9,212,538 | B2 | 12/2015 | Shetty |
| 9,297,250 | B2 | 3/2016 | Dusterhoft |
| 9,664,024 | B2* | 5/2017 | Baski ................... E21B 43/26 |
| 10,584,555 | B2* | 3/2020 | Leonardi ............... E21B 43/261 |
| 10,611,952 | B2* | 4/2020 | Savitski .................... C09K 8/40 |
| 2012/0325462 | A1* | 12/2012 | Roussel ................ E21B 43/26 166/250.1 |
| 2016/0003020 | A1* | 1/2016 | Sharma ................. E21B 43/267 166/308.1 |
| 2018/0149000 | A1 | 5/2018 | Roussel |
| 2021/0131249 | A1 | 5/2021 | Singh |
| 2021/0131261 | A1 | 5/2021 | Wang |

FOREIGN PATENT DOCUMENTS

| | | |
|---|---|---|
| CN | 106285598 B | 4/2019 |
| WO | 2018093374 A1 | 5/2018 |

OTHER PUBLICATIONS

Eckdahl, Rick, et al.; "Assessment of Limited Entry Cluster Distribution Effectiveness and Impactful Variables Using Perforation Erosion Measurements"; SPE-209122-MS, Feb. 2022, pp. 1-21.

Liu, Xinghui et al.; "Achieving Near-Uniform Fluid and Proppant Placement in Multistage Fractured Horizontal Wells: A Computational Fluid Dynamics Modeling Approach"; SPE 204182, Jun. 2021, pp. 926-945.

Liu, Xinghui et al.; "Achieving Perfect Fluid and Proppant Placement in Multi-Stage Fractured Horizontal Wells: A CFO Modeling Approach"; SPE-204182-MS, May 2021, pp. 1-26.

Wang, Jiehao, et al.; "Efficient Prediction of Proppant Placement Along a Horizontal Fracturing Stage for Perforation Design Optimization"; SPE 208613; Oct. 2021, pp. 1-15.

Almulhim, Abdulraof, et al.; "Field-Scale Computational Fluid Dynamics CFD Modeling of Proppant Transport and Distribution Within a Horizontal Hydraulic Fracturing Stage"; SPE-199727-MS, Feb. 6, 2020, pp. 1-22.

Bokane, Atul et al.; "Computational Fluid Dynamics (CFD) Study and Investigation of Proppant Transport and Distribution in Multistage Fractured Horizontal Wells"; SPE-165952, pp. 1-14.

Bokane, Atul, et al.; "Evaluation and Optimization of Proppant Distribution in Multistage Fractured Horizontal Wells: A Simulation Approach"; SPE-171581-MS, Sep.-Oct. 2014, pp. 1-22.

Singh, Amit, et al.; "Comparison of Multi-Stage Fracture Placement Methods for Economic Learning and Unconventional Completion Optimization: A Case History"; SPE-184839-MS, Jan. 2017, pp. 1-20.

Singh, Amit, et al.; "Integrated Economic Solutions to Maximize Productivity and EUR and UCR Multistage Hydraulic Fractured Wells"; IPTC-20192-MS, Jan. 2020, pp. 1-17.

Singh, Amit, et al.; "New Comprehensive Large Tortuous Slot Flow Testing for Unconventional Fracturing" SPE-201578-MS, Oct. 2020, pp. 1-19.

Sneddon, I.N., et al.;"The Distribution of Stress in the Neighborhood of a Crack in the Elastic Solid"; Proc. R. Soc. Lond. A 187, pp. 229-260, published on Oct. 22, 1946.

Wehunt, C. Dean, et al.; "More Bang for the Buck—Optimized Perforating Design and Unconventional Reservoirs" SPE-199730-MS, Feb. 2020, pp. 1-32.

Wu, Chu-Hsiang, et al.; "Effect of Perforation Geometry and Orientation on Proppant Placement in Perforation Clusters in a Horizontal Well"; SPE-179117-MS, Feb. 2016, pp. 1-23.

Wu, Chu-Hsiang, et al.; "Proppant Distribution Among Multiple Perforation Clusters in Horizontal Wellbore" SPE-184861-MS, Jan. 2017, pp. 1-17.

Yi, Sophie S., et al.; "Proppant Distribution Among Multiple Perforation Clusters in Plug-and-Perforate Stages"; SPE Production & Operations, Nov. 2018, pp. 654-665.

Yuan, Peng et al.; "Study of Proppant Erosion in Multistage Hydraulic Fracturing Using Computational Fluid Dynamics Modeling"; SPE-183819-MS, Mar. 2017, pp. 1-12.

Zhang, Jinlin, et al.; "Computational Fluid Dynamics (CFD) Modeling of Proppant Transport in A Plug and Perf Completion with Different Perforation Phasing"; SPE-178654-MS/URTeC:2169184, Jul. 2015, pp. 1-15.

* cited by examiner calculating a stress profile across a plurality of perforation clusters within a fracture stage of the wellbore 305 calculating a fracture pressure parameter for each perforation cluster of the plurality of perforation clusters within the fracture stage of the wellbore as a function of the stress profile across the plurality of perforation clusters within the fracture stage, a perforation friction that accounts for perforation hole erosion, a fracture net pressure, and a fracture closure pressure 310 determining a quantity of perforation clusters in the plurality of the perforation clusters within the fracture stage, a quantity of perforation holes for each perforation cluster of the plurality of perforation clusters within the fracture stage, a diameter of the perforation holes for each perforation cluster of the plurality of perforation clusters within the fracture stage, a spacing between each perforation cluster of the plurality of perforation clusters within the fracture stage, an injection distribution across the plurality of perforation clusters within the fracture stage, or any combination thereof, for the hydraulic fracture completion configuration based on the calculated fracture pressure parameters 315 determining a layout for the perforation holes of each perforation cluster of the plurality of perforation clusters within the fracture stage for the hydraulic fracture completion configuration and/or determining a layout for the perforation holes of each perforation cluster of at least one other fracture stage for the hydraulic fracture completion configuration. 320

FIG. 3

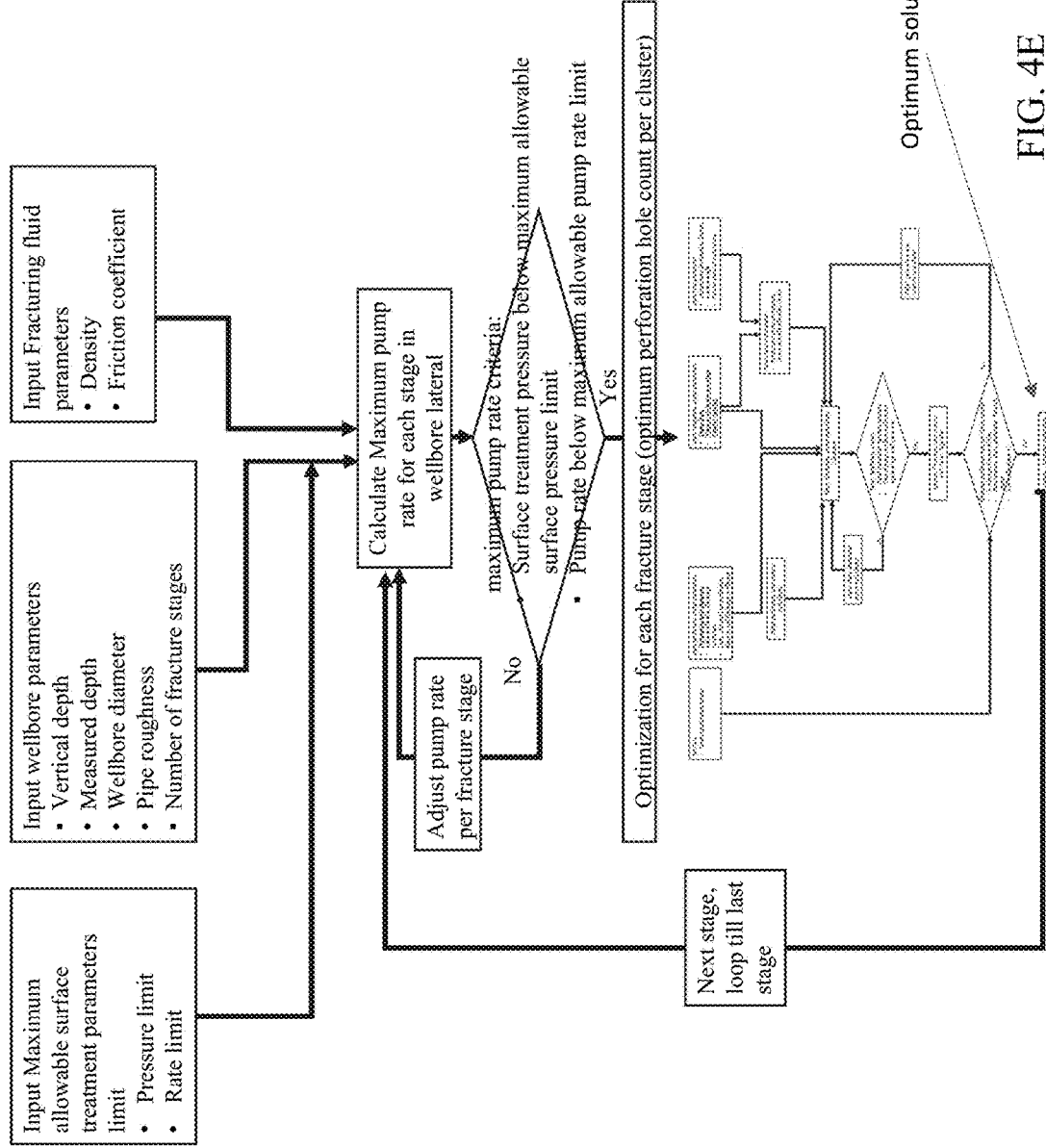

| Design Inputs | |
|---|---|
| Field and Well Name | |
| Number of Cluster Per Stage | 8 |
| Cluster Spacing (ft) | 25 |
| Pump Rate (bpm) | 90 |
| Fluid Density (ppg) | 8.4 |
| Estimated Hole Diameter (in) | 0.42 |
| Perforation Friction Target (psi) | 800 |
| Fracture Height (ft) | 300 |
| Net Pressure (psi) | 600 |
| Perforations Phased or In-Line | phased |
| Angle from the Top Side if In-Line (Degrees) | 110 |
| *Enter Stress Variation in Clusters* | |
| Are stress values available along the lateral? | No |
| If No, Enter Constant Closure Stress value here If Yes, Enter Closure Stress values at all clusters in Cells B22-U22 | 8000 |

| | Estimated Perforation Erosion Inputs | | |
|---|---|---|---|
| | Perforation Diameter (d) | Discharge Coefficient ($C_D$) | % of Job (by Volume) |
| Early Time | 0.420 | 0.7 | 40 |
| Mid Time | 0.441 | 0.75 | 30 |
| Late Time | 0.462 | 0.85 | 30 |

| | Calculated Perforation Erosion Inputs | | |
|---|---|---|---|
| | Perforation Diameter (d) | Discharge Coefficient ($C_D$) | % of Job (by Volume) |
| Early Time | 0.223 | 0.80 | 40 |
| Mid Time | 0.259 | 0.90 | 30 |
| Late Time | 0.277 | 0.90 | 30 |

Hole Size and Injection Rate Optimization

Input

| | |
|---|---|
| Minimum Rate Allowed (bpm) | 70 |
| Max Rate Allowed (bpm) | 110 |
| Minimum Hole Size (in) | 0.35 |
| Maximum Hole Size (in) | 0.45 |

Output

| | Heel | | | | | | | | | | | | Cluster 1 |
|---|---|---|---|---|---|---|---|---|---|---|---|---|---|
| | Cluster 12 | Cluster 11 | Cluster 10 | Cluster 9 | Cluster 8 | Cluster 7 | Cluster 6 | Cluster 5 | Cluster 4 | Cluster 3 | Cluster 2 | | |
| Hole Count | 2 | 3 | 3 | 3 | 3 | 3 | 3 | 3 | 3 | 3 | 3 | | 3 |

| | Early Time | Mid Time | Late Time | Job Average |
|---|---|---|---|---|
| Calculated Perf Friction (psi) | 1049 | 752 | 486 | 791 |
| Hole Diameter (in) | 0.40 | | | |
| Rate (bpm) | 90 | | | |

[Optimize Hole Count & Rate]  [Optimize Hole Count & Hole Size]

[Optimize Hole Count, Hole Size & Rate]  [View Graphical Output]

*For the modules "Optimize Hole Count & Hole Size" and "Optimize Hole Count, Hole Size and Rate", the results will be displayed in the Sheet "VSC Hole Size & Rate Optimizer" (which is hidden unless these modules are activated)*

FIG. 22

| Well Level Optimization | | |
|---|---|---|
| Input | | |
| Maximum Allowable Surface Pressure (psi) | 6000 | |
| TVD of Well (ft) | 10000 | |
| First Perf MD (ft) | 20000 | |
| Last Perf MD (ft) | 10000 | |
| Internal Diameter of Casing (in) | 4.99 | |
| Maximum Rate Allowed (bpm) | 95 | |
| Pipe Roughness (ft) | 0.0002 | |
| Near Wellbore Pressure Drop Estimate (psi) | 800 | |
| Number of Segments Along the Lateral | 4 | |

| Fluid Type | Slickwater |
|---|---|
| If Fluid Type is X-link, | |
| Rate (bpm) | Drop (psi / 1000ft) |
| 10 | 20 |
| 30 | 40 |
| 50 | 100 |
| 70 | 150 |
| 140 | 260 |

Design Along Lateral

FIG. 24

Sensitivity Runs On Input Data

| Input | | |
|---|---|---|
| Scenario (Up to 5) | Fracture Height (ft) | Net Pressure (psi) |
| 1 | 200 | 300 |
| 2 | 200 | 350 |
| 3 | 250 | 400 |
| 4 | 300 | 250 |
| 5 | 300 | 200 |

Run Sensitivity

FIG. 26 performing computational fluid dynamics modeling on at least a portion of a wellbore without any openings and a portion of the wellbore comprising at least one opening along a single azimuth to determine proppant efficiency for the at least one opening along the single azimuth while simulating flow of fluid, proppant, or any combination thereof through the wellbore, an equilibrium proppant concentration profile for the portion of the wellbore without any openings, and an equilibrium velocity profile for the portion of the wellbore without any opening 2905

determining proppant efficiency for at least one other opening of the wellbore at a different azimuth using the determined proppant efficiency for the at least one opening along the single azimuth, the determined equilibrium proppant concentration profile for the portion of the wellbore without any openings, and the determined equilibrium velocity profile for the portion of the wellbore without any openings 2910

generating a model that correlates the single azimuth, the determined proppant efficiency for the at least one opening along the single azimuth, and the determined proppant efficiency for the at least one other opening of the wellbore at the different azimuth 2915

using the model to determine proppant distribution for the plurality of clusters within the fracture stage of the wellbore 2920

using the model to determine the proppant distribution for the plurality of clusters within the fracture stage of the wellbore includes applying a multiplier to account for cluster spacing between the plurality of clusters within the fracture stage of the wellbore 2930 using the model to determine a second proppant distribution for a second plurality of clusters within a second fracture stage of the wellbore or a second wellbore 2925 determining the multiplier to account for the cluster spacing between the plurality of clusters within the fracture stage of the wellbore 2935

FIG. 29

A full stage with multiple perforation clusters

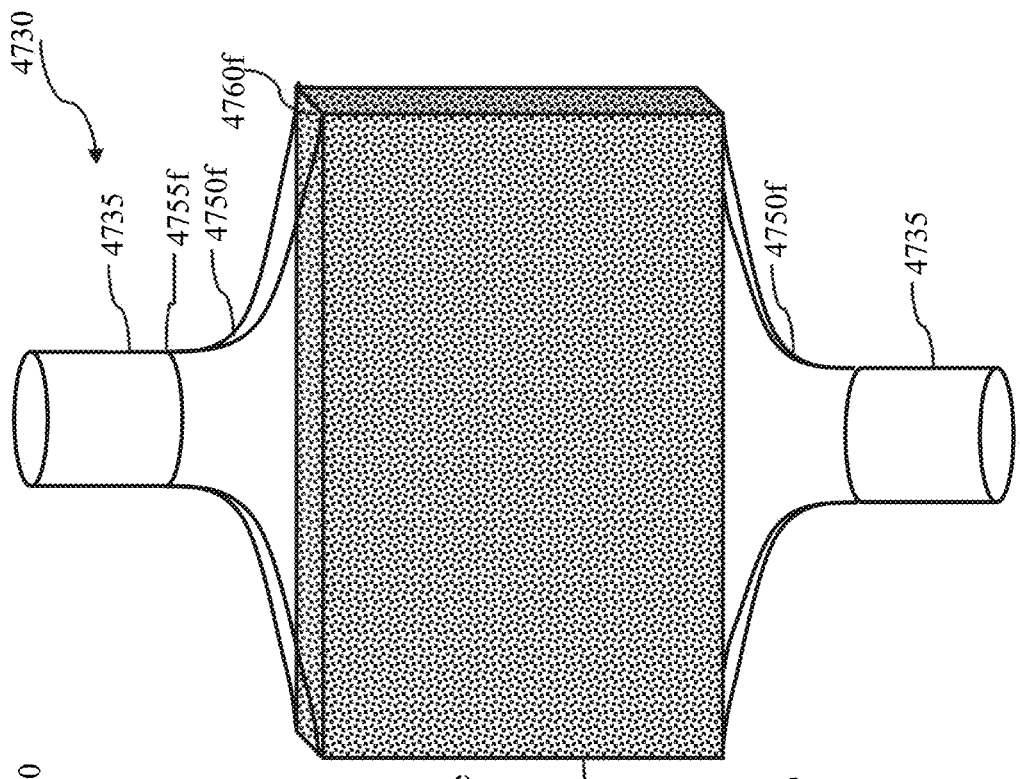
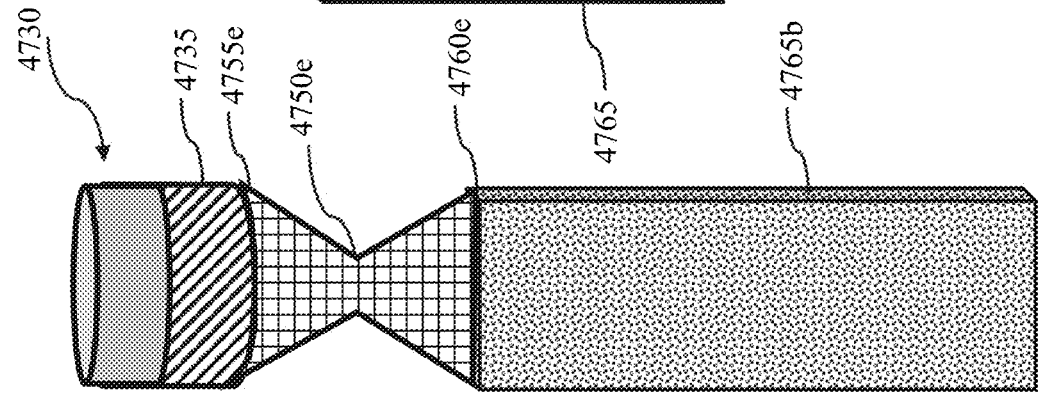
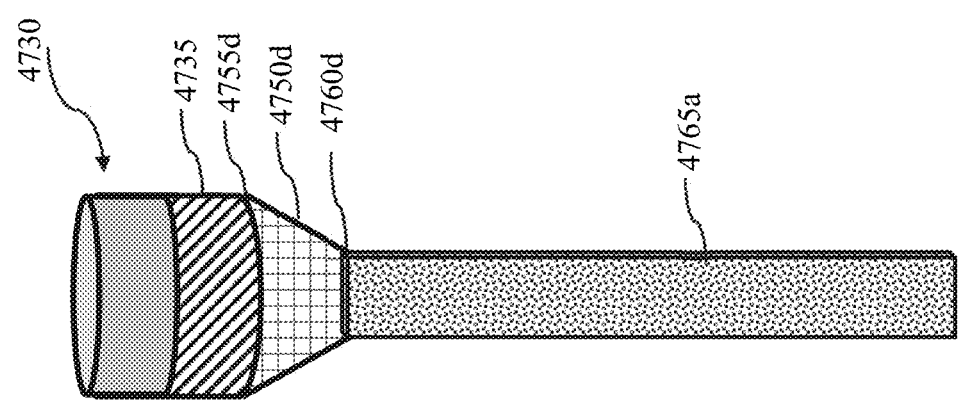
FIG. 47F
FIG. 47E
FIG. 47D

WELLBORE TO FRACTURE CONNECTIVITY

CROSS REFERENCES TO RELATED APPLICATIONS

This application claims the benefit of priority to U.S. Provisional Application No. 62/930,055, filed Nov. 4, 2019, which is incorporated by reference herein in its entirety.

STATEMENT REGARDING FEDERALLY SPONSORED RESEARCH OR DEVELOPMENT

Not applicable.

TECHNICAL FIELD

The present disclosure relates to hydraulic fracture completions.

BACKGROUND

The hydrocarbon industry recovers hydrocarbons that are trapped in subsurface reservoirs (also known as subsurface formations). The hydrocarbons can be recovered by drilling wellbores (also known as wells) into the reservoirs and the hydrocarbons are able to flow from the reservoirs into the wellbores and up to the surface. FIG. 1A illustrates one example with heterogenous or poor fluid distribution in each cluster creating non-equal fracture geometry. Moreover, multiple studies have shown that heel-ward bias of proppant and fluid occurs. Inefficient fracture placement results in understimulated reservoir, poor production and recovery, fracture hit and interference, and inefficient reservoir management. Efforts to overcome these challenges have been largely trial and error. Thus, there exists a need in the area hydraulic fracture completions.

SUMMARY

One embodiment of a wellbore to fracture connectivity apparatus comprises an opening portion representing an opening in a wellbore for receiving fluid, proppant, or any combination thereof to generate at least one fracture in a formation; a fracture portion representing the at least one fracture in the formation; and a coupling portion representing wellbore to fracture connectivity between the opening portion and the fracture portion. The coupling portion couples the opening portion and the fracture portion.

One embodiment of a system comprises a wellbore to fracture connectivity apparatus. The apparatus comprises an opening portion representing an opening in a wellbore for receiving fluid, proppant, or any combination thereof to generate at least one fracture in a formation; a fracture portion representing the at least one fracture in the formation; and a coupling portion representing wellbore to fracture connectivity between the opening portion and the fracture portion, wherein the coupling portion couples the opening portion and the fracture portion. The embodiment further comprises a wellbore portion coupled to the wellbore to fracture connectivity apparatus for providing the fluid, the proppant, or any combination thereof to the wellbore to fracture connectivity apparatus, wherein the wellbore portion represents the wellbore and the wellbore to fracture connectivity apparatus is coupled to an opening of the wellbore portion.

One embodiment of a process comprises providing a system. The system comprises a wellbore to fracture connectivity apparatus comprising: an opening portion representing an opening in a wellbore for receiving fluid, proppant, or any combination thereof to generate at least one fracture in a formation; a fracture portion representing the at least one fracture in the formation; and a coupling portion representing wellbore to fracture connectivity between the opening portion and the fracture portion, wherein the coupling portion couples the opening portion and the fracture portion. The embodiment further comprises (b) a wellbore portion coupled to the wellbore to fracture connectivity apparatus for providing the fluid, the proppant, or any combination thereof to the wellbore to fracture connectivity apparatus. The wellbore portion represents the wellbore and the wellbore to fracture connectivity apparatus is coupled to an opening of the wellbore portion. The embodiment further comprises injecting the fluid, the proppant, or any combination thereof through the wellbore portion and the wellbore to fracture connectivity apparatus; collecting and measuring the fluid, the proppant, or any combination thereof exiting the wellbore to fracture connectivity apparatus; and quantifying plugging of the wellbore to fracture connectivity apparatus using the measurements to generate plugging data for the wellbore to fracture connectivity apparatus.

DESCRIPTION OF THE DRAWINGS

FIG. 3 illustrates one embodiment of a method of determining a hydraulic fracture completion configuration for a wellbore that extends through a subterranean formation.

FIGS. 4A-4G illustrate various flowcharts of various embodiments of methods consistent with the principles of the present disclosure.

FIGS. 16-28 illustrate various screenshots and output that may be generated consistent with the instant disclosure.

FIG. 29 is a flowchart of one embodiment of determining proppant distribution for a plurality of clusters within a fracture stage of a wellbore.

FIG. 47D illustrates another embodiment of the wellbore to fracture connectivity apparatus.

FIG. 47E illustrates another embodiment of the wellbore to fracture connectivity apparatus.

FIG. 47F illustrates another embodiment of the wellbore to fracture connectivity apparatus.

Figure 1A:
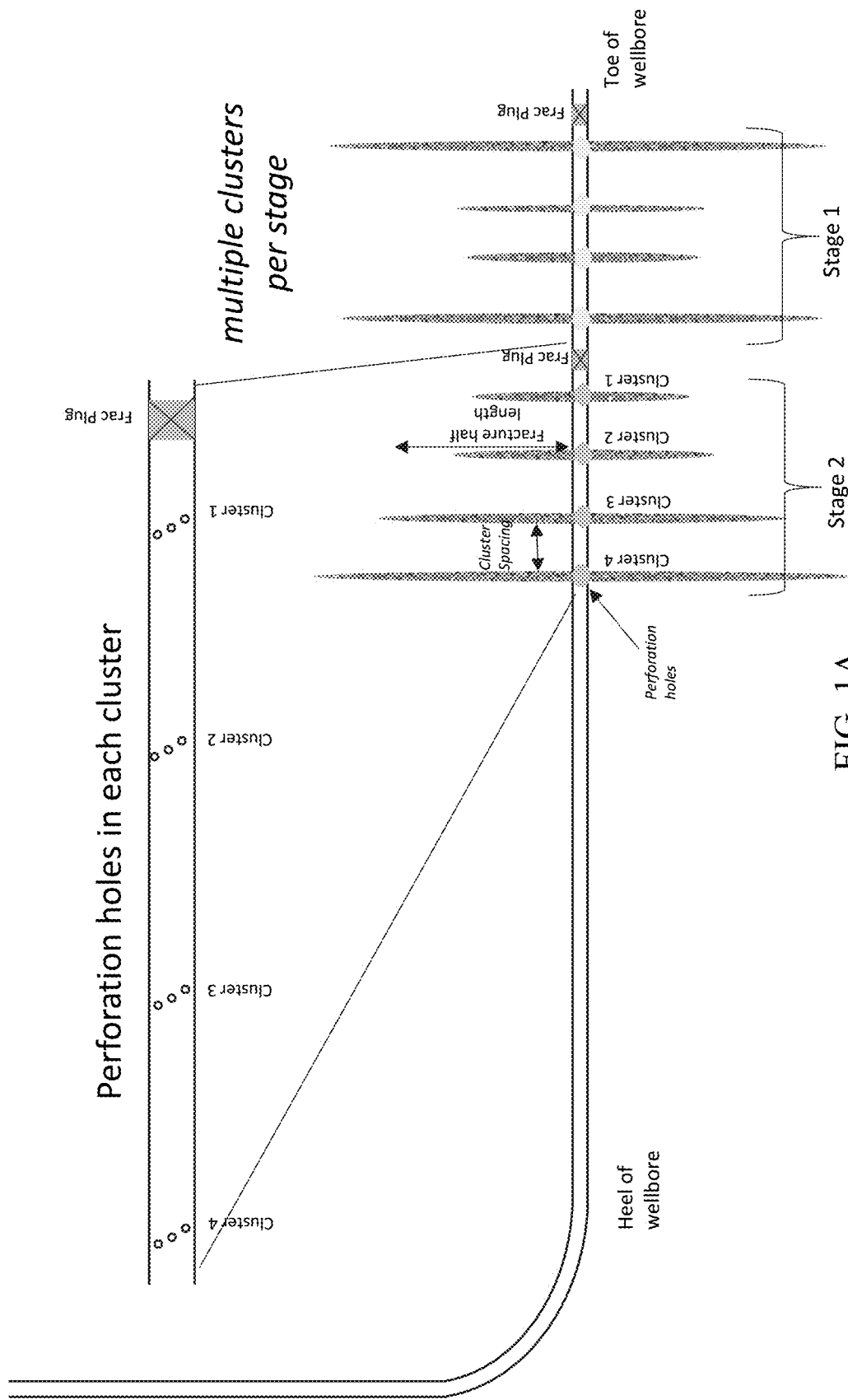
FIG. 1A illustrates one example with heterogenous or poor fluid distribution in each cluster creating non-equal fracture geometry.

Reference will now be made in detail to various embodiments, where like reference numerals designate corresponding parts throughout the several views. In the following detailed description, numerous specific details are set forth in order to provide a thorough understanding of the present disclosure and the embodiments described herein. However, embodiments described herein may be practiced without these specific details. In other instances, well-known methods, procedures, components, and mechanical apparatuses have not been described in detail so as not to unnecessarily obscure aspects of the embodiments.

DETAILED DESCRIPTION

TERMINOLOGY: The following terms will be used throughout the specification and will have the following meanings unless otherwise indicated.

Formation: Hydrocarbon exploration processes, hydrocarbon recovery (also referred to as hydrocarbon production) processes, or any combination thereof may be performed on a formation. The formation refers to practically any volume under a surface. For example, the formation may be practically any volume under a terrestrial surface (e.g., a land surface), practically any volume under a seafloor, etc. A water column may be above the formation, such as in marine hydrocarbon exploration, in marine hydrocarbon recovery, etc. The formation may be onshore. The formation may be offshore (e.g., with shallow water or deep water above the formation). The formation may include faults, fractures, overburdens, underburdens, salts, salt welds, rocks, sands, sediments, pore space, etc. Indeed, the formation may include practically any geologic point(s) or volume(s) of interest (such as a survey area) in some embodiments.

The formation may include hydrocarbons, such as liquid hydrocarbons (also known as oil or petroleum), gas hydrocarbons (e.g., natural gas), solid hydrocarbons (e.g., asphaltenes or waxes), a combination of hydrocarbons (e.g., a combination of liquid hydrocarbons and gas hydrocarbons) (e.g., a combination of liquid hydrocarbons, gas hydrocarbons, and solid hydrocarbons), etc. Light crude oil, medium oil, heavy crude oil, and extra heavy oil, as defined by the American Petroleum Institute (API) gravity, are examples of hydrocarbons. Examples of hydrocarbons are many, and hydrocarbons may include oil, natural gas, kerogen, bitumen, clathrates (also referred to as hydrates), etc. The hydrocarbons may be discovered by hydrocarbon exploration processes.

The formation may also include at least one wellbore. For example, at least one wellbore may be drilled into the formation in order to confirm the presence of the hydrocarbons. As another example, at least one wellbore may be drilled into the formation in order to recover (also referred to as produce) the hydrocarbons. The hydrocarbons may be recovered from the entire formation or from a portion of the formation. For example, the formation may be divided into one or more hydrocarbon zones, and hydrocarbons may be recovered from each desired hydrocarbon zone. One or more of the hydrocarbon zones may even be shut-in to increase hydrocarbon recovery from a hydrocarbon zone that is not shut-in.

The formation, the hydrocarbons, or any combination thereof may also include non-hydrocarbon items. For example, the non-hydrocarbon items may include connate water, brine, tracers, items used in enhanced oil recovery or other hydrocarbon recovery processes, etc.

In short, each formation may have a variety of characteristics, such as petrophysical rock properties, reservoir fluid properties, reservoir conditions, hydrocarbon properties, or any combination thereof. For example, each formation (or even zone or portion of the formation) may be associated with one or more of: temperature, porosity, salinity, permeability, water composition, mineralogy, hydrocarbon type, hydrocarbon quantity, reservoir location, pressure, etc. Indeed, those of ordinary skill in the art will appreciate that the characteristics are many, including, but not limited to: shale gas, shale oil, tight gas, tight oil, tight carbonate, carbonate, vuggy carbonate, unconventional (e.g., a rock matrix with an average pore size less than 1 micrometer), diatomite, geothermal, mineral, metal, a formation having a permeability in the range of from 0.000001 millidarcy to 25 millidarcy (such as an unconventional formation), a formation having a permeability in the range of from 26 millidarcy to 40,000 millidarcy, etc.

The terms "formation", "subsurface formation", "hydrocarbon-bearing formation", "reservoir", "subsurface reservoir", "subsurface region of interest", "subterranean reservoir", "subsurface volume of interest", "subterranean formation", and the like may be used synonymously. The terms "formation", "hydrocarbons", and the like are not limited to any description or configuration described herein.

Wellbore: A wellbore refers to a single hole, usually cylindrical, that is drilled into the formation for hydrocarbon exploration, hydrocarbon recovery, surveillance, or any combination thereof. The wellbore is usually surrounded by the formation and the wellbore may be configured to be in fluidic communication with the formation (e.g., via perforations in the wellbore generated with a perforation gun). The wellbore may also be configured to be in fluidic communication with the surface, such as in fluidic communication with a surface facility that may include oil/gas/water separators, gas compressors, storage tanks, pumps, gauges, sensors, meters, pipelines, etc.

The wellbore may be used for injection (sometimes referred to as an injection wellbore) in some embodiments. The wellbore may be used for production (sometimes referred to as a production wellbore) in some embodiments. The wellbore may be used for a single function, such as only injection, in some embodiments. The wellbore may be used for a plurality of functions, such as injection and then production, in some embodiments. For example, a single wellbore may be utilized for injection and hydrocarbon production, such as a single wellbore used for hydraulic fracturing and hydrocarbon production. A plurality of wellbores (e.g., tens to hundreds of wellbores) are often used in a field to recover hydrocarbons.

The wellbore may have straight, directional, or a combination of trajectories. For example, the wellbore may be a vertical wellbore, a horizontal wellbore, a multilateral wellbore, an inclined wellbore, a slanted wellbore, etc. The wellbore may include a change in deviation. As an example, the deviation is changing when the wellbore is curving. In a horizontal wellbore, the deviation is changing at the curved section (sometimes referred to as the heel). As used herein, a horizontal section of a wellbore is drilled in a horizontal direction (or substantially horizontal direction). For example, a horizontal section of a wellbore is drilled towards the bedding plane direction. A horizontal section of a wellbore may be, but is not limited to, a horizontal section of a horizontal wellbore. On the other hand, a vertical wellbore is drilled in a vertical direction (or substantially vertical direction). For example, a vertical wellbore is drilled perpendicular (or substantially perpendicular) to the bedding plane direction. The wellbore may be drilled amongst existing wellbores, for example, as an infill wellbore.

The wellbore may include a plurality of components, such as, but not limited to, a casing, a liner, a sleeve, a tubing string, a heating element, a sensor, a packer, a screen, a gravel pack, artificial lift equipment (e.g., an electric submersible pump (ESP)), etc. The "casing" refers to a steel pipe cemented in place during the wellbore construction process to stabilize the wellbore. The "liner" refers to any string of casing in which the top does not extend to the surface but instead is suspended from inside the previous casing. The "tubing string" or simply "tubing" is made up of a plurality of tubulars (e.g., tubing, tubing joints, pup joints, etc.) connected together. The tubing string is lowered into the casing or the liner for injecting a fluid into the formation, producing a fluid from the formation, or any combination thereof. The casing may be cemented in place, with the cement positioned in the annulus between the formation and the outside of the casing. The wellbore may also include any completion hardware that is not discussed separately. If the wellbore is drilled offshore, the wellbore may include some of the previous components plus other offshore components, such as a riser.

The wellbore may also include equipment to control fluid flow into the wellbore, control fluid flow out of the wellbore, or any combination thereof. For example, each wellbore may include a wellhead, a BOP, chokes, valves, or other control devices. These control devices may be located on the surface, under the surface (e.g., downhole in the wellbore), or any combination thereof. In some embodiments, the same control devices may be used to control fluid flow into and out of the wellbore. In some embodiments, different control devices may be used to control fluid flow into and out of the wellbore. In some embodiments, the rate of flow of fluids through the wellbore may depend on the fluid handling capacities of the surface facility that is in fluidic communication with the wellbore. The control devices may also be utilized to control the pressure profile of the wellbore.

The equipment to be used in controlling fluid flow into and out of the wellbore may be dependent on the wellbore, the formation, the surface facility, etc. However, for simplicity, the term "control apparatus" is meant to represent any wellhead(s), BOP(s), choke(s), valve(s), fluid(s), and other equipment and techniques related to controlling fluid flow into and out of the wellbore.

The wellbore may be drilled into the formation using practically any drilling technique and equipment known in the art, such as geosteering, directional drilling, etc. Drilling the wellbore may include using a tool, such as a drilling tool that includes a drill bit and a drill string. Drilling fluid, such as drilling mud, may be used while drilling in order to cool the drill tool and remove cuttings. Other tools may also be used while drilling or after drilling, such as measurement-while-drilling (MWD) tools, seismic-while-drilling (SWD) tools, wireline tools, logging-while-drilling (LWD) tools, or other downhole tools. After drilling to a predetermined depth, the drill string and the drill bit are removed, and then the casing, the tubing, etc. may be installed according to the design of the wellbore.

The equipment to be used in drilling the wellbore may be dependent on the design of the wellbore, the formation, the hydrocarbons, etc. However, for simplicity, the term "drilling apparatus" is meant to represent any drill bit(s), drill string(s), drilling fluid(s), and other equipment and techniques related to drilling the wellbore.

The term "wellbore" may be used synonymously with the terms "borehole," "well," or "well bore." The term "wellbore" is not limited to any description or configuration described herein.

Hydrocarbon recovery: The hydrocarbons may be recovered from the formation using a fracturing process. For example, a fracturing process may include fracturing using electrodes, fracturing using fluid (oftentimes referred to as hydraulic fracturing), etc. The hydrocarbons may be recovered from the formation using radio frequency (RF) heating. Another hydrocarbon recovery process(es) may also be utilized to recover the hydrocarbons. Furthermore, those of ordinary skill in the art will appreciate that one hydrocarbon recovery process may also be used in combination with at least one other recovery process or subsequent to at least one other recovery process. This is not an exhaustive list of hydrocarbon recovery processes.

A hydraulic fracturing process may entail preparing an injection fluid (oftentimes referred to a fracturing fluid) and injecting that fracturing fluid into the wellbore at a sufficient rate and pressure to open existing fractures, create fractures, or any combination thereof in the formation. The formation proximate to the wellbore may be fractured for the first time or refractured. The wellbore may be new or existing. The fractures permit hydrocarbons to flow more freely from the formation into the wellbore. Fracturing may be performed onshore, offshore, or any combination thereof.

In the hydraulic fracturing process, the fracturing fluid may be prepared on-site to include at least proppants. The proppants, such as sand or other particles, are meant to hold the fractures open so that hydrocarbons can more easily flow to the wellbore. The fracturing fluid and the proppants may be blended together using at least one blender. The fracturing fluid may also include other components in addition to the proppants. The wellbore and formation proximate to the wellbore are in fluid communication (e.g., via perforations in the wellbore generated with a perforation gun), and the fracturing fluid with the proppants is injected into the wellbore through the wellhead of the wellbore using at least one pump (oftentimes called a fracturing pump). The fracturing fluid with the proppants is injected at a sufficient rate and pressure to open existing fractures and/or create fractures in the formation. As fractures become sufficiently wide to allow proppants to flow into those fractures, proppants in the fracturing fluid are deposited in those fractures during injection of the fracturing fluid. The fracturing fluid is removed by flowing or pumping it back out of the same wellbore so that the fracturing fluid does not block the flow of hydrocarbons to the same wellbore. The hydrocarbons will typically enter the same wellbore from the formation and flow up to the surface for further processing. The fracturing process may involve clusters and staging in some embodiments.

The equipment to be used in preparing the fracturing fluid, injecting the fracturing fluid, and fracturing with the fracturing fluid may be dependent on the fracturing fluid, on the proppants, on the wellbore, the formation, etc. However, for simplicity, the term "fracturing apparatus" is meant to represent any tank(s), mixer(s), blender(s), pump(s), manifold(s), line(s), valve(s), fluid(s), fracturing fluid component(s), proppants, and other equipment and techniques related to preparing the fracturing fluid, injecting the fracturing fluid, and fracturing with the fracturing fluid. Those of ordinary will also appreciate that there may be some overlap between the "fracturing apparatus" and the equipment used in other hydrocarbon recovery processes, such that some items (e.g., a tank, a mixer, etc.) may be used in multiple processes.

Other definitions: The term "proximate" is defined as "near". If item A is proximate to item B, then item A is near item B. For example, in some embodiments, item A may be in contact with item B. For example, in some embodiments, there may be at least one barrier between item A and item B such that item A and item B are near each other, but not in contact with each other. The barrier may be a fluid barrier, a non-fluid barrier (e.g., a structural barrier), or any combination thereof. Both scenarios are contemplated within the meaning of the term "proximate."

The terms "comprise" (as well as forms, derivatives, or variations thereof, such as "comprising" and "comprises") and "include" (as well as forms, derivatives, or variations thereof, such as "including" and "includes") are inclusive (i.e., open-ended) and do not exclude additional elements or steps. For example, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Accordingly, these terms are intended to not only cover the recited element(s) or step(s), but may also include other elements or steps not expressly recited. Furthermore, as used herein, the use of the terms "a" or "an" when used in conjunction with an element may mean "one," but it is also consistent with the meaning of "one or more," "at least one," and "one or more than one." Therefore, an element preceded by "a" or "an" does not, without more constraints, preclude the existence of additional identical elements.

The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent of the given numeric value provided such a deviation does not alter the end function or result of the value. Therefore, a value of about 1% can be construed to be a range from 0.9% to 1.1%. Furthermore, a range may be construed to include the start and the end of the range. For example, a range of 10% to 20% (i.e., range of 10%-20%) includes 10% and also includes 20%, and includes percentages in between 10% and 20%, unless explicitly stated otherwise herein. Similarly, a range of between 10% and 20% (i.e., range between 10%-20%) includes 10% and also includes 20%, and includes percentages in between 10% and 20%, unless explicitly stated otherwise herein.

The term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

It is understood that when combinations, subsets, groups, etc. of elements are disclosed (e.g., combinations of components in a composition, or combinations of steps in a method), that while specific reference of each of the various individual and collective combinations and permutations of these elements may not be explicitly disclosed, each is specifically contemplated and described herein. By way of example, if an item is described herein as including a component of type A, a component of type B, a component of type C, or any combination thereof, it is understood that this phrase describes all of the various individual and collective combinations and permutations of these components. For example, in some embodiments, the item described by this phrase could include only a component of type A. In some embodiments, the item described by this phrase could include only a component of type B. In some embodiments, the item described by this phrase could include only a component of type C. In some embodiments, the item described by this phrase could include a component of type A and a component of type B. In some embodiments, the item described by this phrase could include a component of type A and a component of type C. In some embodiments, the item described by this phrase could include a component of type B and a component of type C. In some embodiments, the item described by this phrase could include a component of type A, a component of type B, and a component of type C. In some embodiments, the item described by this phrase could include two or more components of type A (e.g., A1 and A2). In some embodiments, the item described by this phrase could include two or more components of type B (e.g., B1 and B2). In some embodiments, the item described by this phrase could include two or more components of type C (e.g., C1 and C2). In some embodiments, the item described by this phrase could include two or more of a first component (e.g., two or more components of type A (A1 and A2)), optionally one or more of a second component (e.g., optionally one or more components of type B), and optionally one or more of a third component (e.g., optionally one or more components of type C). In some embodiments, the item described by this phrase could include two or more of a first component (e.g., two or more components of type B (B1 and B2)), optionally one or more of a second component (e.g., optionally one or more components of type A), and optionally one or more of a third component (e.g., optionally one or more components of type C). In some embodiments, the item described by this phrase could include two or more of a first component (e.g., two or more components of type C (C1 and C2)), optionally one or more of a second component (e.g., optionally one or more components of type A), and optionally one or more of a third component (e.g., optionally one or more components of type B).

This written description uses examples to disclose the invention, including the best mode, and also to enable any person skilled in the art to make and use the invention. The patentable scope is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

Unless defined otherwise, all technical and scientific terms used herein have the same meanings as commonly understood by one of skill in the art to which the disclosed invention belongs. All citations referred herein are expressly incorporated by reference.

OVERVIEW: In unconventional resources horizontal wellbores, 5-15 perforation clusters are fractured together in each stage of plug-n-perf (PnP) completion. Multiple studies have shown that heel-ward bias of proppant and fluid occurs, and less than 60% of clusters are effectively treated. Inefficient fracture placement results in understimulated reservoir, poor production and recovery, fracture hit and interference, and inefficient reservoir management. Efforts to overcome these challenges has been largely trial and error.

On the other hand, embodiments consistent with this disclosure may include calculating a stress profile across a plurality of perforation clusters within a fracture stage of the wellbore; and calculating a fracture pressure parameter for each perforation cluster of the plurality of perforation clusters within the fracture stage of the wellbore as a function of the stress profile across the plurality of perforation clusters within the fracture stage, a perforation friction that accounts for perforation hole erosion, a fracture net pressure, and a fracture closure pressure. The embodiment further comprises determining a quantity of perforation clusters in the plurality of the perforation clusters within the fracture stage, a quantity of perforation holes for each perforation cluster of the plurality of perforation clusters within the fracture stage, a diameter of the perforation holes for each perforation cluster of the plurality of perforation clusters within the fracture stage, a spacing between each perforation cluster of the plurality of perforation clusters within the fracture stage, an injection distribution across the plurality of perforation clusters within the fracture stage, or any combination thereof, for the hydraulic fracture completion configuration based on the calculated fracture pressure parameters.

Figure 1B:
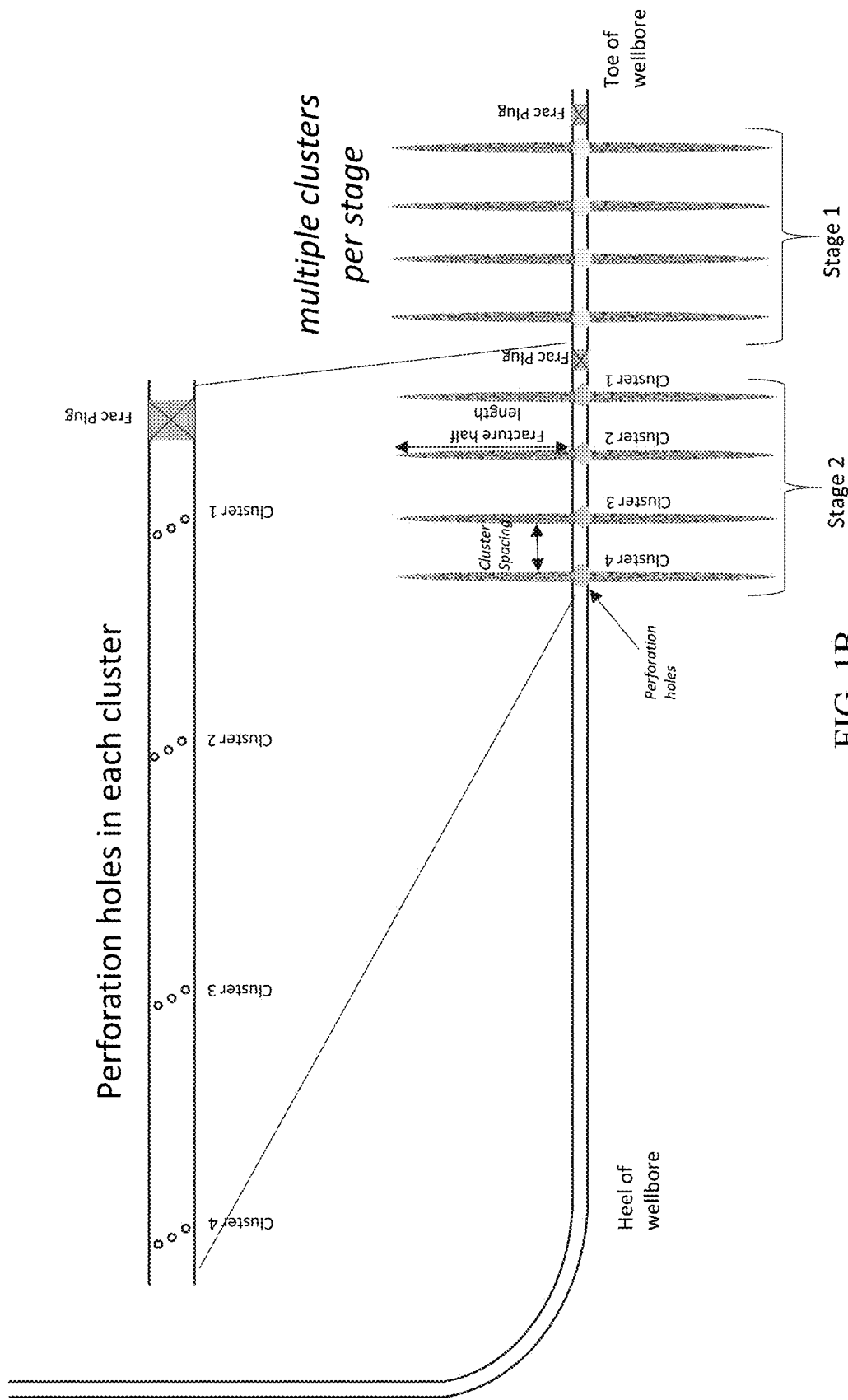
FIG. 1B illustrates one example with an aim to create equal fracture geometry with equal fluid distribution in each cluster.

Advantageously, embodiments consistent with this disclosure may improve fracture placement efficiency. FIG. 1B illustrates one example with an aim to create equal fracture geometry with equal fluid distribution in each cluster. For example, a more optimum perforation cluster design may be obtained at reduced cost with ability to successfully pump up to 15 cluster per stage with increased fracture placement efficiency. For example, fracture placement efficiency can be improved with optimum fracture entry design via embodiments consistent with this disclosure using: VSC: Uses variable perforation friction to overcome stress shadow and heel-ward bias, Limited entry perforation: Uses perforation friction to divert fluid to other clusters, Equal perforation hole diameter using advanced perforation charge designs to achieve equal and consistent perforation hole diameter.

Advantageously, embodiments consistent with this disclosure may use a perforation gun for generating perforations in the wellbore according to a hydraulic fracture completion configuration. For example, a perforation gun may be utilized to generate, in the wellbore, the determined quantity of perforation clusters in the plurality of the perforation clusters within the fracture stage. For example, a perforation gun or other device(s) may be utilized to generate, in the wellbore, the determined quantity of perforation holes for each perforation cluster of the plurality of perforation clusters within the fracture stage. For example, a perforation gun may be utilized to generate, in the wellbore, the determined diameter of the perforation holes for each perforation cluster of the plurality of perforation clusters within the fracture stage, and so on. Furthermore, a pump and an injection line configured to inject fluid through the generated perforations of the wellbore into the subterranean formation may be utilized to perform the hydraulic fracturing operation. Advantageously, embodiments consistent with this disclosure may perform a hydraulic fracturing operation on the wellbore using a hydraulic fracture completion configuration.

Figure 2:
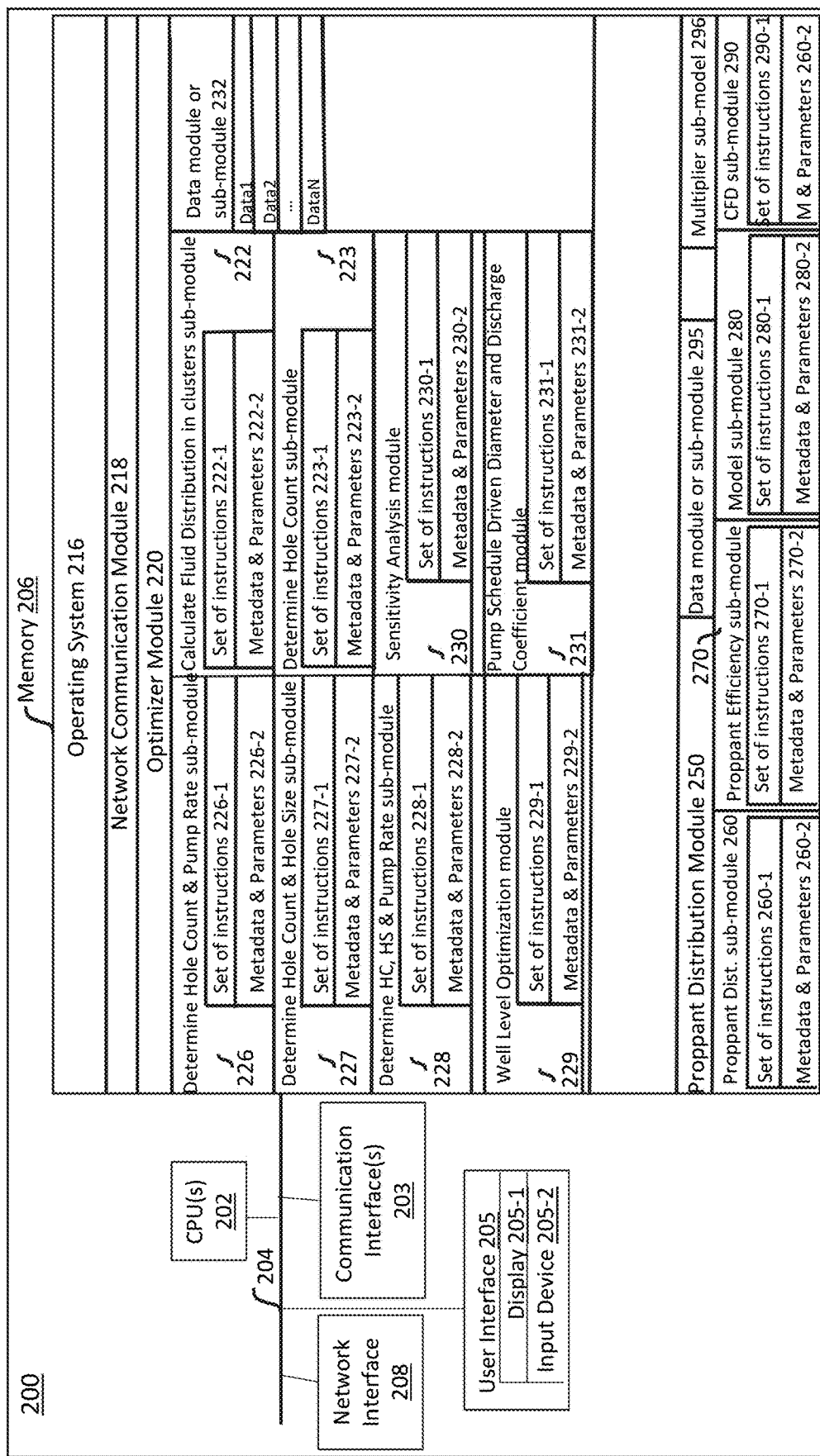
FIG. 2 illustrates one embodiment of a system for executing one or more computer implemented methods discussed herein.

System—FIG. 2 is a block diagram illustrating a system of determining a hydraulic fracture completion configuration for a wellbore that extends through a subterranean formation, such as a system 200, in accordance with some embodiments. While certain specific features are illustrated, those skilled in the art will appreciate from the present disclosure that various other features have not been illustrated for the sake of brevity and so as not to obscure more pertinent aspects of the embodiments disclosed herein.

To that end, the system 200 includes one or more processing units (CPUs) 202, one or more network interfaces 208 and/or other communication interfaces 203, memory 206, and one or more communication buses 204 for interconnecting these and various other components. The system 200 also includes a user interface 205 (e.g., a display 205-1 and an input device 205-2). The communication buses 204 may include circuitry (sometimes called a chipset) that interconnects and controls communications between system components. An operator can actively input information and review operations of system 200 using the user interface 205. User interface 205 can be anything by which a person can interact with system 200, which can include, but is not limited to, the input device 205-2 (e.g., a keyboard, mouse, etc.) or the display 205-1.

Memory 206 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 206 may optionally include one or more storage devices remotely located from the CPUs 202. Memory 206, including the non-volatile and volatile memory devices within memory 206, comprises a non-transitory computer readable storage medium and may store data (e.g., input discussed further hereinbelow, output discussed further hereinbelow, etc.), models, images, etc. In particular embodiments, the computer readable storage medium comprises at least some tangible devices, and in specific embodiments such computer readable storage medium includes exclusively non-transitory media.

In some embodiments, memory 206 or the non-transitory computer readable storage medium of memory 206 stores the following programs, modules and data structures, or a subset thereof including an operating system 216, a network communication module 218, and a hydraulic fracture completion configuration determination module 220.

The operating system 216 includes procedures for handling various basic system services and for performing hardware dependent tasks.

The network communication module 218 facilitates communication with other devices via the communication network interfaces 208 (wired or wireless) and one or more communication networks, such as the Internet, other wide area networks, local area networks, metropolitan area networks, and so on.

In some embodiments, the system 200 may include four modules that execute the operations of the methods shown in the figures. An Optimizer module 220 (e.g., A VSC Optimizer module), a Well Level Optimization module 229, a Sensitivity Analysis module 230, and a Pump Schedule Driven Diameter and Discharge Coefficient module 231.

In some embodiments, the Optimizer module 220 optimizes the perforation design to achieve uniform fluid distribution in multiple clusters, and target perforation friction pressure for limited entry. The Optimizer module 120 includes a Calculate Fluid Distribution in clusters sub-module 222, a Determine Hole Count sub-module 223, a Determine Hole Count & Pump Rate sub-module 226, a Determine Hole Count & Hole Size sub-module 227, and a Determine Hole Count (HC), Hole Size (HS) & Pump Rate sub-module 228. In some embodiments, the Calculate Fluid Distribution in clusters sub-module 222 contains a set of instructions 222-1 and accepts metadata and parameters 222-2 that will enable it to calculate fluid distribution in perforation clusters. In some embodiments, the Determine Hole Count sub-module 223 contains a set of instructions 223-1 and accepts metadata and parameters 223-2 that will enable it to determine (e.g., optimize) hole count. In some embodiments, the Determine Hole Count & Pump Rate sub-module 226 contains a set of instructions 226-1 and accepts metadata and parameters 226-2 that will enable it to determine hole count and pump rate. In some embodiments, the Determine Hole Count (HC), Hole Size (HS) & Pump Rate sub-module 228 contains a set of instructions 228-1 and accepts metadata and parameters 228-2 that will enable it to determine hole count, hole size, and pump rate. As an example, a human user may be presented with an option corresponding to the sub-module 223, an option corresponding to the sub-module 226, and an option corresponding to the sub-module 227 via the user interface 205. The input and output of each sub-module may be different (although there may be some overlap), and the relevant input and output may depend on the option selected by the human user.

In some embodiments, the Well Level Optimization module 229 contains a set of instructions 229-1 and accepts metadata and parameters 229-2 that will enable it to optimize perforation design in multiple segments of long lateral (e.g., multiple fracture stages) accounting for surface pressure limitation (e.g., Pump-rate varies along lateral).

Figure 4A:
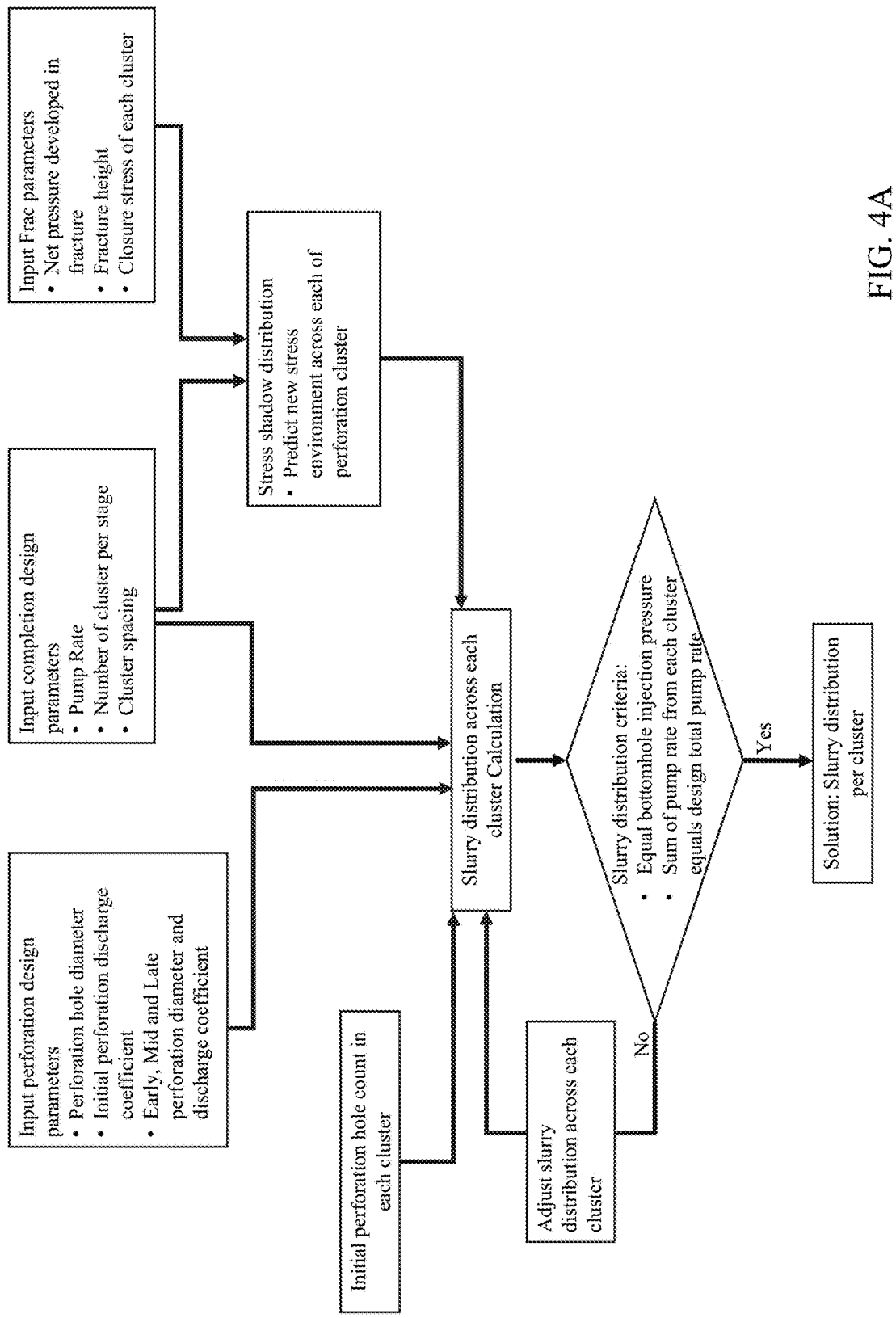
Figure 4B:
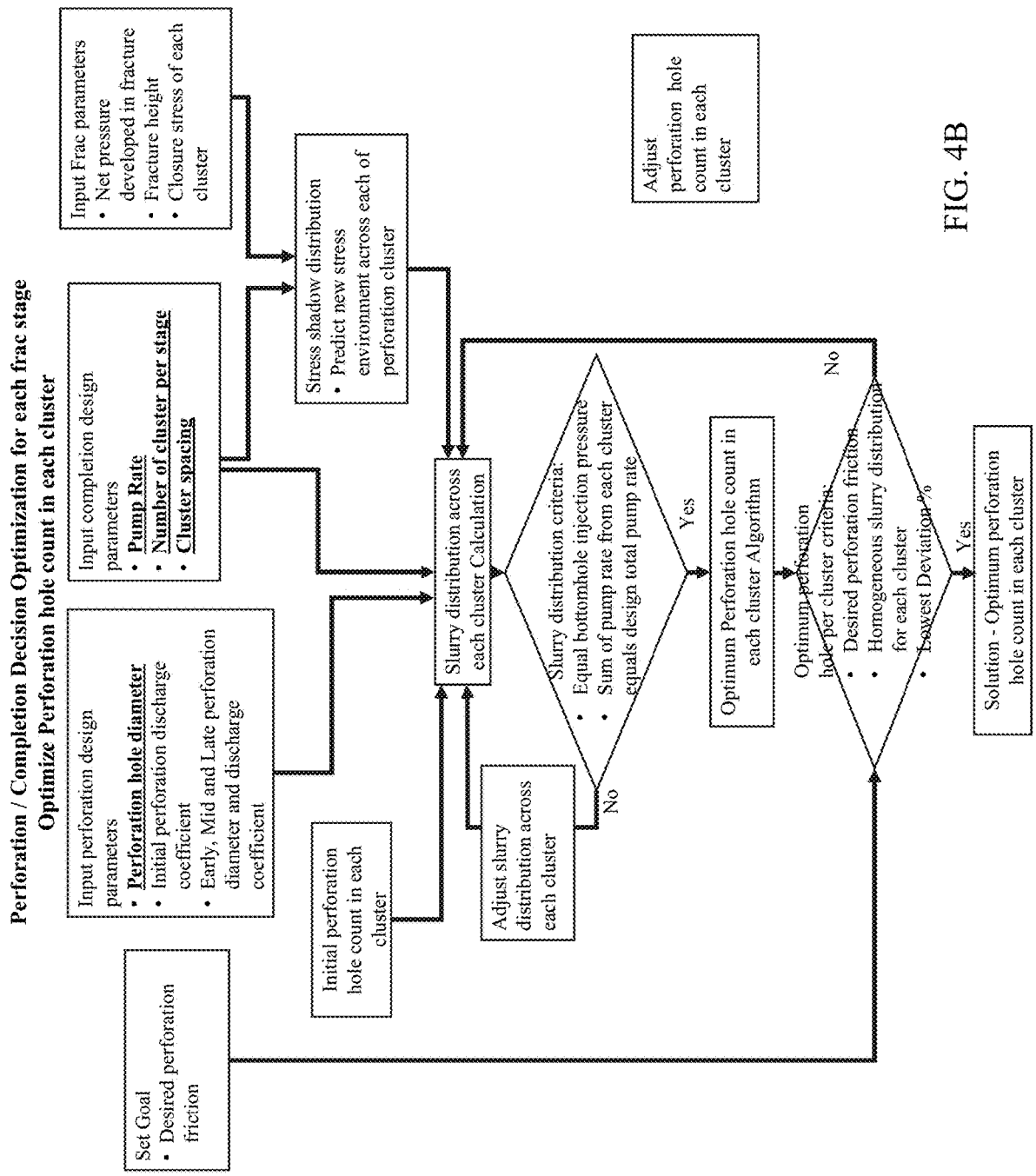
Figure 4C:
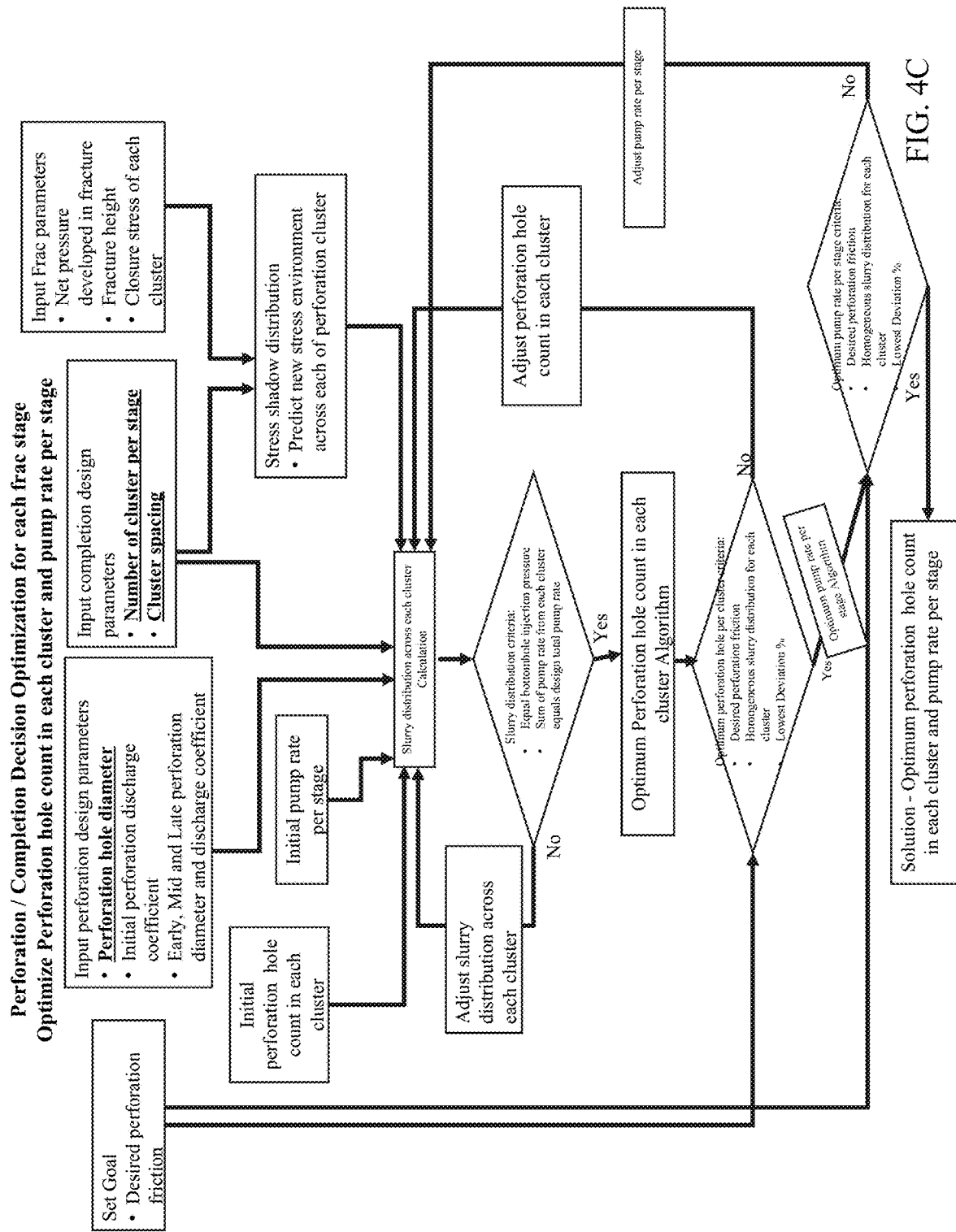
Figure 4D:
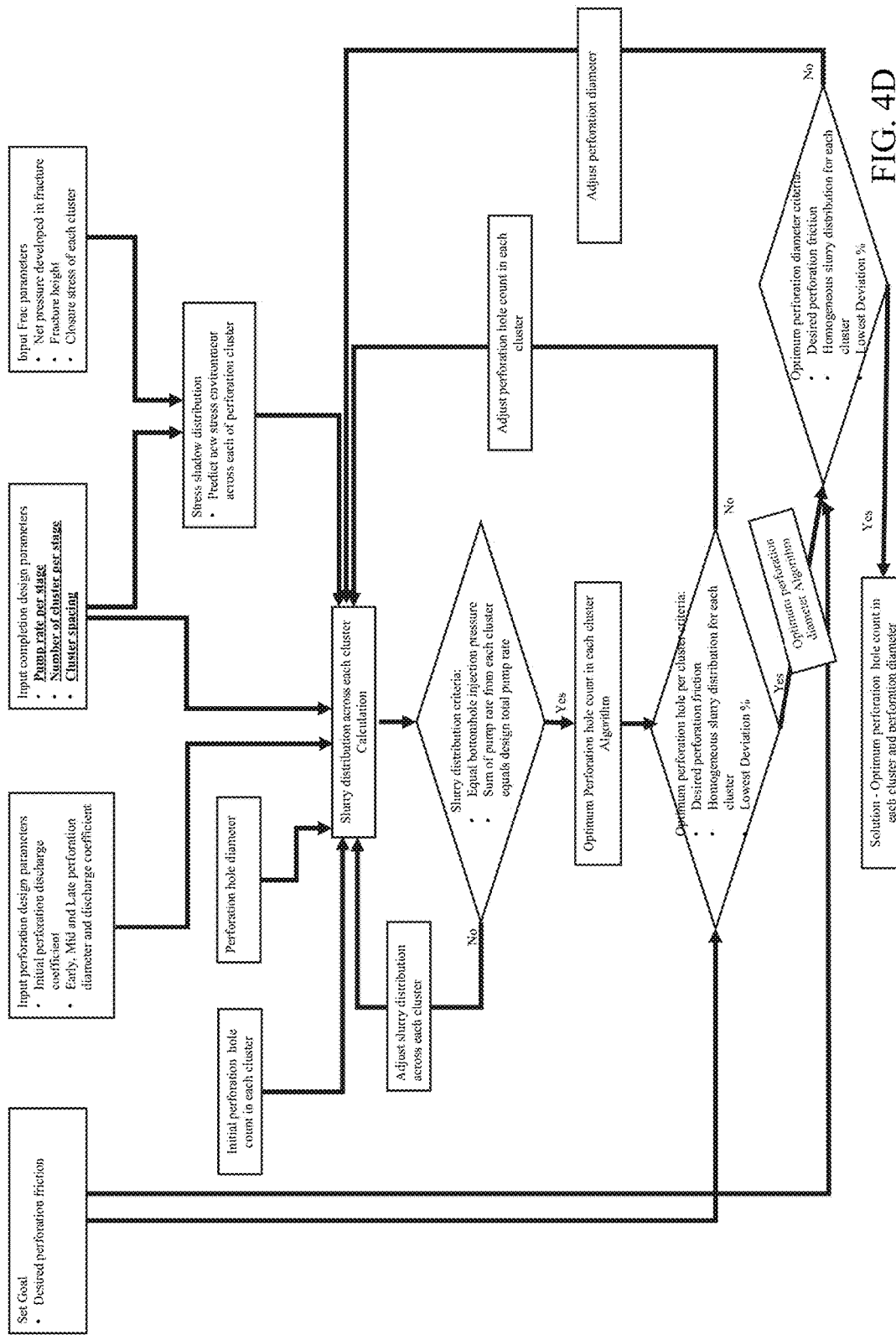
Figure 4F:
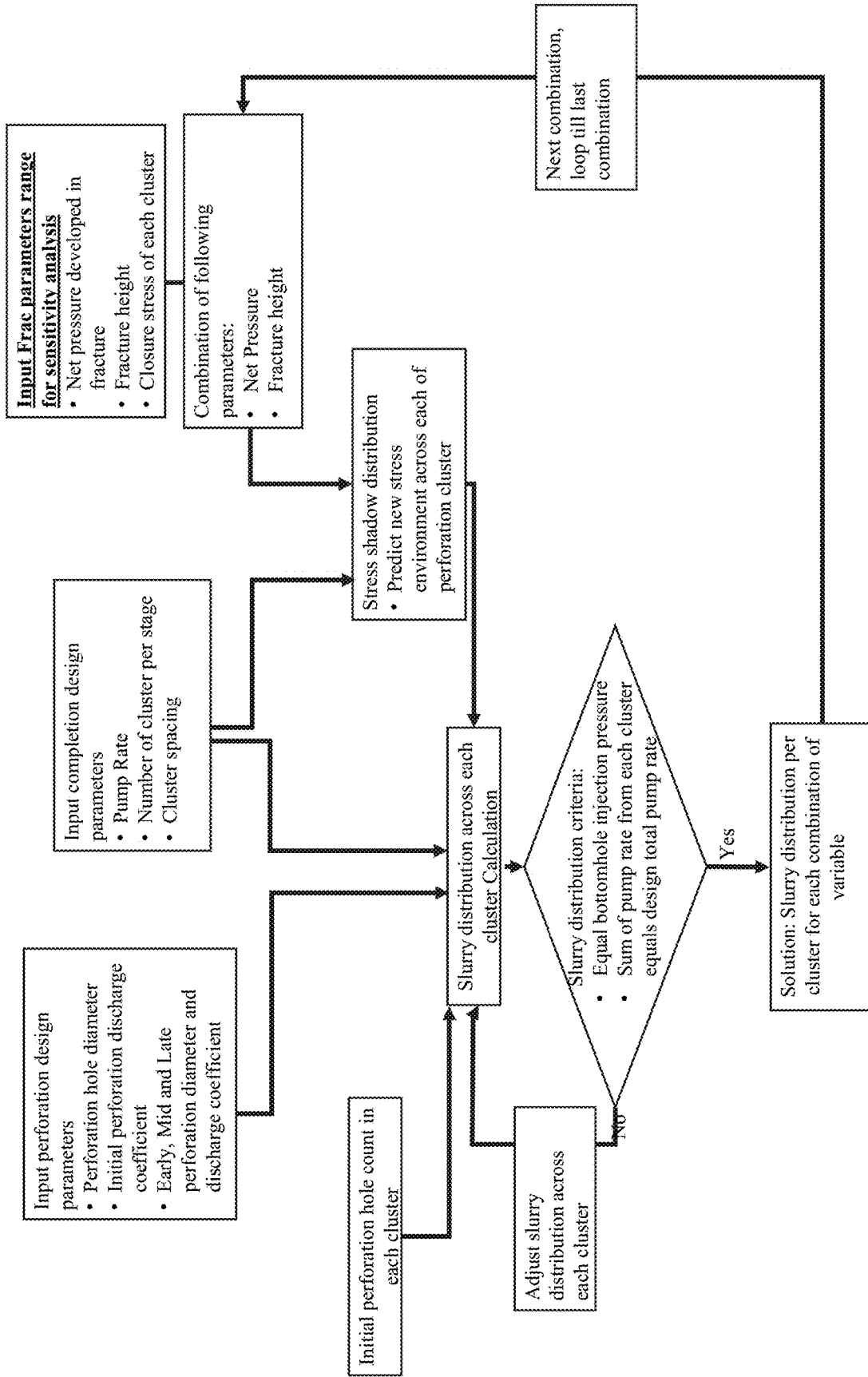
Figure 4G:
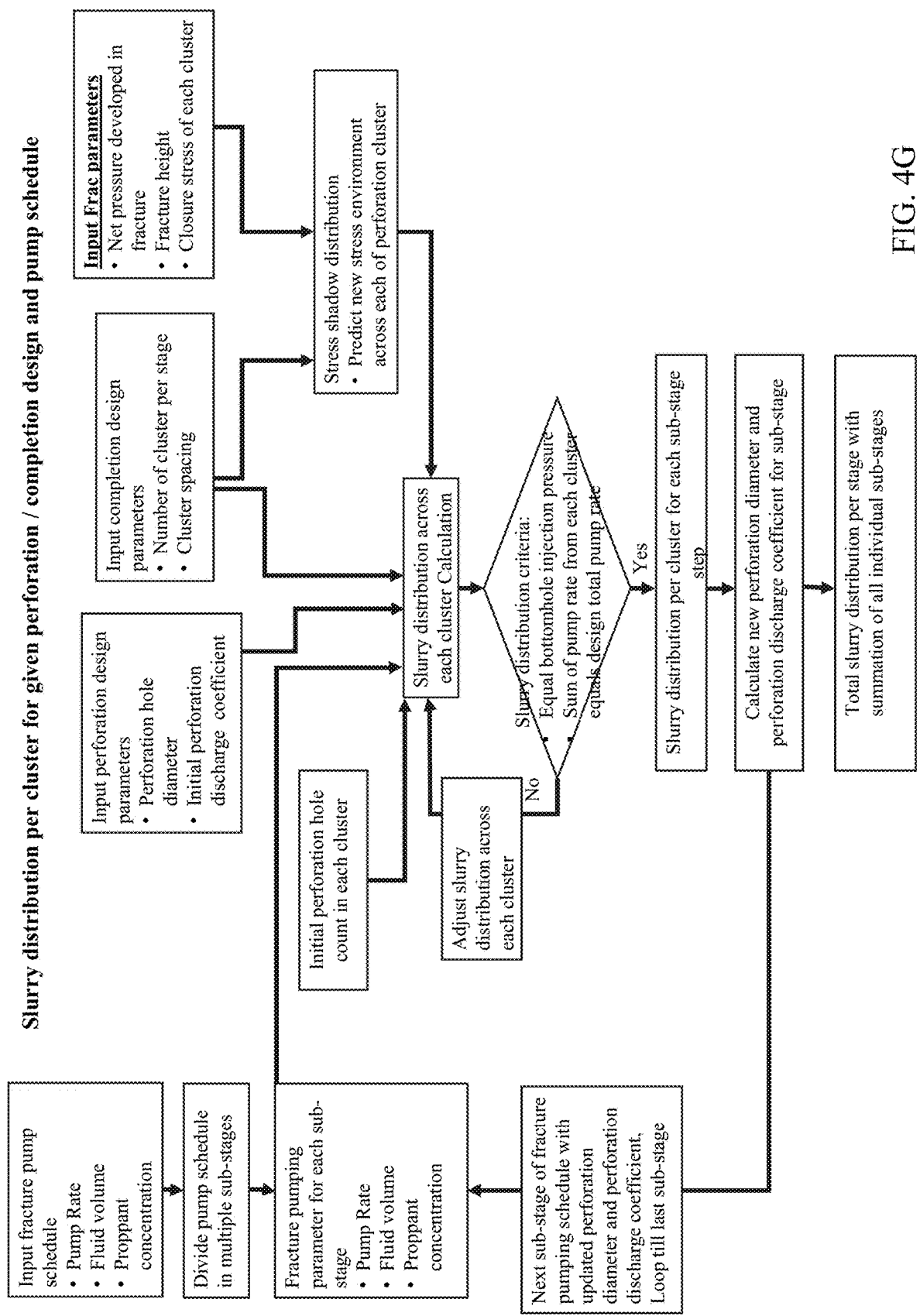

In some embodiments, the Sensitivity Analysis module 230 contains a set of instructions 230-1 and accepts metadata and parameters 230-2 that will enable it to calculate fluid distribution among multiple clusters for different scenarios of net pressure, fracture height, or both (since both parameters have a range of uncertainty). FIG. 4F illustrates a flowchart of one embodiment of method of determining a slurry distribution per cluster for given perforation/completion design, for example, using a sensitivity analysis module such as module 230.

In some embodiments, the Pump Schedule Driven Diameter and Discharge Coefficient module 231 contains a set of instructions 231-1 and accepts metadata and parameters 231-2 that will enable it to handle fixed diameter and discharge coefficient. In some embodiments, the Pump Schedule Driven Diameter and Discharge Coefficient module 231 contains a set of instructions 231-1 and accepts metadata and parameters 231-2 that will enable it to handle variable diameter and discharge coefficient.

The system 200 may also include at least one Data module or sub-module 232, which handles the data. This data may be supplied by the Data module or sub-module 232 to other modules and/or sub-modules. For example, the data may be inputted by an operator via the user interface 205, received from one or more sensors or devices, received from one or more system of records, etc. In some embodiments, the output of each of the modules and/or sub-modules may be provided to an operator or to another system(s), for example, via the user interface 205, the network communication module 218, a printer, the display 205-1, a data storage device, any combination of thereof, etc.

In some embodiments, one or more module (or sub-module(s) thereof) may aim to create equal fracture geometry with equal fluid distribution in each cluster. In some embodiments, one or more module (or sub-module(s) thereof) may aim to create substantially equal fracture geometry with substantially equal fluid distribution in each cluster. Substantially equal may be plus or minus a percentage for a target in some embodiments.

Although specific operations have been identified for the sub-modules discussed herein, this is not meant to be limiting. Each sub-module may be configured to execute operations identified as being a part of other sub-modules, and may contain other instructions, metadata, and parameters that allow it to execute other operations of use in processing data and generating hydrocarbon production forecasts. For example, any of the sub-modules may optionally be able to generate a display that would be sent to and shown on the user interface display 205-1. In addition, any of the data or processed data products may be transmitted via the communication interface(s) 203 or the network interface 208 and may be stored in memory 206.

Method 300 is, optionally, governed by instructions that are stored in computer memory or a non-transitory computer readable storage medium (e.g., memory 206) and are executed by one or more processors (e.g., processors 202) of one or more computer systems. The computer readable storage medium may include a magnetic or optical disk storage device, solid state storage devices such as flash memory, or other non-volatile memory device or devices. The computer readable instructions stored on the computer readable storage medium may include one or more of: source code, assembly language code, object code, or another instruction format that is interpreted by one or more processors. In various embodiments, some operations in each method may be combined and/or the order of some operations may be changed from the order shown in the figures. For ease of explanation, method 300 is described as being performed by a computer system, although in some embodiments, various operations of method 300 are distributed across separate computer systems.

Turning to FIG. 3, this figure illustrates one embodiment of a method of determining a hydraulic fracture completion configuration for a wellbore that extends through a subterranean formation, such as a method 300. The method 300 of FIG. 3 may be executed by the system 200 of FIG. 2 and examples will be utilized to discuss some portions of the method 300. In some embodiments, the hydraulic fracture completion configuration comprises a limited entry perforation completion. In some embodiments, the hydraulic fracture completion configuration comprises a variable shot cluster perforation completion. In some embodiments, the hydraulic fracture completion configuration comprises a uniform shot cluster perforation completion. In some embodiments, the wellbore has an inclination greater than 60 degrees from vertical (e.g., 61 degrees-90 degrees, 65 degrees-75 degrees, 65 degrees-85 degrees, 65 degrees-90 degrees, or 75 degrees-90 degrees). In some embodiments, the wellbore comprises a horizontal wellbore. In some embodiments, the wellbore comprises a vertical wellbore.

In some embodiments, the hydraulic fracture completion configuration is utilized to perform a hydraulic fracturing operation on the wellbore. For example, a perforation gun may be utilized to generate, in the wellbore, the determined quantity of perforation clusters in the plurality of the perforation clusters within the fracture stage. For example, a perforation gun or other device(s) may be utilized to generate, in the wellbore, the determined quantity of perforation holes for each perforation cluster of the plurality of perforation clusters within the fracture stage. For example, a perforation gun may be utilized to generate, in the wellbore, the determined diameter of the perforation holes for each perforation cluster of the plurality of perforation clusters within the fracture stage, and so on.

At 305, the method 300 includes calculating a stress profile across a plurality of perforation clusters within a fracture stage of the wellbore.

In one embodiment, the stress profile comprises a minimum horizontal stress profile. The minimum horizontal stress profile across the plurality of perforation clusters within the fracture stage of the wellbore is calculated using an equation:

$$\Delta \sigma_x = p_n \left[ 1 - \frac{x^3}{(h_f^2/4 + x^2)^{3/2}} \right]$$

where $p_n$ represents the fracture net pressure, x represents a distance between each perforation cluster of the plurality of perforation clusters within the fracture stage and a closest perforation cluster within an adjacent fracture stage, and $h_f$ represents a fracture height.

In one embodiment, the stress profile comprises an initial stress profile or changes thereto induced by a hydraulic fracturing operation, fluid depletion in the subterranean formation, one or more other wellbore operations, or any combination thereof. The changes to the initial stress profile induced by the hydraulic fracturing operation comprises hydraulic fracturing within the fracture stage in the wellbore, hydraulic fracturing in an adjacent fracture stage in the wellbore, hydraulic fracturing in a neighboring wellbore, or any combination thereof. Changes in stress profile may be referred to as "stress shadow". Stress shadow is discussed in US Publication No. 2016/0003020 and US Publication No. 20120325462, each of which is incorporated by reference. The stress shadow may be calculated using an analytical equation:

$$\sigma_x = p_n \left[ 1 - \frac{x^3}{(h_f^2/4 + x^2)^{3/2}} \right]$$

Figures 5, 6:
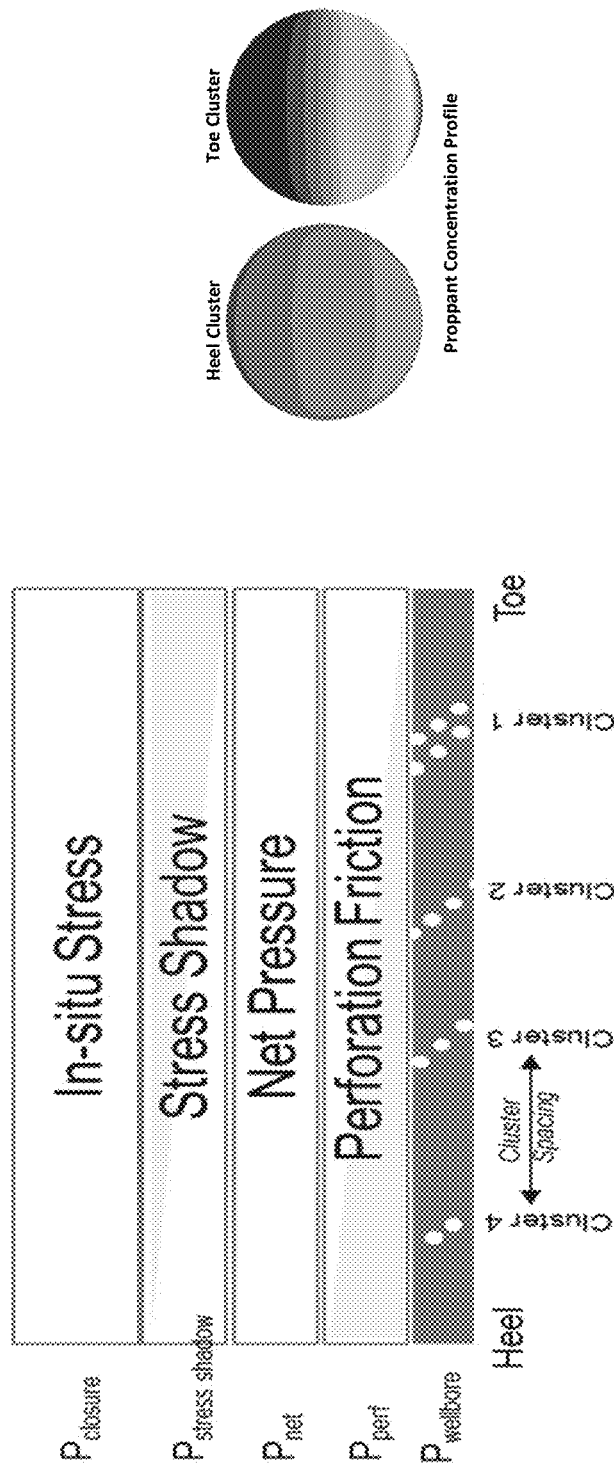
FIG. 5 illustrates one embodiment of stress shadow in context.
FIG. 6 illustrates proppant concentration profiles for a heel cluster and a toe cluster.
Figure 7:
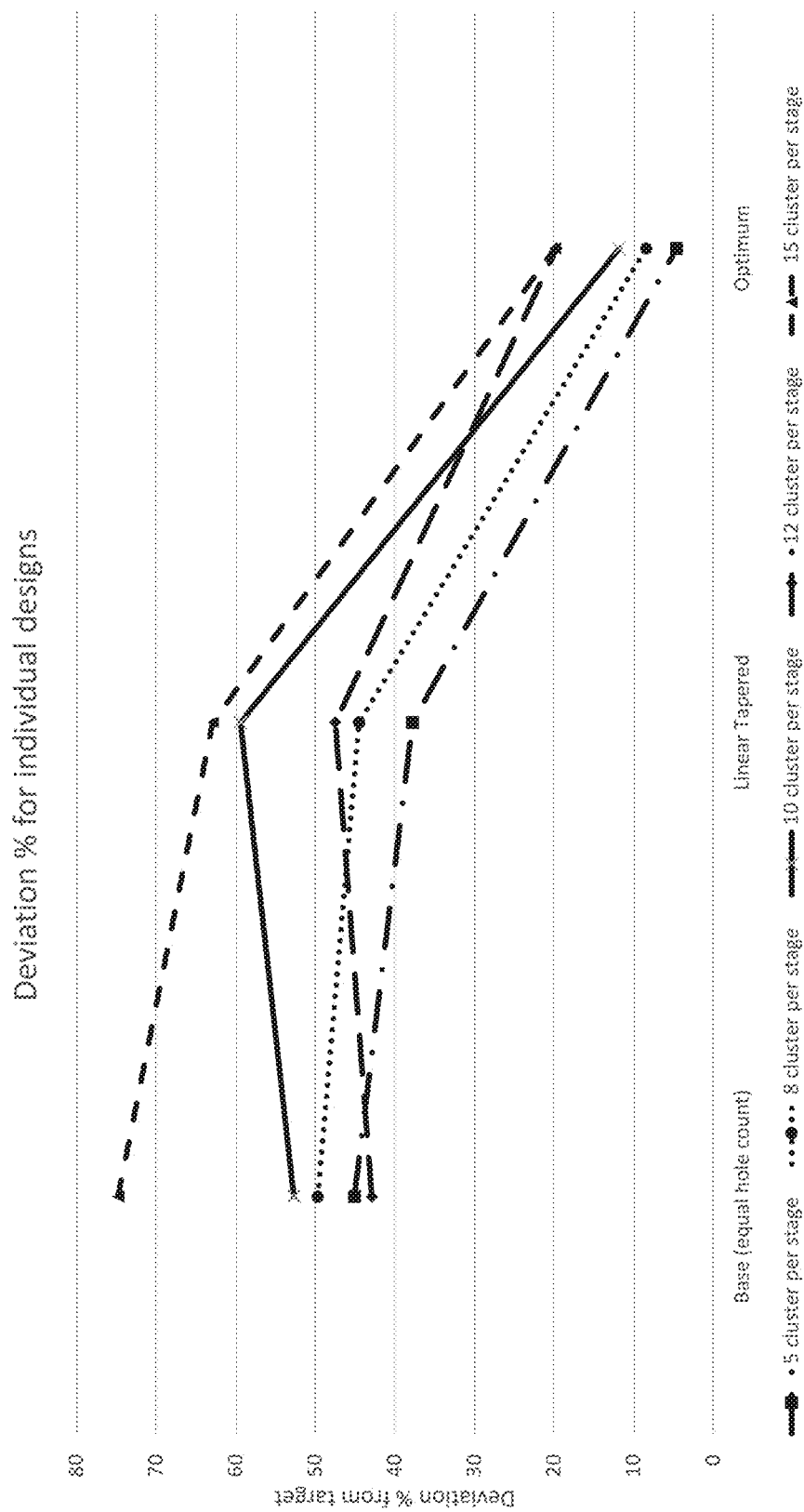
FIG. 7 is a diagram illustrating one embodiment of deviation % for individual designs.
Figure 8:
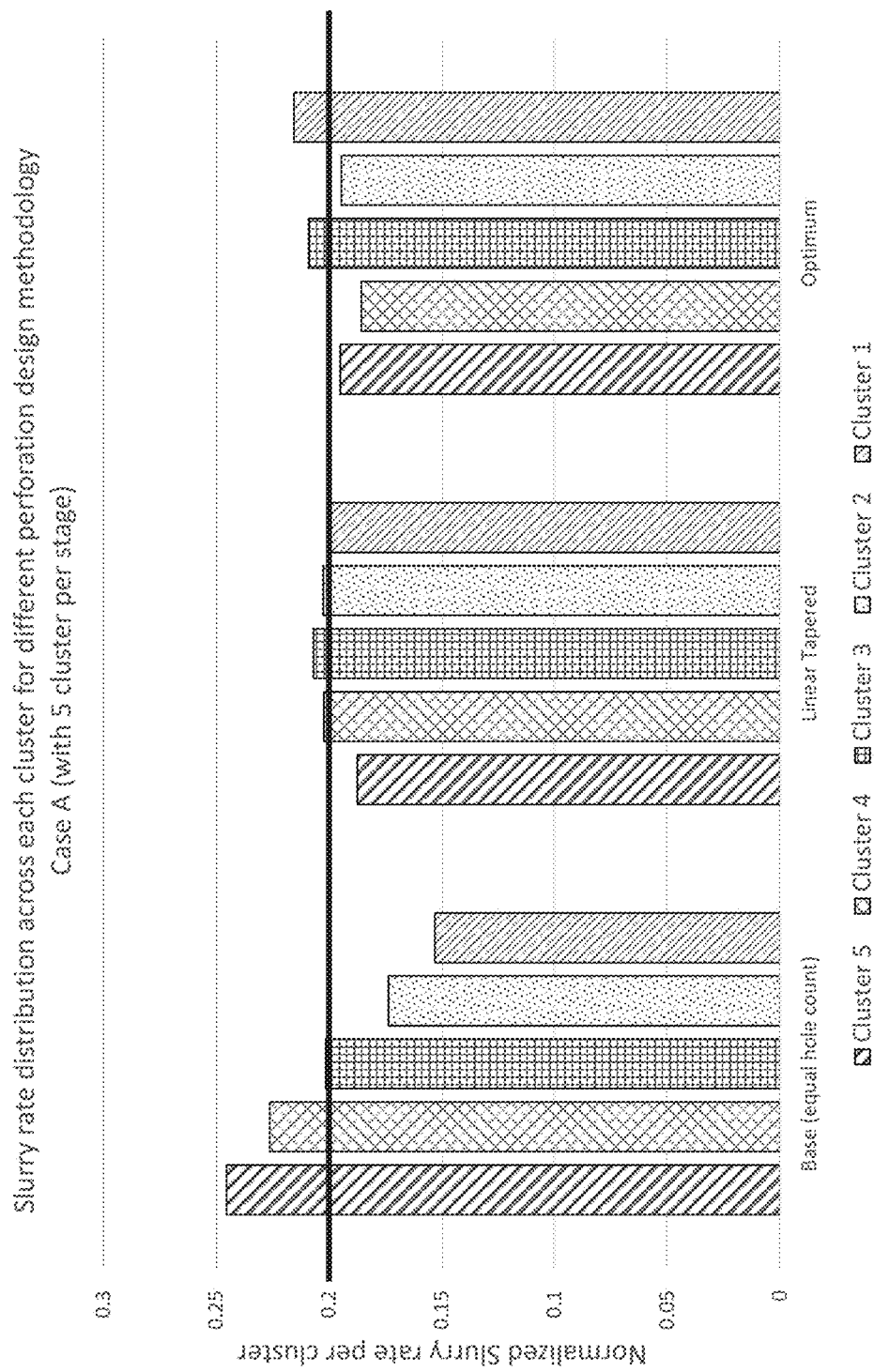
FIGS. 8-12 illustrate various slurry rate distribution examples.
Figure 9:
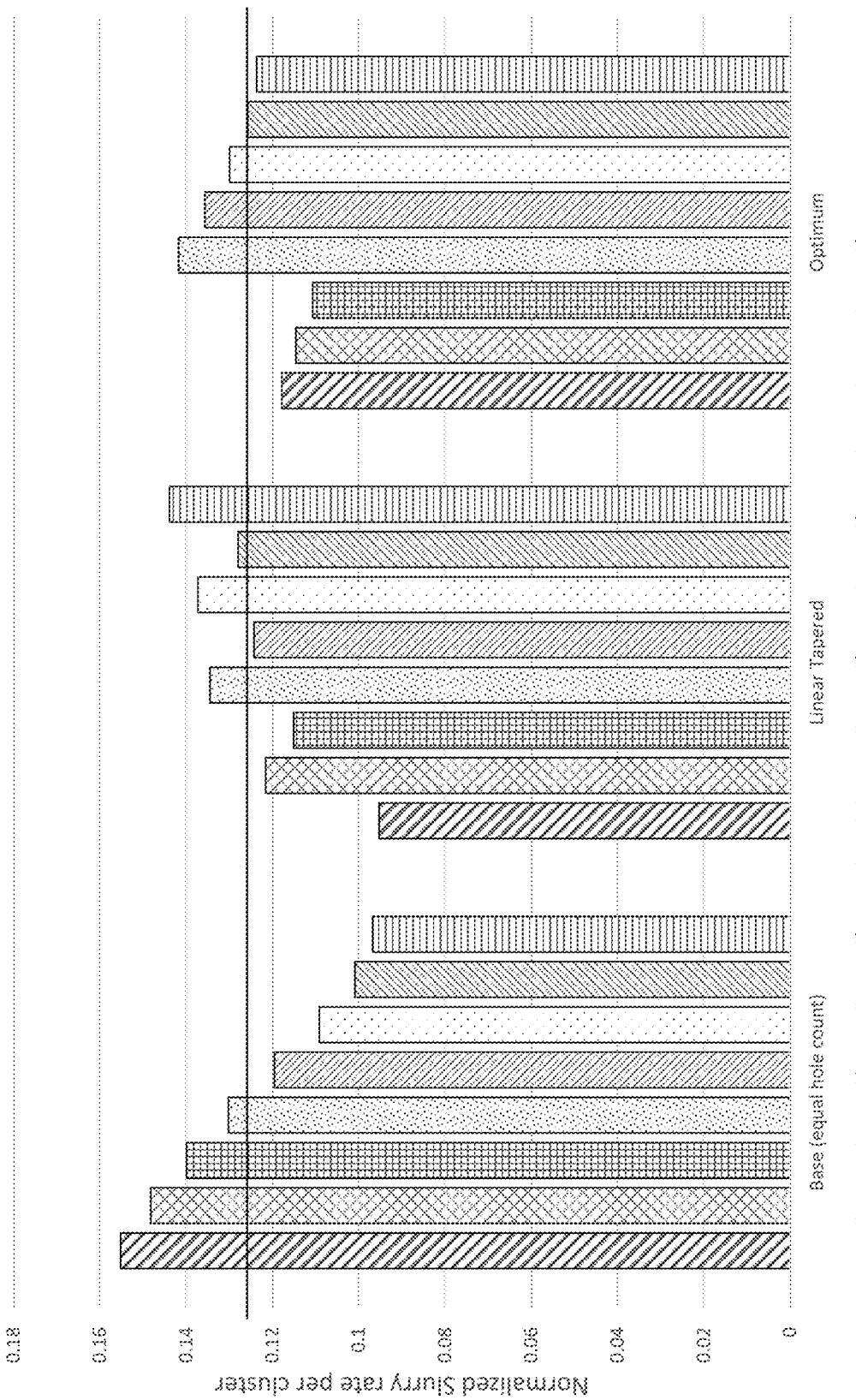
Figure 10:
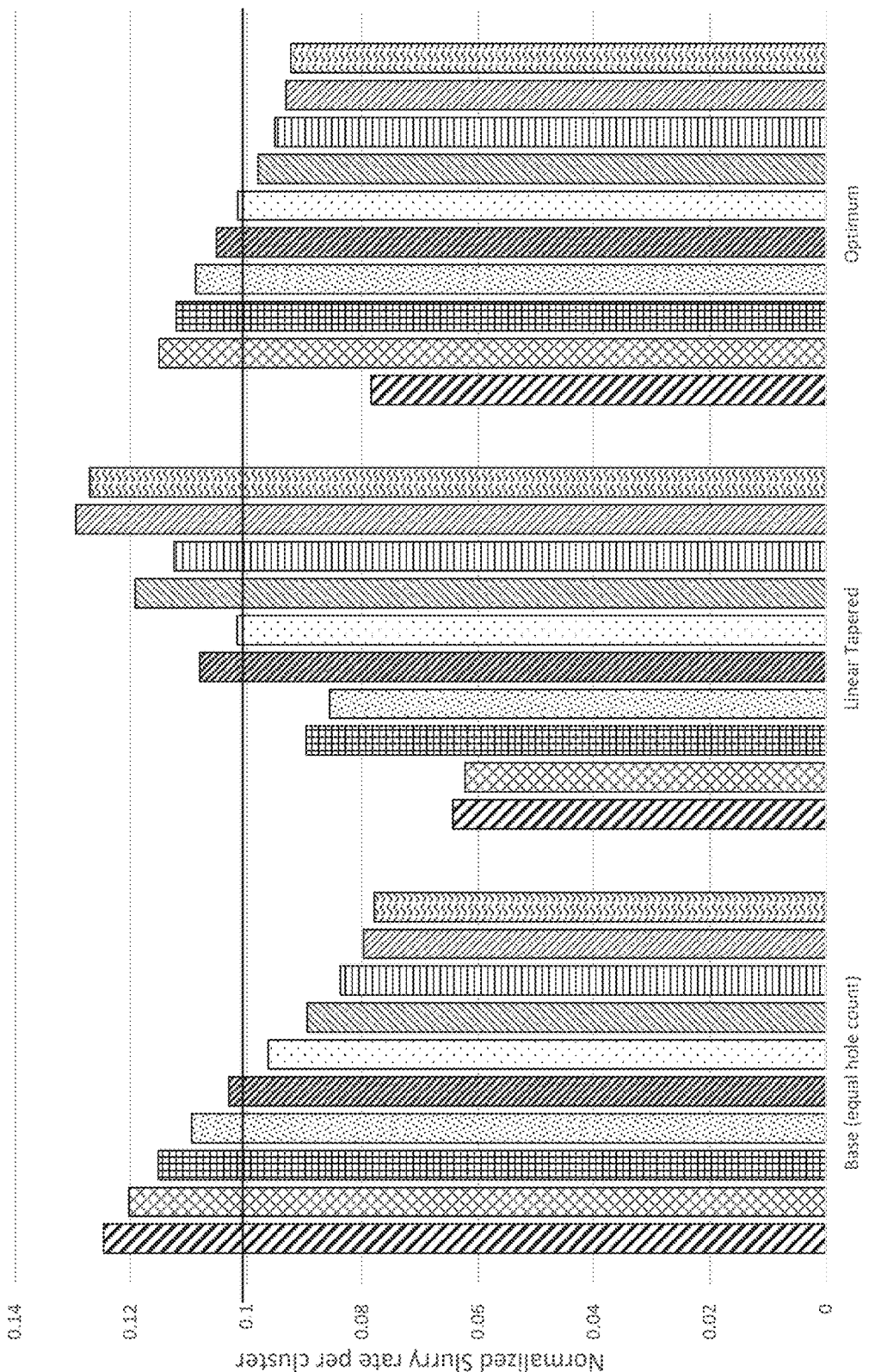
Figure 11:
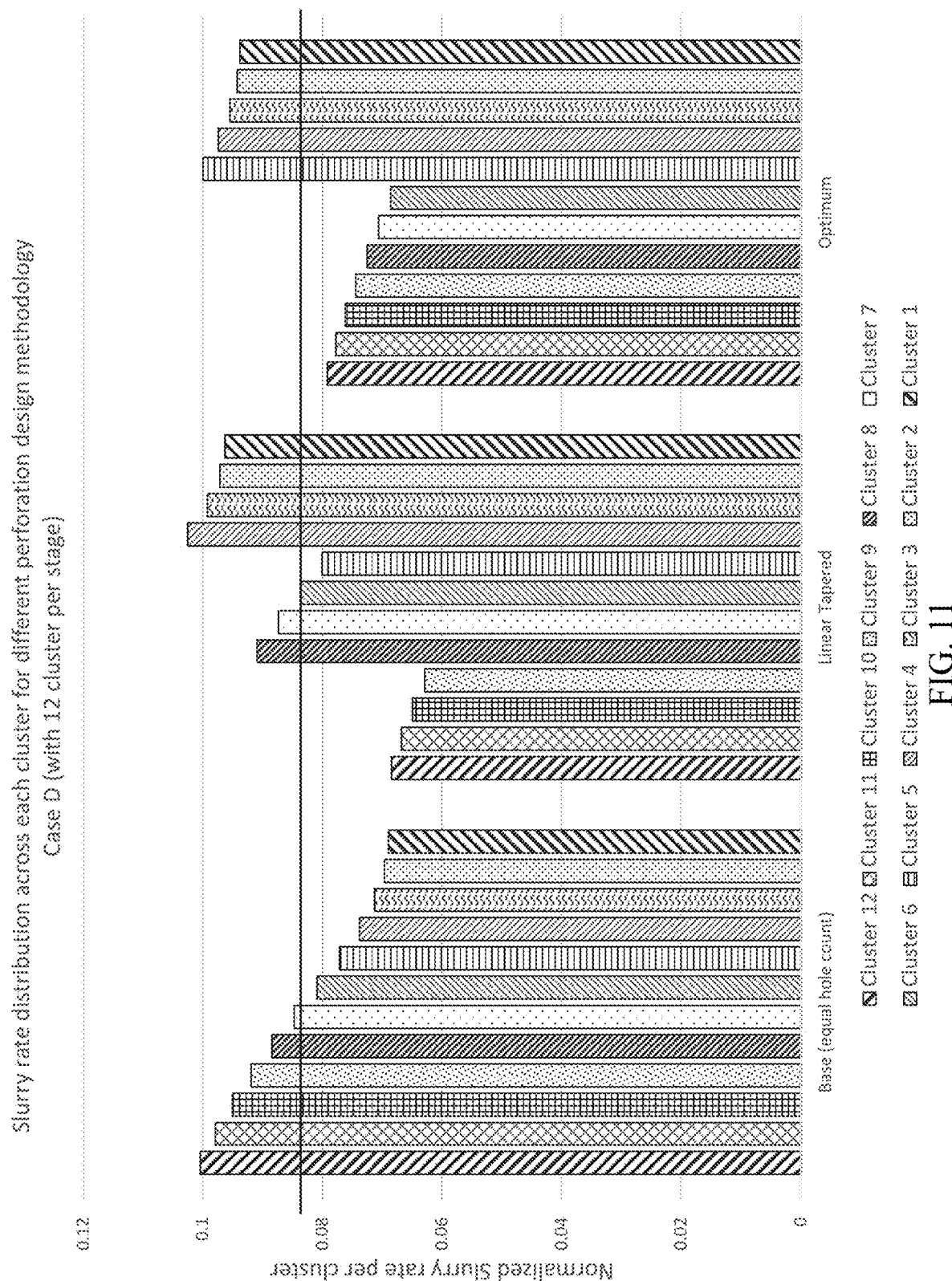
Figure 12:
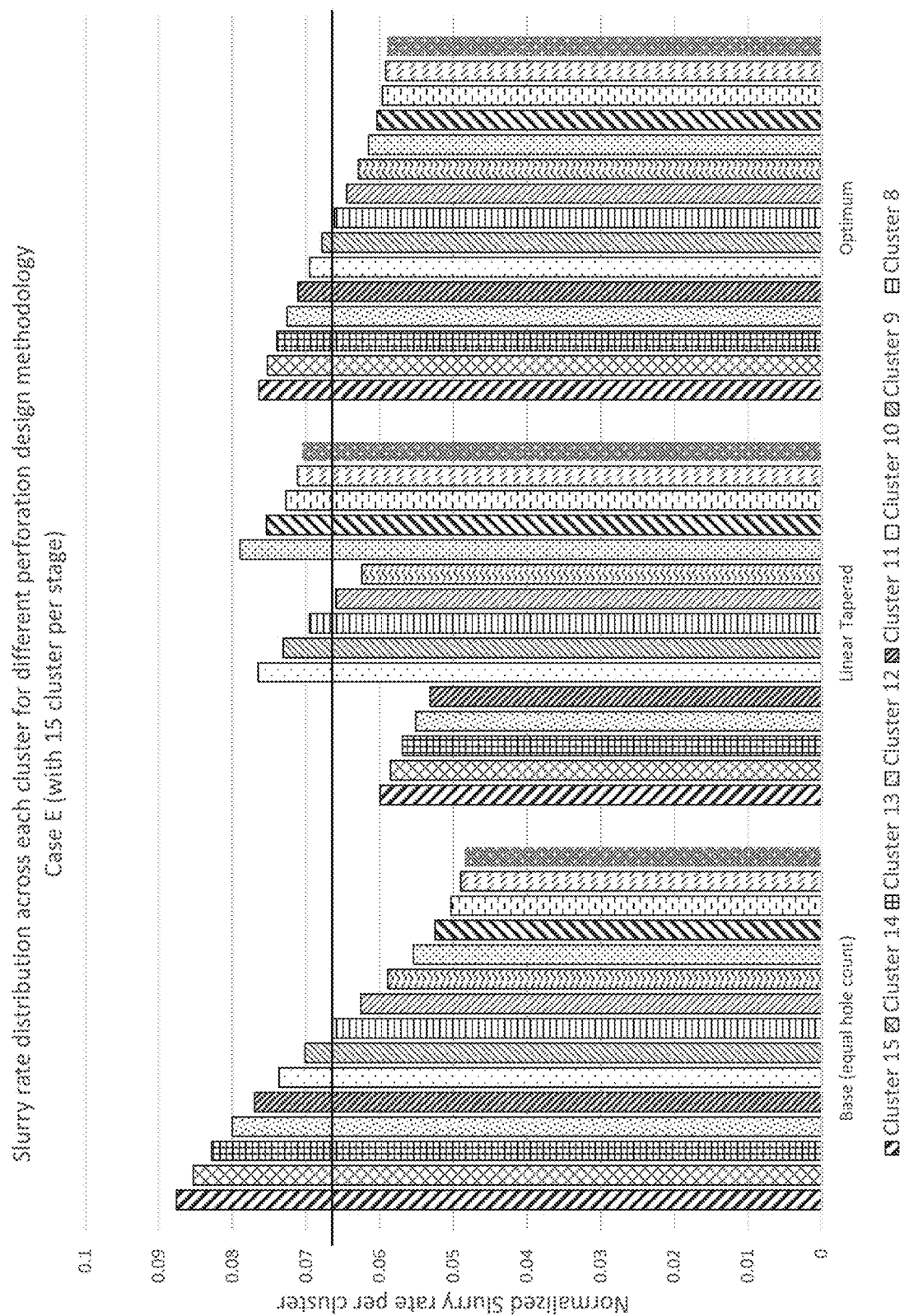

Sneddon, I. N., 1946, "The Distribution of Stress in the Neighborhood of a Crack in an Elastic Solid", Proc. R. Soc. Lond. A 187, 229-260, which is incorporated by reference. FIG. 5 illustrates the stress shadow in context. FIG. 6 also illustrates proppant concentration profiles for a heel cluster and a toe cluster.

At 310, the method 300 includes calculating a fracture pressure parameter for each perforation cluster of the plurality of perforation clusters within the fracture stage of the wellbore as a function of the stress profile across the plurality of perforation clusters within the fracture stage, a perforation friction that accounts for perforation hole erosion, a fracture net pressure, and a fracture closure pressure.

In one embodiment, the fracture pressure parameter for each perforation cluster of the plurality of perforation clusters within the fracture stage of the wellbore is calculated using an equation:

$$P_{wellbore} = P_{stress\ shadow} + P_{perf} + P_{net} + P_{closure}$$

where $P_{stress\ shadow}$ represents a change in the stress profile across the plurality of perforation clusters within the fracture stage, $P_{perf}$ represents the perforation friction that accounts for perforation hole erosion, $P_{net}$ represents the fracture net pressure, and $P_{closure}$ represents the fracture closure pressure.

As an example, assume a particular fracture stage includes 4 perforation clusters. $P_{wellbore}$ at cluster1 equals $P_{stress\ shadow}$ at cluster1+$P_{perf}$ at cluster1+$P_{net}$ at cluster1+$P_{closure}$ at cluster1. $P_{wellbore}$ at cluster1 equals $P_{stress\ shadow}$ at cluster2+$P_{perf}$ at cluster2+$P_{net}$ at cluster2+$P_{closure}$ at cluster2. $P_{wellbore}$ at cluster3 equals $P_{stress\ shadow}$ at cluster3+$P_{perf}$ at cluster3+$P_{net}$ at cluster3+$P_{closure}$ at cluster3. $P_{wellbore}$ at cluster4 equals $P_{stress\ shadow}$ at cluster4+$P_{perf}$ at cluster4+$P_{net}$ at cluster4+$P_{closure}$ at cluster4. Afterwards, $P_{perf}$ (defined by injection rate and hole count for example) for cluster1 may be adjusted, $P_{perf}$ (defined by injection rate and hole count for example) for cluster2 may be adjusted, $P_{perf}$ (defined by injection rate and hole count for example) for cluster3 may be adjusted, $P_{perf}$ (defined by injection rate and hole count for example) for cluster4 may be adjusted, or any combination thereof such that the $P_{wellbore}$ for cluster1, $P_{wellbore}$ for cluster2, $P_{wellbore}$ for cluster3, and $P_{wellbore}$ for cluster4 are substantially equal. In this particular example, $P_{closure}$, $P_{net}$, and $P_{stress\ shadow}$ are not changed. However, those of ordinary skill in the art will appreciate that various modifications are possible. For example, in some embodiments, both $P_{stress\ shadow}$ and $P_{perf}$ may be adjusted in order to equalize the $P_{wellbore}$ for the various perforation clusters.

In one embodiment, the perforation friction that accounts for perforation hole erosion is calculated using an equation:

$$P_{perf} = \frac{0.2369\, q^2 \rho_f}{C_D^2 N_p^2 d_p^4}$$

where q represents an injection rate into each perforation cluster, $\rho_f$ represents an injection fluid density, $C_D$ represents a perforation discharge coefficient, $N_p$ represents the quantity of perforation holes for each perforation cluster of the plurality of perforation clusters, and $d_p$ represents the diameter of the perforation holes for each perforation cluster of the plurality of perforation clusters within the fracture stage.

In one embodiment, the perforation friction that accounts for perforation hole erosion comprises an average perforation friction calculated at multiple time steps.

In one embodiment, the fracture closure pressure comprises a minimum horizontal stress.

In one embodiment, the fracture pressure parameter for each perforation cluster of the plurality of perforation clusters within the fracture stage of the wellbore is further calculated as a function of fracture height.

At 315, the method 300 includes determining a quantity of perforation clusters in the plurality of the perforation clusters within the fracture stage, a quantity of perforation holes for each perforation cluster of the plurality of perforation clusters within the fracture stage, a diameter of the perforation holes for each perforation cluster of the plurality of perforation clusters within the fracture stage, a spacing between each perforation cluster of the plurality of perforation clusters within the fracture stage, an injection distribution across the plurality of perforation clusters within the fracture stage, or any combination thereof, for the hydraulic fracture completion configuration based on the calculated fracture pressure parameters.

In one embodiment, determining based on the calculated fracture pressure parameters comprises iteratively adjusting the calculated fracture pressure parameters to reduce a variation in a distribution of the calculated fracture pressure parameters for the plurality of the perforation clusters within the fracture stage.

In one embodiment, determining based on the calculated fracture pressure parameters comprises iteratively adjusting the calculated fracture pressure parameters to identify the hydraulic fracture completion configuration with a closest match between a distribution of the calculated fracture pressure parameters for the plurality of the perforation clusters within the fracture stage to a targeted distribution of calculated fracture pressure parameters for the plurality of the perforation clusters within the fracture stage. The closest match between the distribution of the calculated fracture pressure parameters for the plurality of the perforation clusters within the fracture stage to the targeted distribution of calculated fracture pressure parameters for the plurality of the perforation clusters within the fracture stage is determined based on a cumulative deviation between the perforation friction, a total injection rate for the plurality of perforation clusters within the fracture stage, an injection rate allocation for the plurality of perforation clusters within the fracture stage, or any combination thereof.

In one embodiment, determining based on the calculated fracture pressure parameters comprises iteratively adjusting the calculated fracture pressure parameters to reduce a variation in the injection distribution across the plurality of perforation clusters within the fracture stage.

In one embodiment, determining based on the calculated fracture pressure parameters comprises iteratively adjusting the calculated fracture pressure parameters to identify the hydraulic fracture completion configuration with a closest match between the injection distribution across the plurality of perforation clusters within the fracture stage to a target injection distribution across the plurality of perforation clusters within the fracture stage. The closest match between the injection distribution across the plurality of perforation clusters within the fracture stage to the target injection distribution across the plurality of perforation clusters within the fracture stage is determined based on a cumulative deviation between the perforation friction, a total injection rate for the plurality of perforation clusters within the fracture stage, an injection rate allocation for the plurality of perforation clusters within the fracture stage, or any combination thereof.

As an example, in one embodiment, determining the quantity of perforation holes for each perforation cluster of the plurality of perforation clusters within the fracture stage further comprises using parameters to represent a quantity of perforation clusters within the fracture stage, a spacing between the quantity of perforation clusters within the fracture stage, a diameter of the perforation holes for the quantity of perforation clusters within the fracture stage, a perforation hole erosion value, a perforation friction pressure target, a perforation phasing configuration, an injection pump rate, an injection fluid density, a fracture net pressure, a fracture height, and a fracture closure pressure. The term "using" could be inputting, prepopulating, receiving, or any other method to define these parameters in the tool.

As an example, in one embodiment, determining the injection distribution across the plurality of perforation clusters within the fracture stage further comprises using parameters to represent a quantity of perforation clusters within the fracture stage, a spacing between the quantity of perforation clusters within the fracture stage, a diameter of the perforation holes for the quantity of perforation clusters within the fracture stage, the quantity of perforation holes for the quantity of perforation clusters within the fracture stage, a perforation hole erosion value, a perforation phasing configuration, an injection pump rate, an injection fluid density, a fracture net pressure, a fracture height, and a fracture closure pressure. The term "using" could be inputting, prepopulating, receiving, or any other method to define these parameters in the tool.

Figure 13:
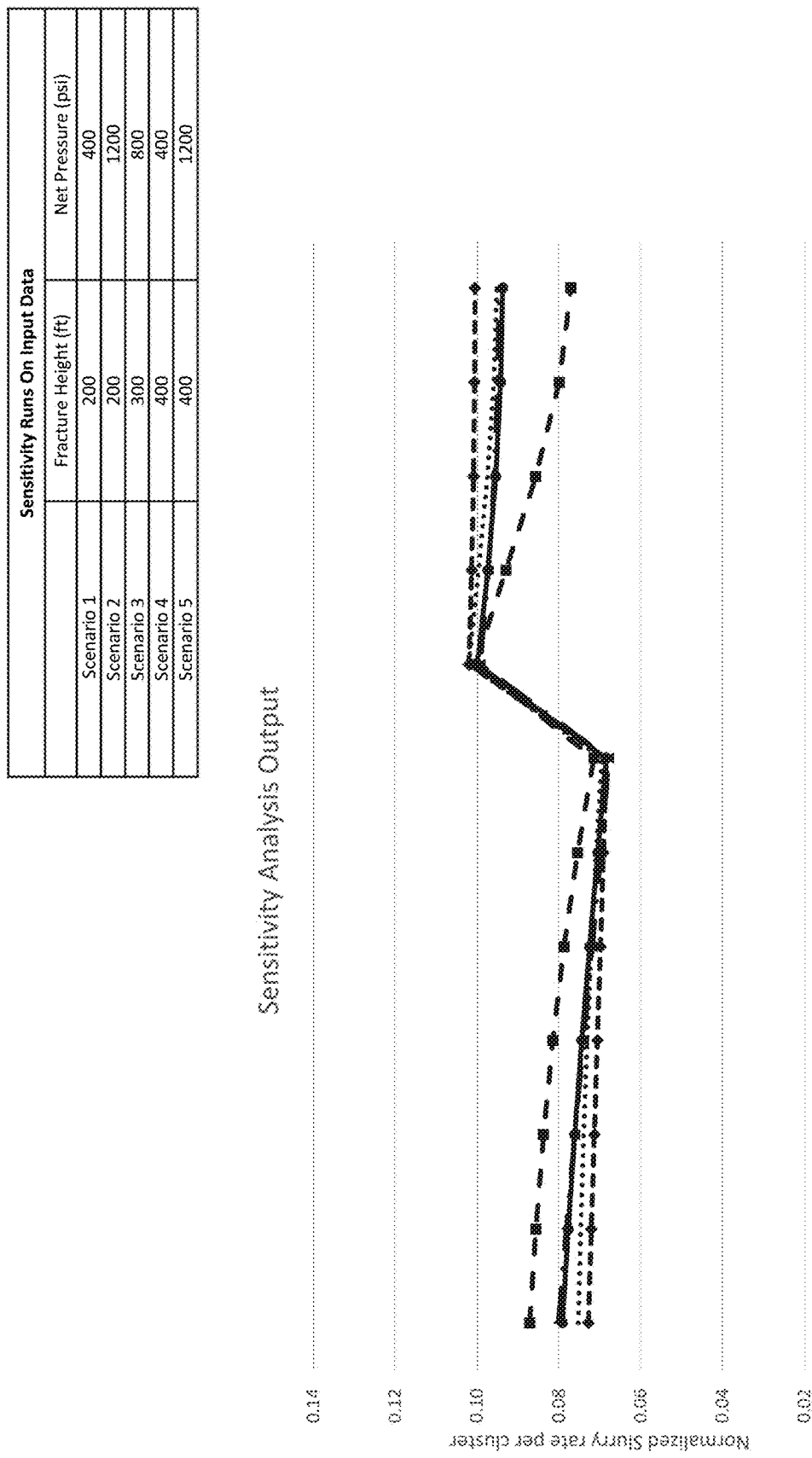
FIG. 13 illustrates one embodiment of sensitivity analysis output.
Figure 14:
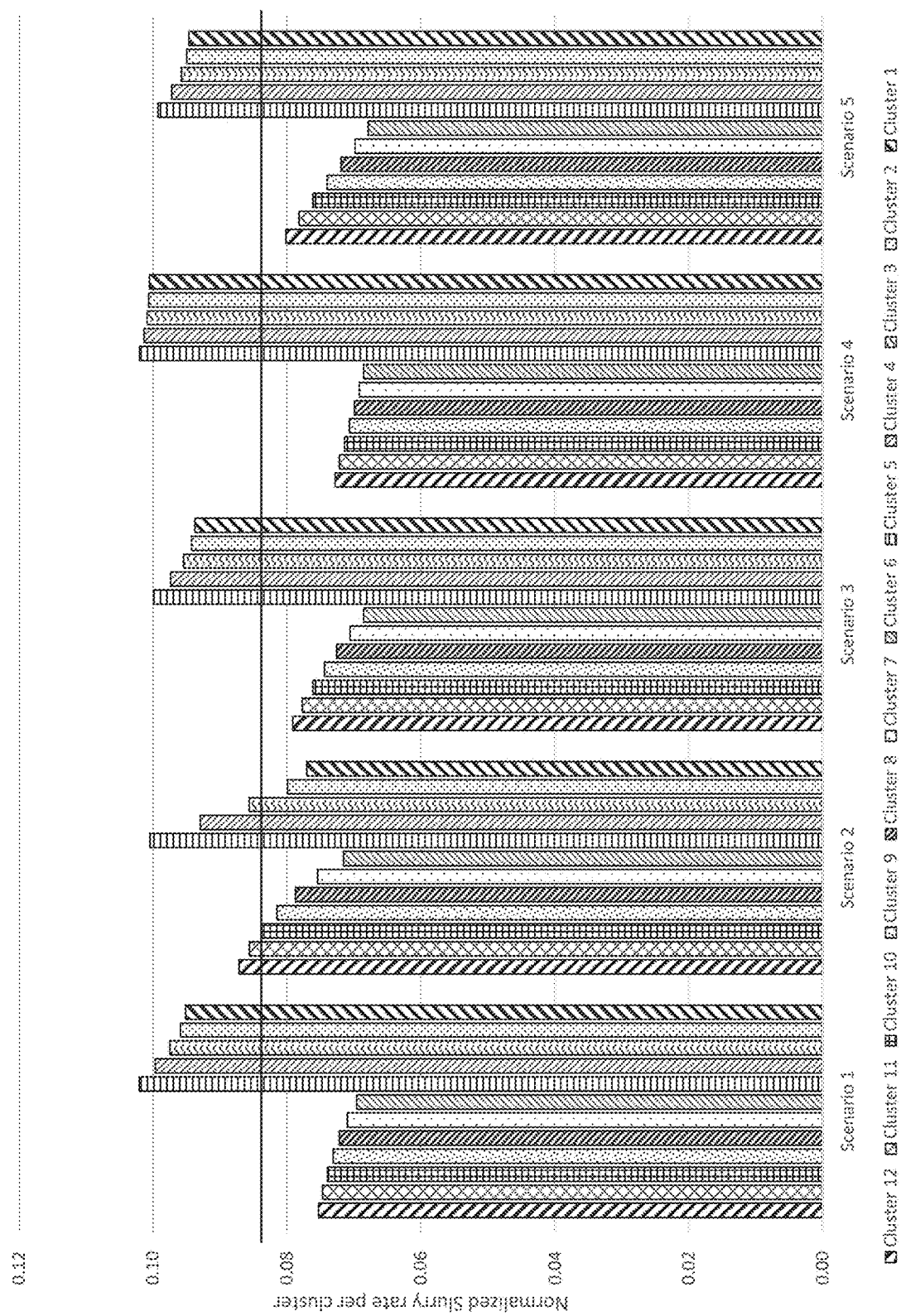
FIG. 14 illustrates another embodiment of sensitivity analysis output.

In some embodiments, the method 300 includes performing a sensitivity analysis on the hydraulic fracture completion configuration using combinations of multiple values of the fracture net pressure, of fracture height, or both. FIG. 13 illustrates one embodiment of sensitivity analysis output. FIG. 14 illustrates another embodiment of sensitivity analysis output. FIG. 4F illustrates a flowchart of one embodiment of method of determining a slurry distribution per cluster for given perforation/completion design, for example, using a sensitivity analysis module such as the module 230. FIG. 26 also illustrates a screenshot related to sensitivity analysis.

Regarding injection pump rate, in some embodiments, the method 300 includes determining an injection pump rate across the plurality of perforation clusters within the fracture stage for the hydraulic fracture completion configuration. In some embodiments, determining the injection pump rate across the plurality of perforation clusters within the fracture stage further comprises using parameters to represent a minimum injection pump rate, a maximum injection pump rate, a minimum diameter of the perforation holes for the quantity of perforation clusters within the fracture stage, and a maximum diameter of the perforation holes for the quantity of perforation clusters within the fracture stage. The term "using" could be inputting, prepopulating, receiving, or any other method to define these parameters in the tool. In some embodiments, the method 300 includes determining an injection pump rate across at least one additional fracture stage for the hydraulic fracture completion configuration. For example, the injection pump rate across at least one additional fracture stage may be determined in a similar manner as indicated above.

Regarding friction loss, in some embodiments, the method 300 includes calculating a friction loss limit for the fracture stage of the wellbore. In some embodiments, the method 300 includes calculating a friction loss limit for at least one additional fracture stage for the hydraulic fracture completion configuration. In some embodiments, the friction loss limit is calculated based on a maximum allowable surface pressure, a hydrostatic pressure, the fracture net pressure, the fracture closure pressure, a net wellbore pressure, a target perforation friction, or any combination thereof. In some embodiments, the method 300 includes calculating an injection pump rate for each fracture stage of the wellbore based on the friction loss limit. In some embodiments, the method 300 includes updating the hydraulic fracture completion configuration based on the injection pump rate for each fracture stage of the wellbore.

As indicated hereinabove, some embodiments may involve multiple fracture stages. Thus, in some embodiments, the method 300 may include calculating the stress profile across the plurality of perforation clusters for multiple fracture stages of the wellbore; calculating the fracture pressure parameter for each perforation cluster of the plurality of perforation clusters for the multiple fracture stages of the wellbore; and determining the quantity of perforation clusters in the plurality of the perforation clusters for the multiple fracture stages, the quantity of perforation holes for each of the plurality of perforation clusters for the multiple fracture stages, the diameter of the perforation holes for each perforation cluster of the plurality of perforation clusters for the multiple fracture stages, the spacing between each perforation cluster of the plurality of perforation clusters for the multiple fracture stages, the injection distribution across the plurality of perforation clusters for the multiple fracture stages, or any combination thereof, for the hydraulic fracture completion configuration based on the calculated fracture pressure parameter for each perforation cluster of the plurality of perforation clusters for the multiple fracture stages of the wellbore.

Figure 15A:
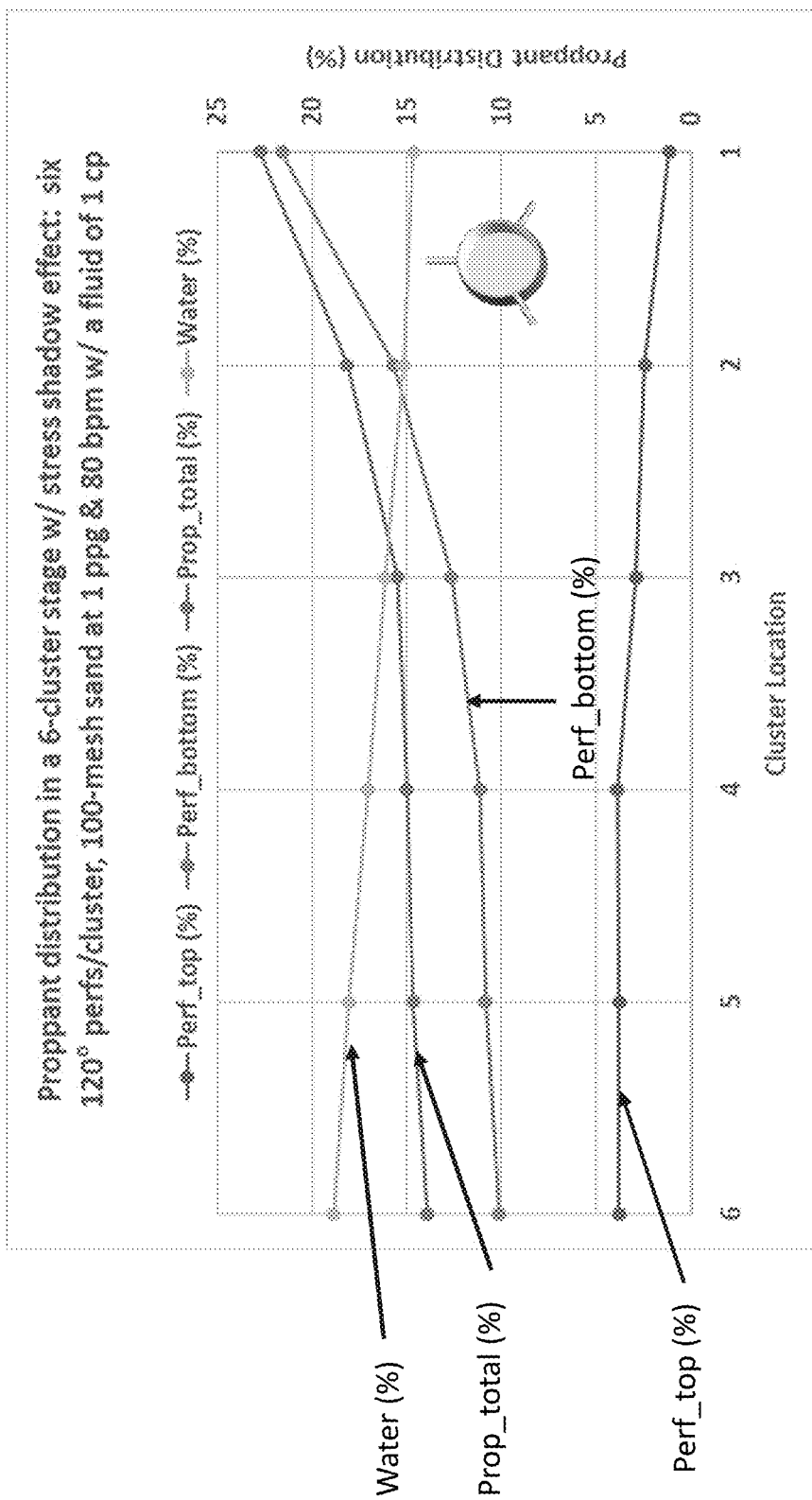
FIGS. 15A, 15B, 15C, and 15D illustrates various examples of a layout.
Figure 15B:
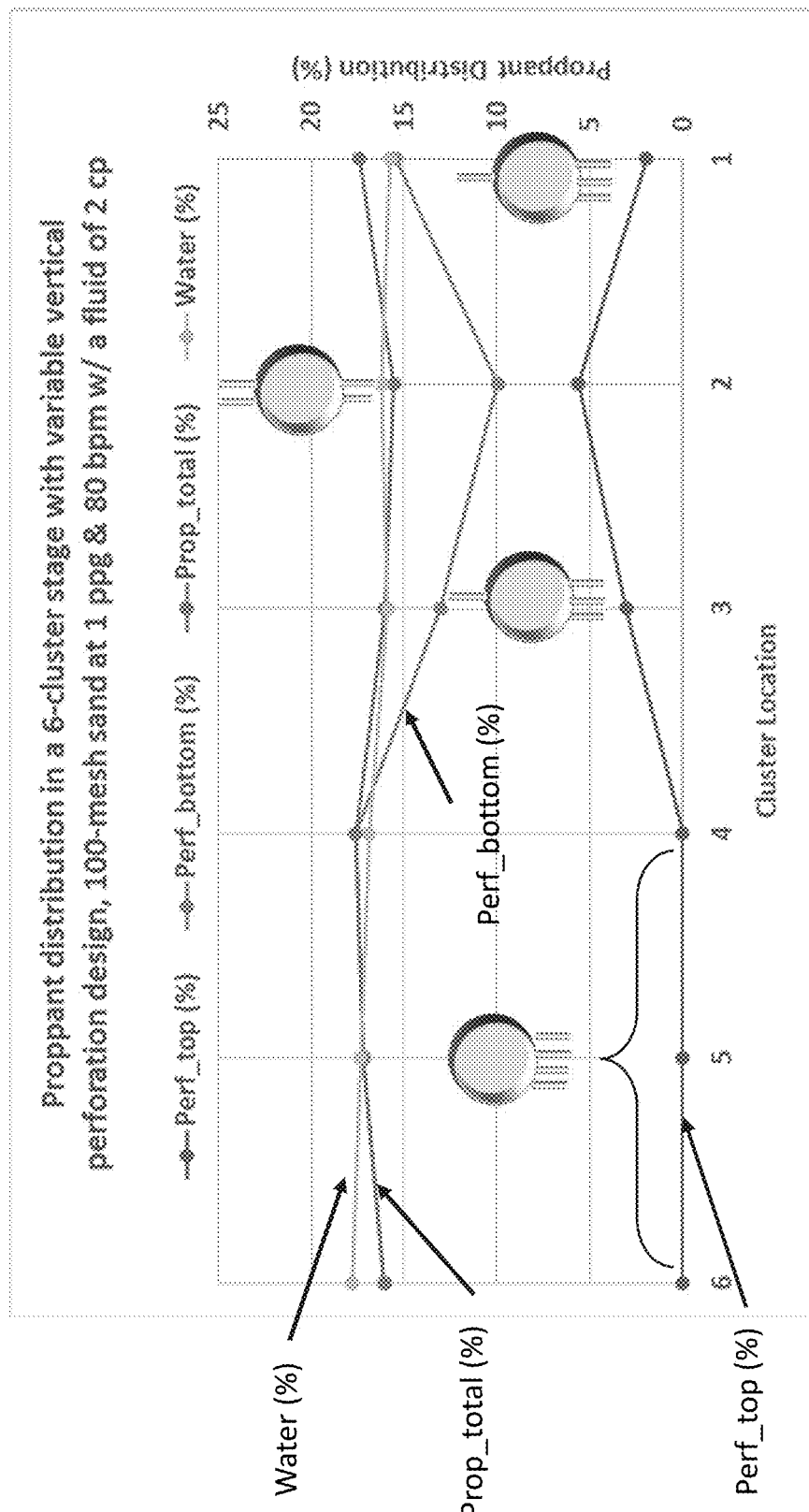
Figure 15C:
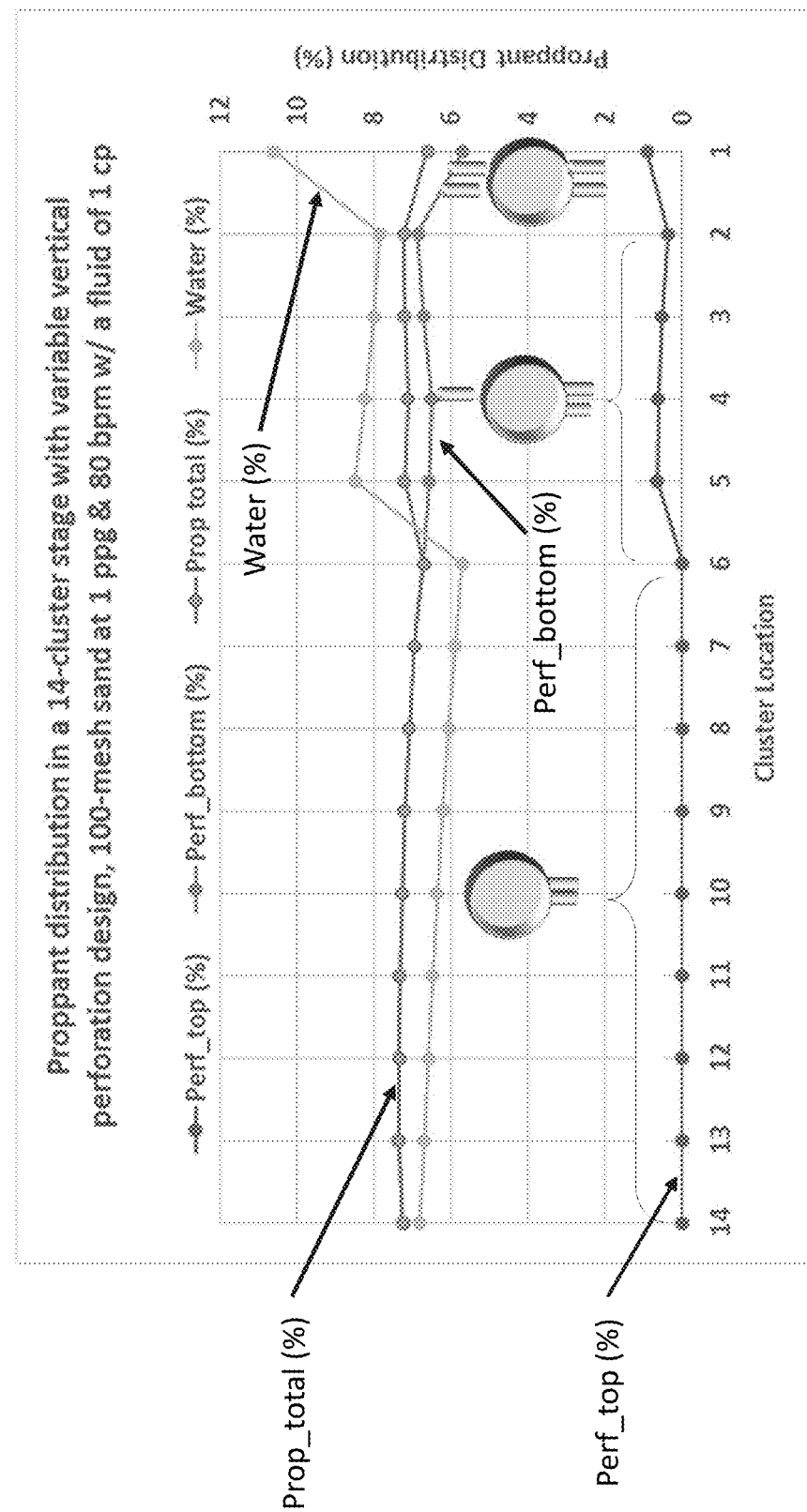
Figure 15D:
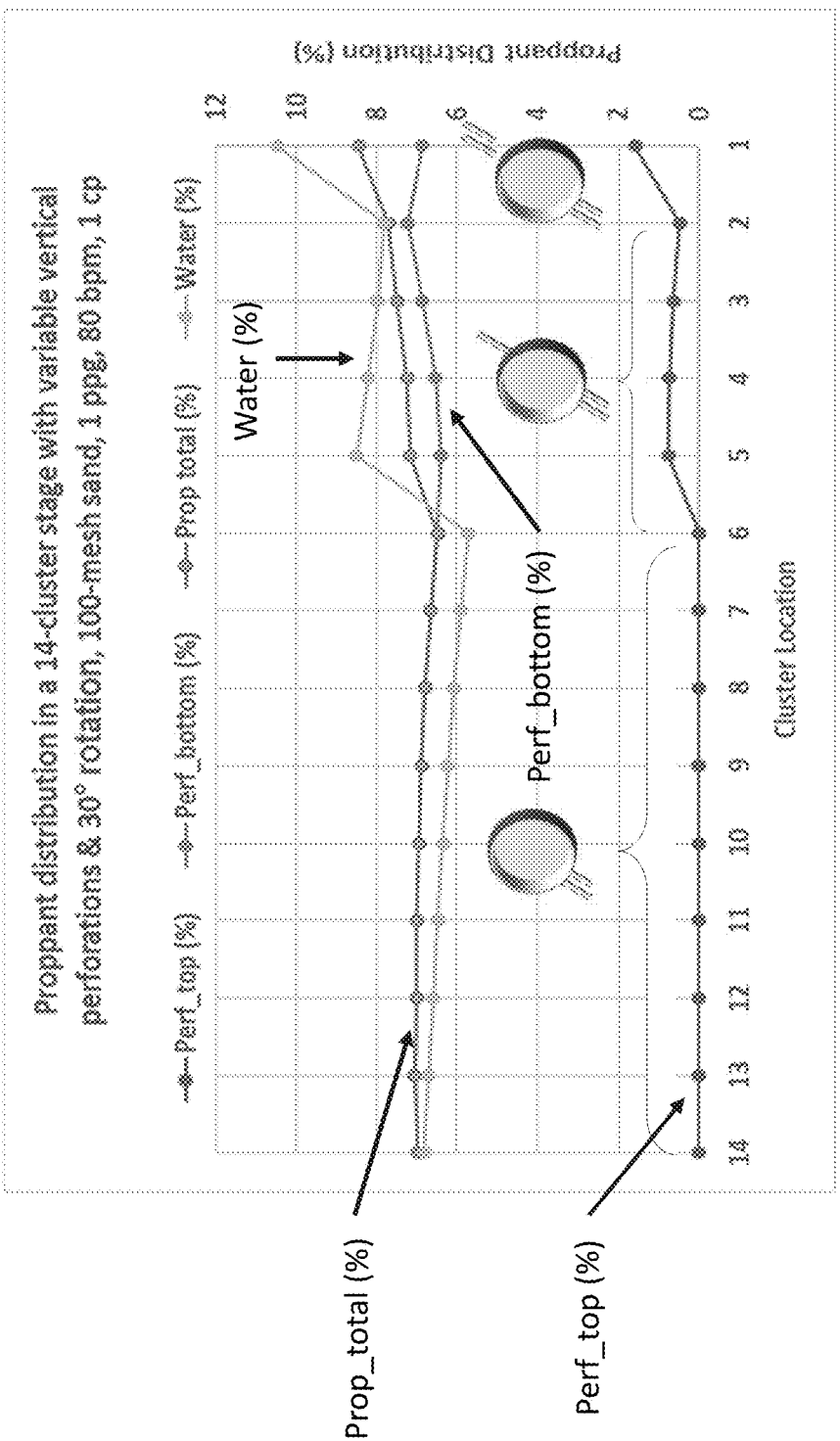
Figure 17A:
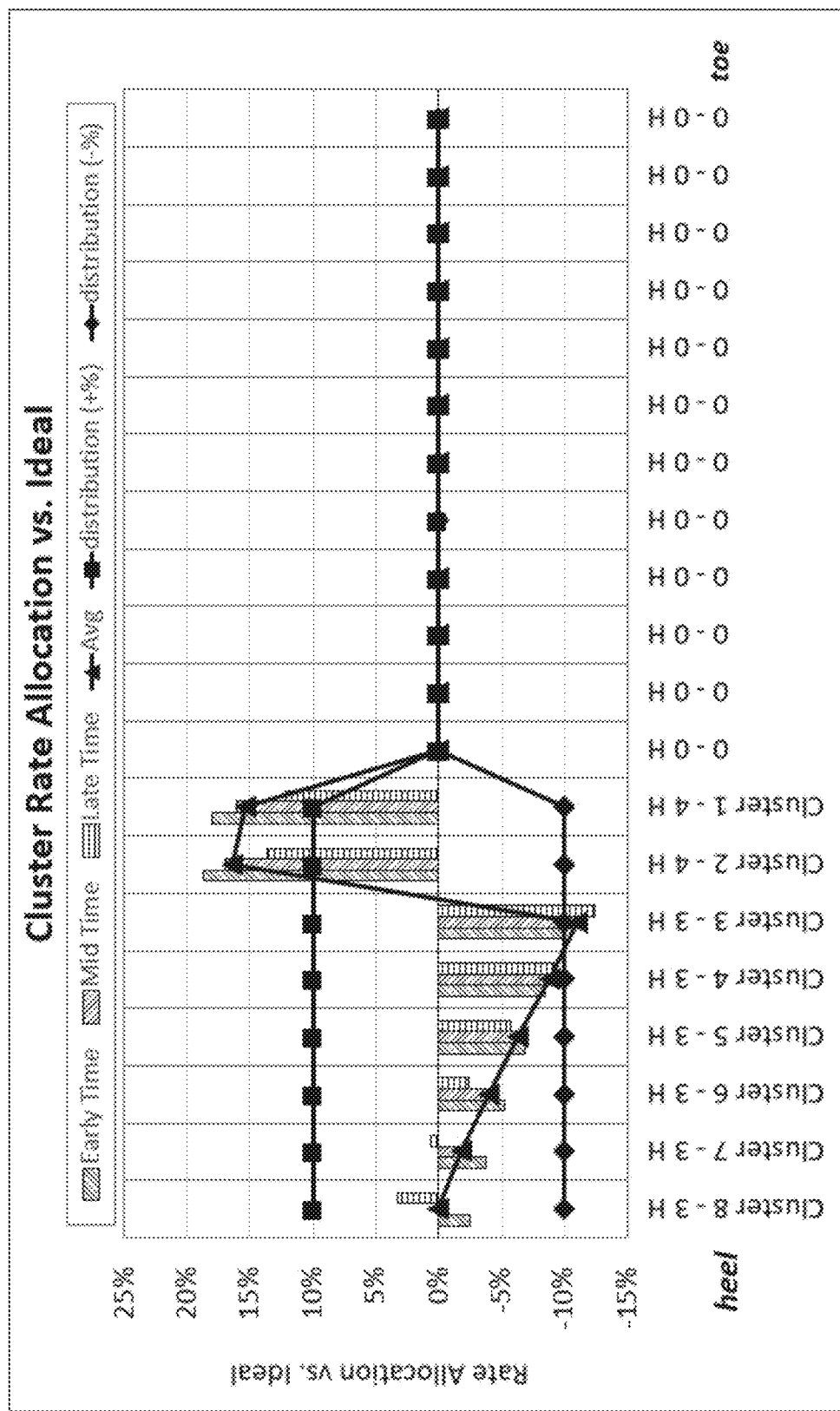
Figure 17B:
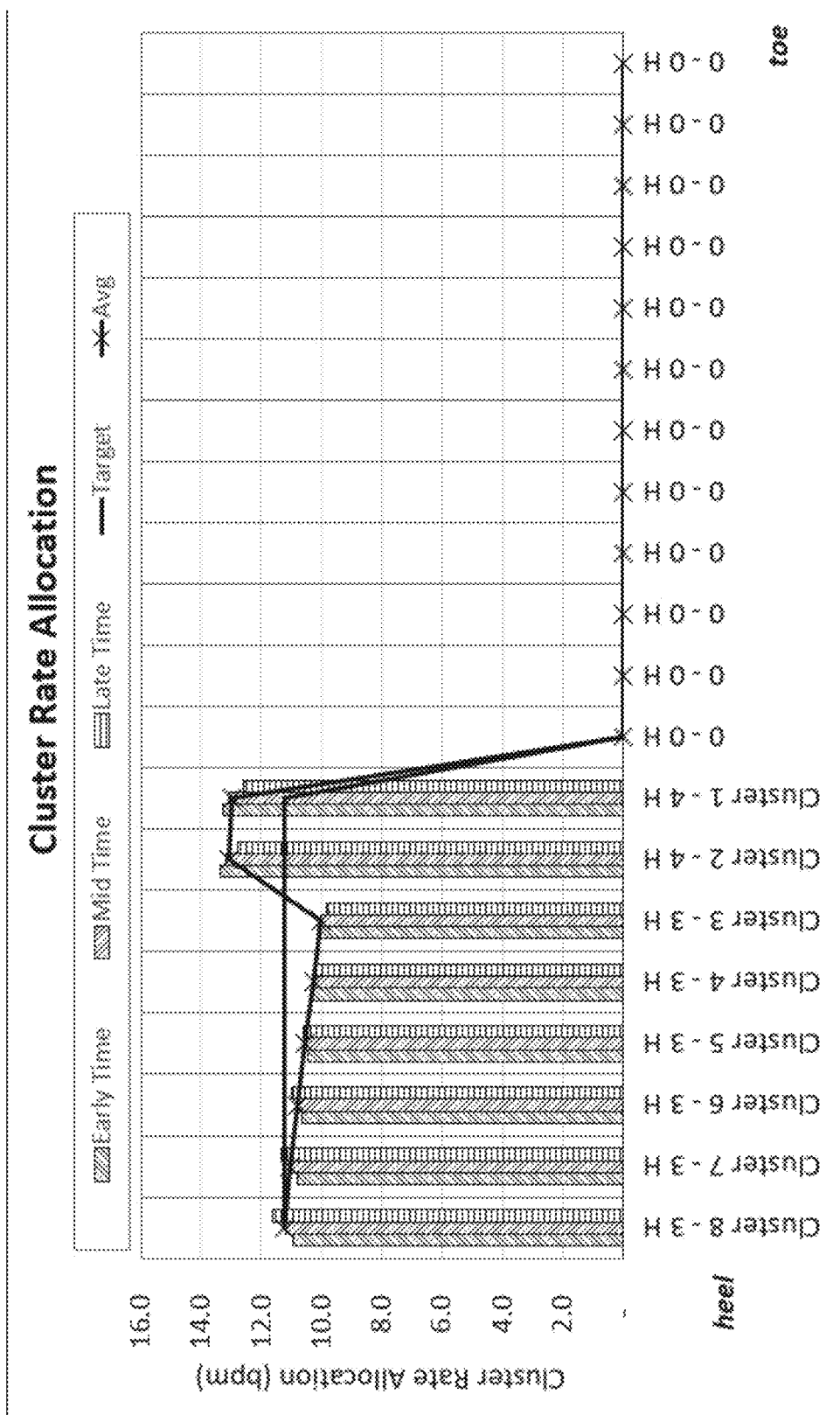
Figure 17C:
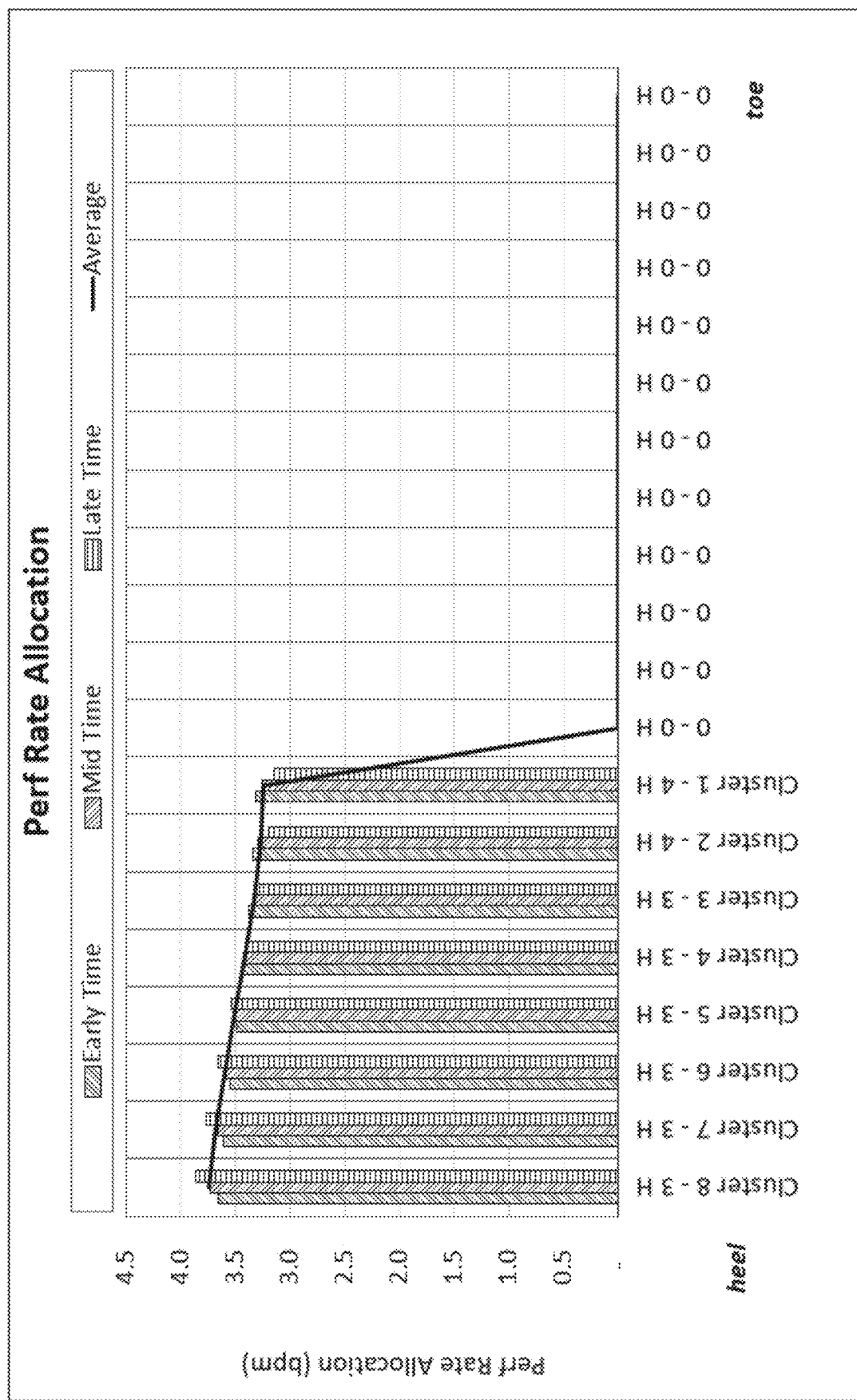
Figure 20A:
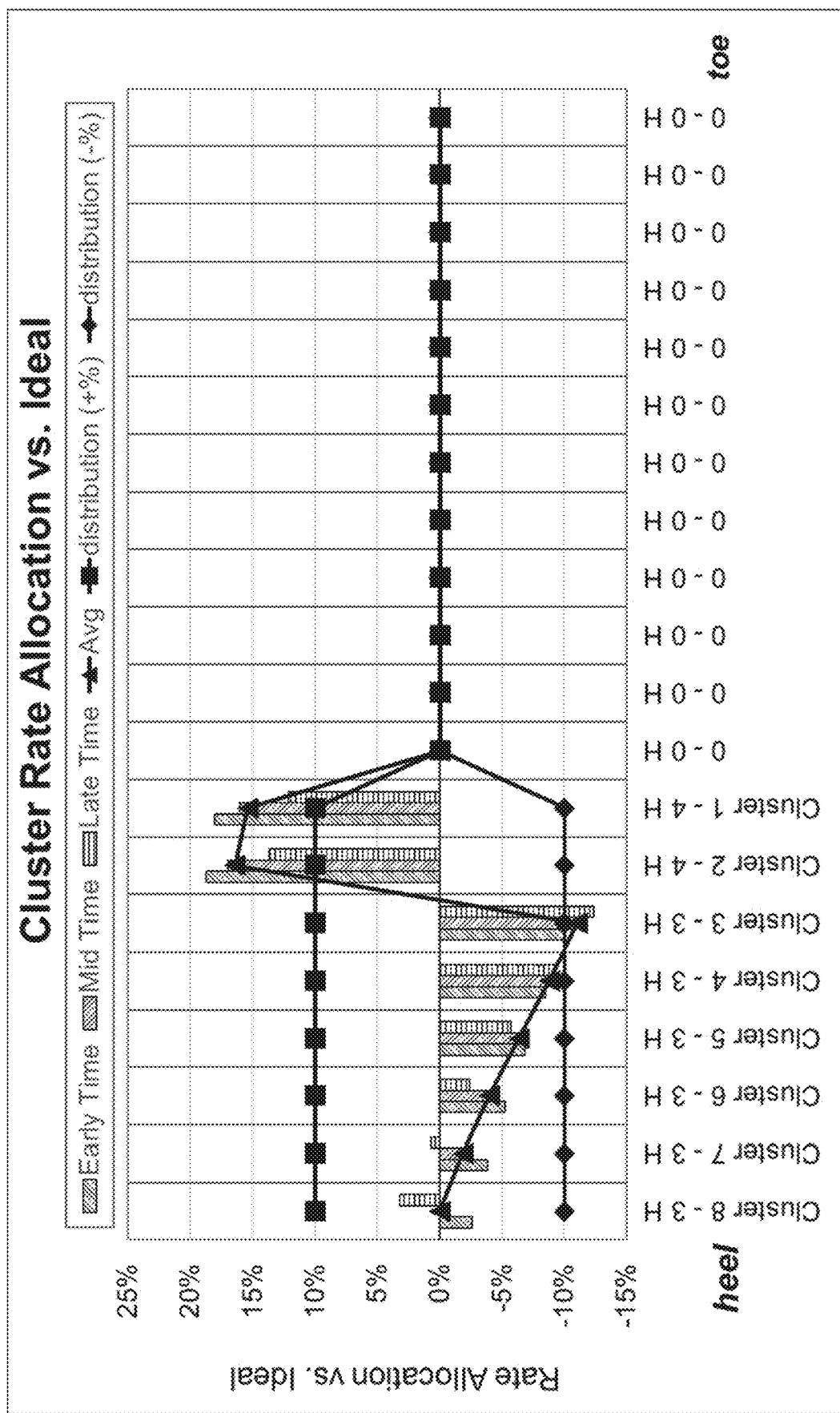
Figure 20B:
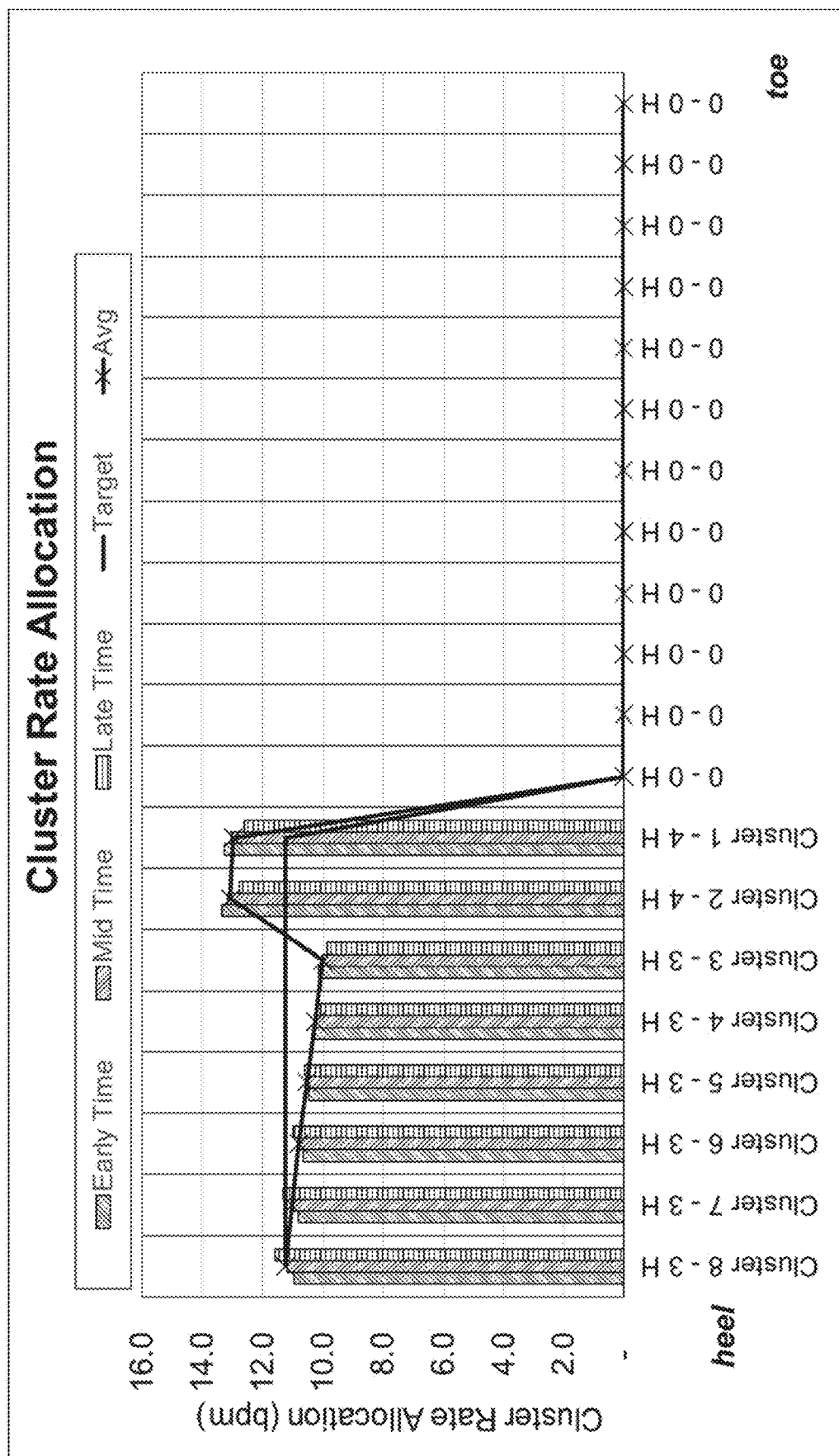
Figure 20C:
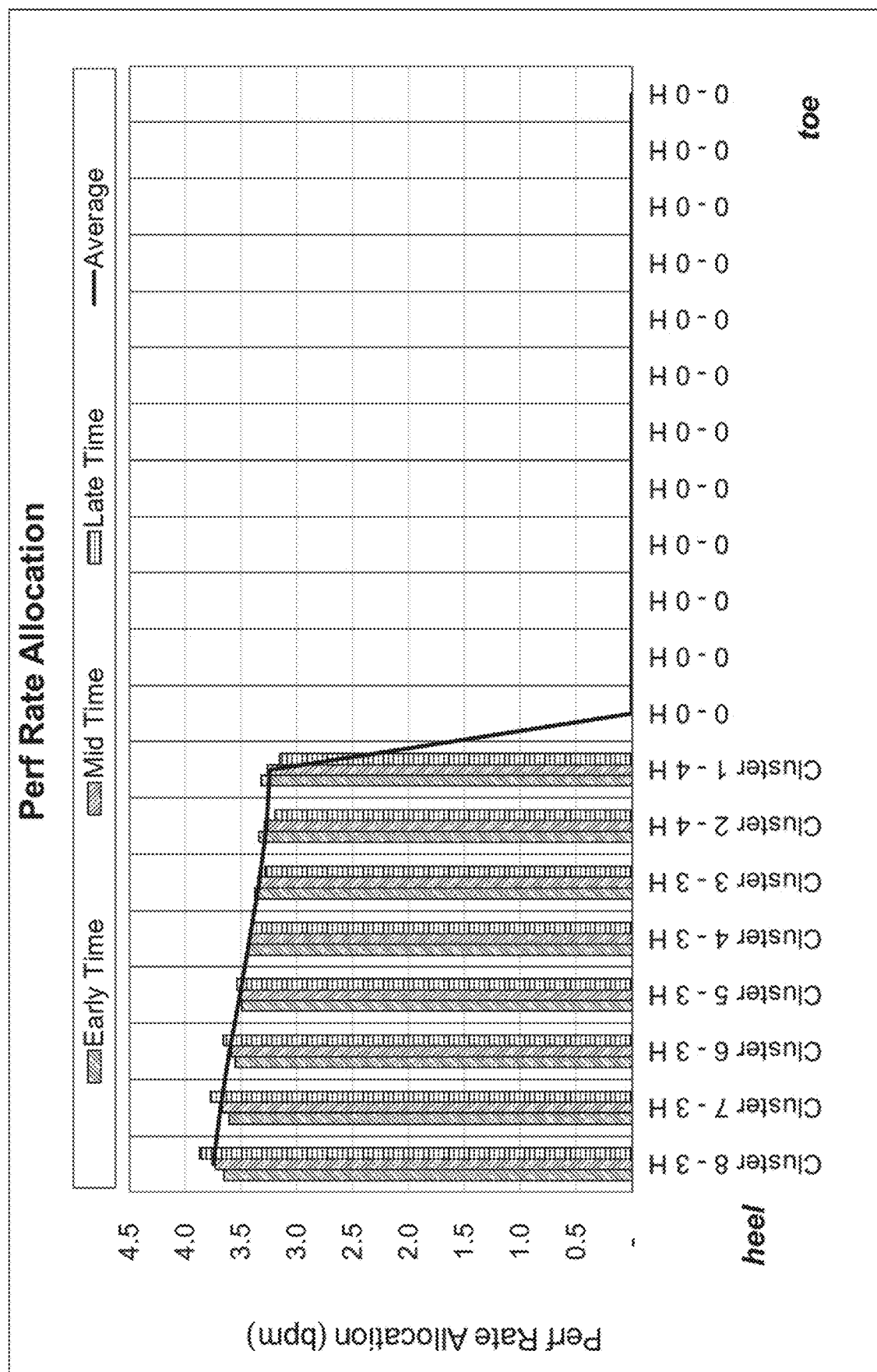
Figure 21A:
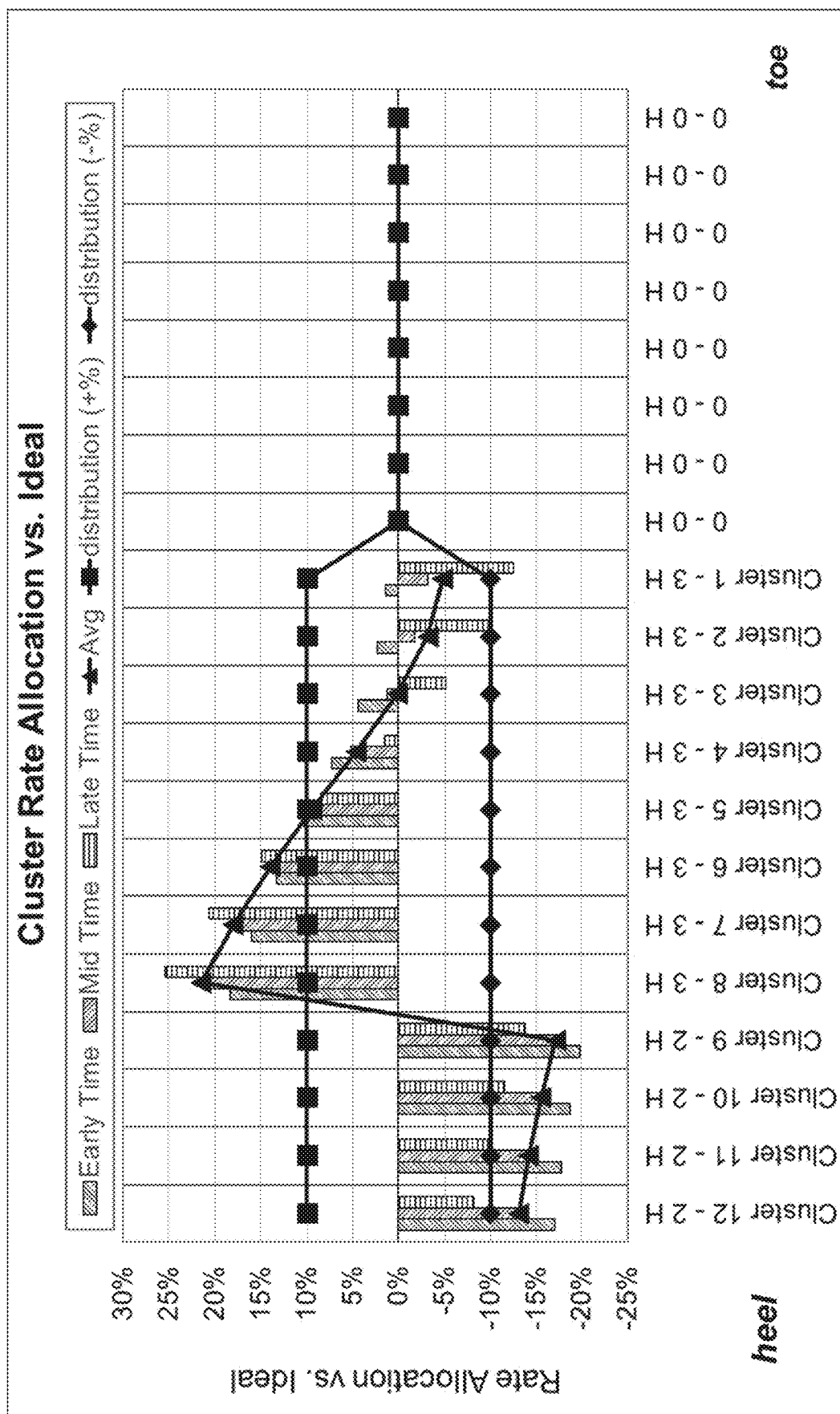
Figure 21B:
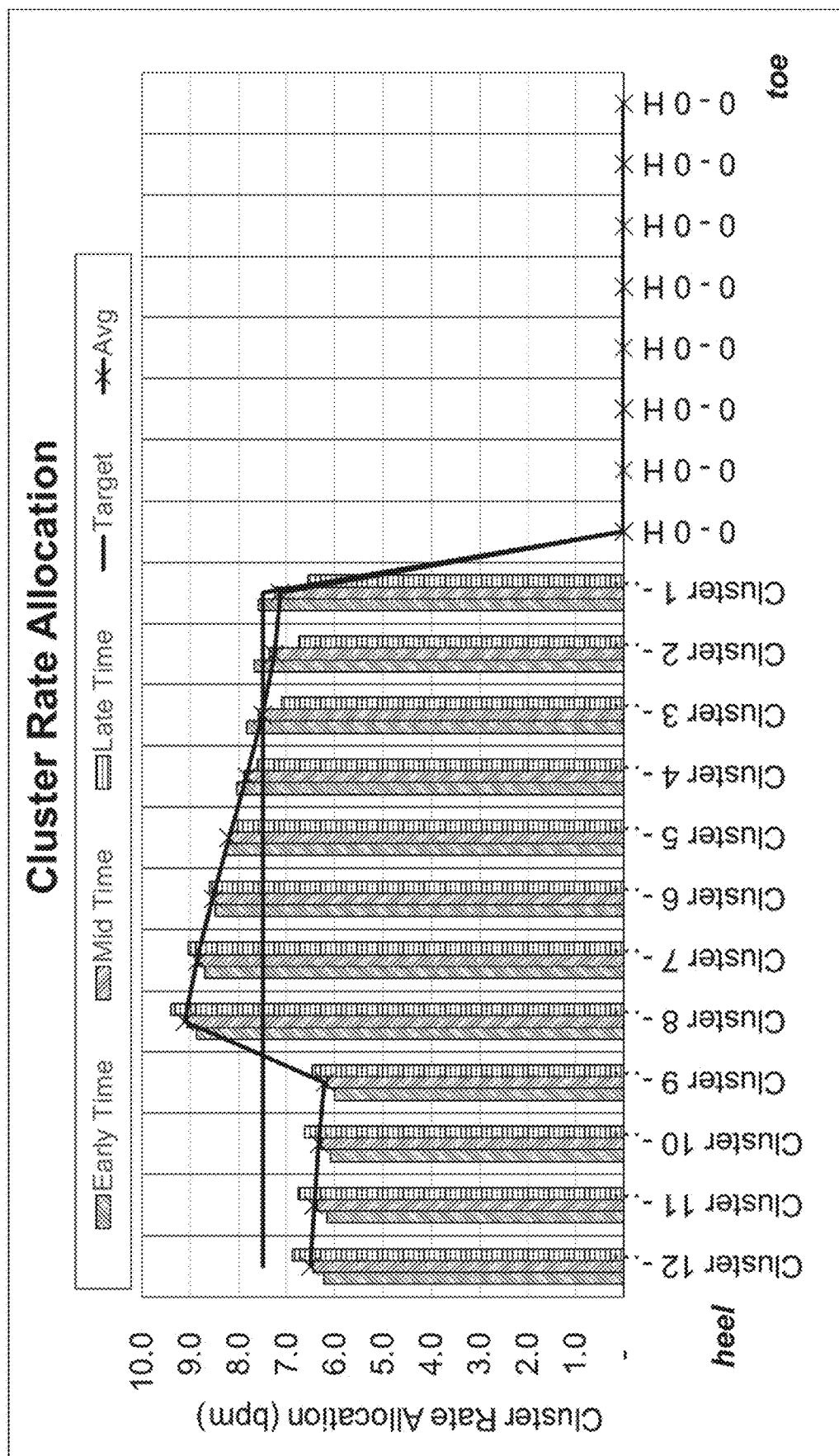
Figure 21C:
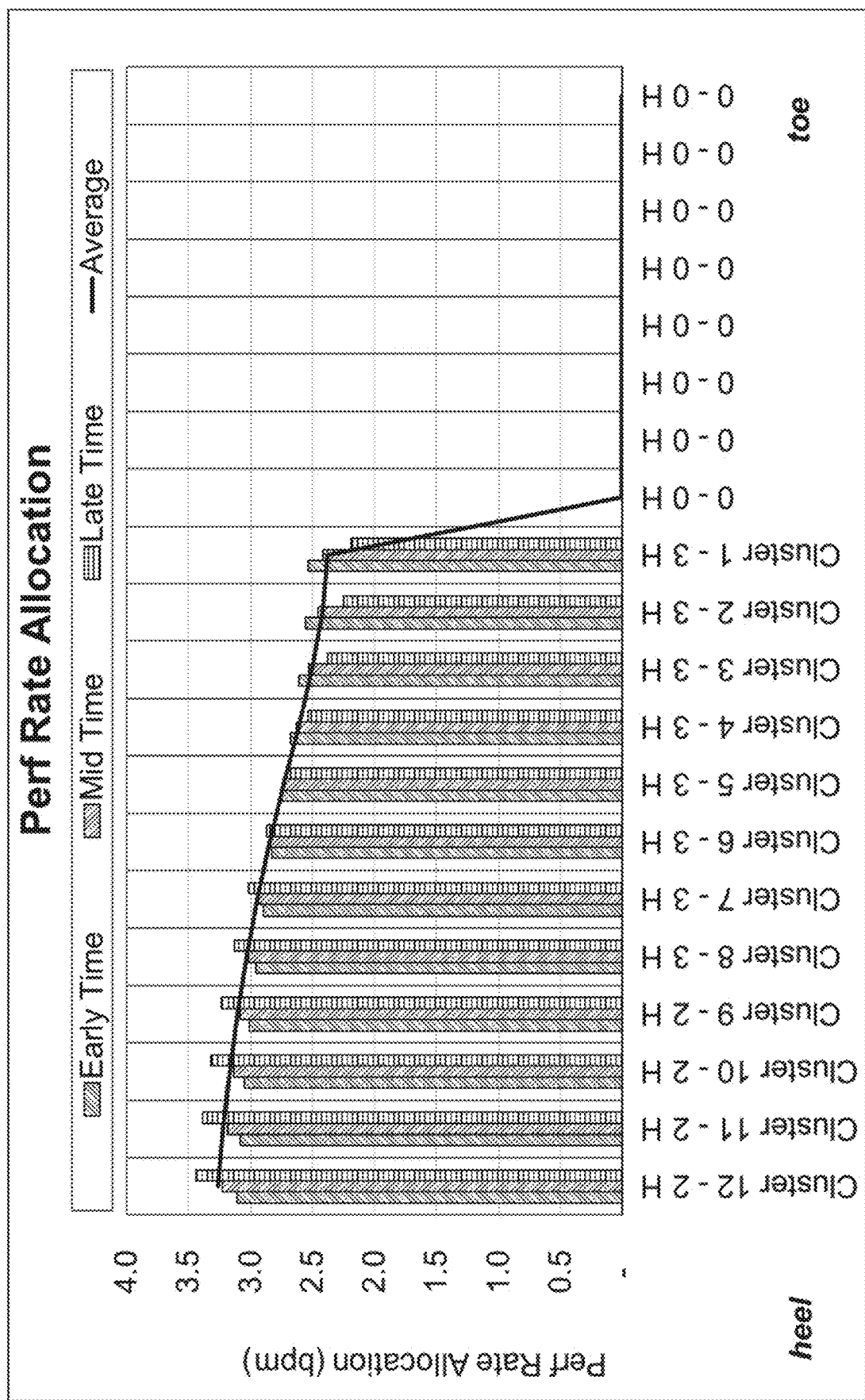
Figure 23A:
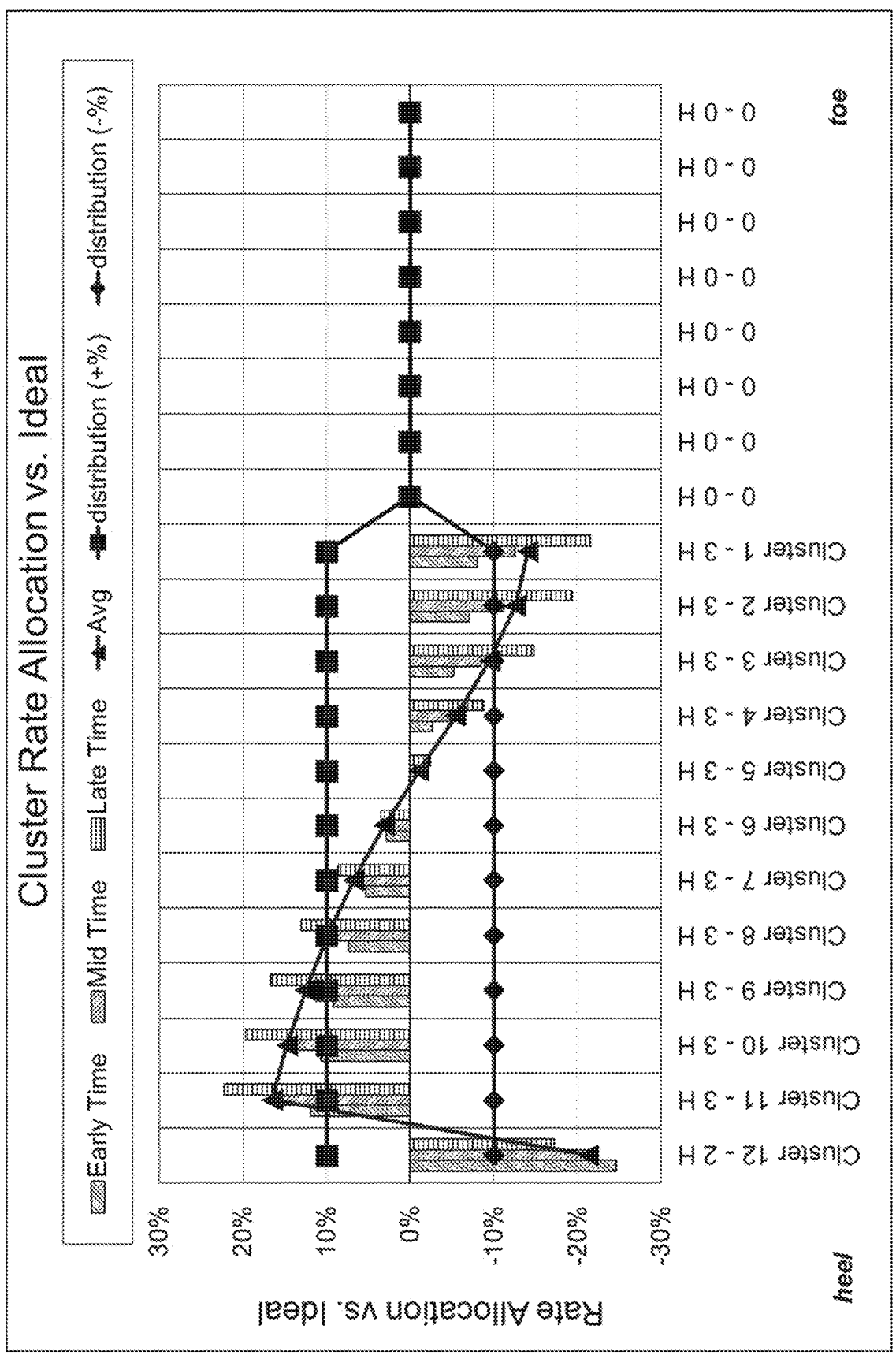
Figure 23B:
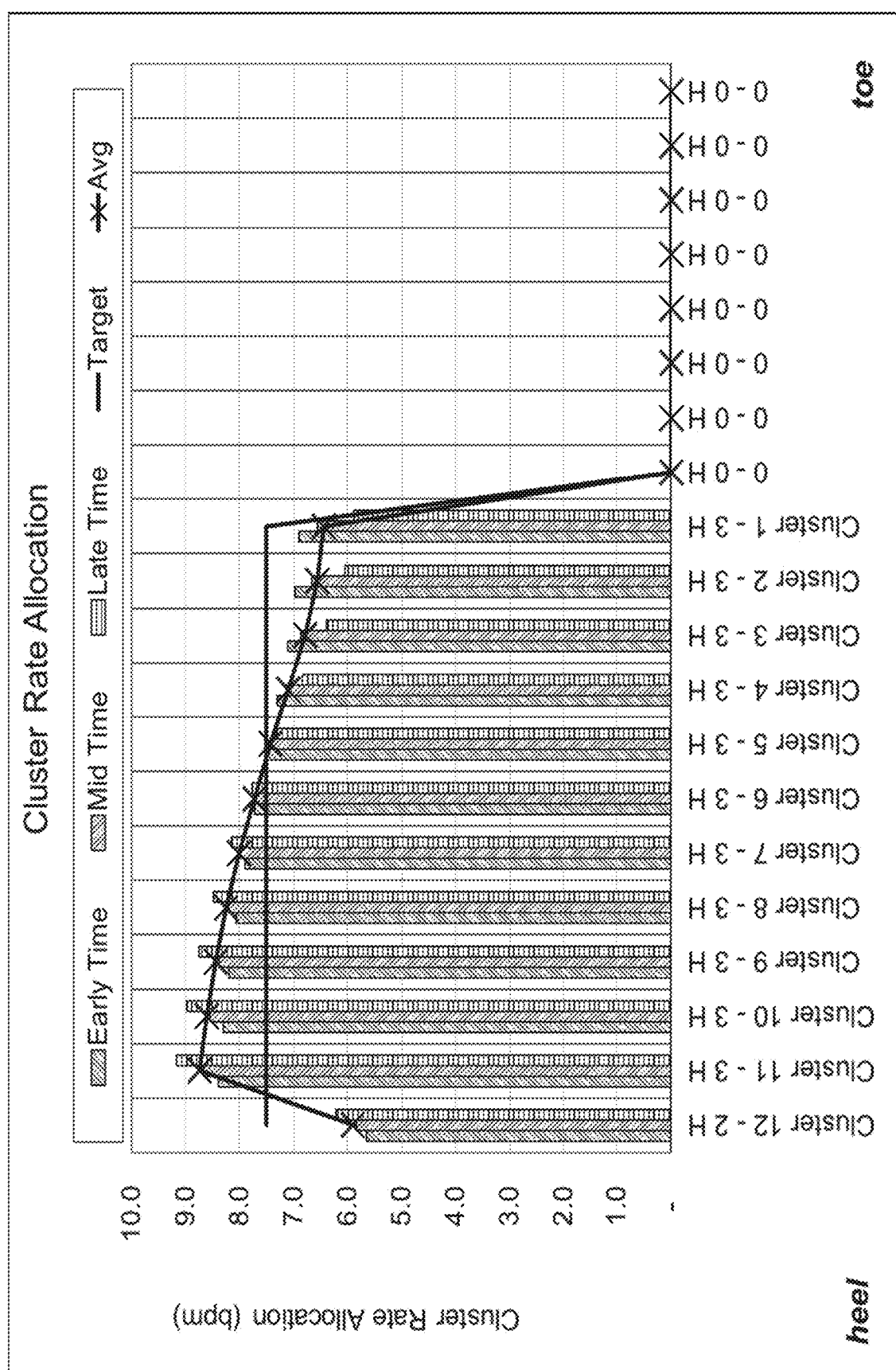
Figure 23C:
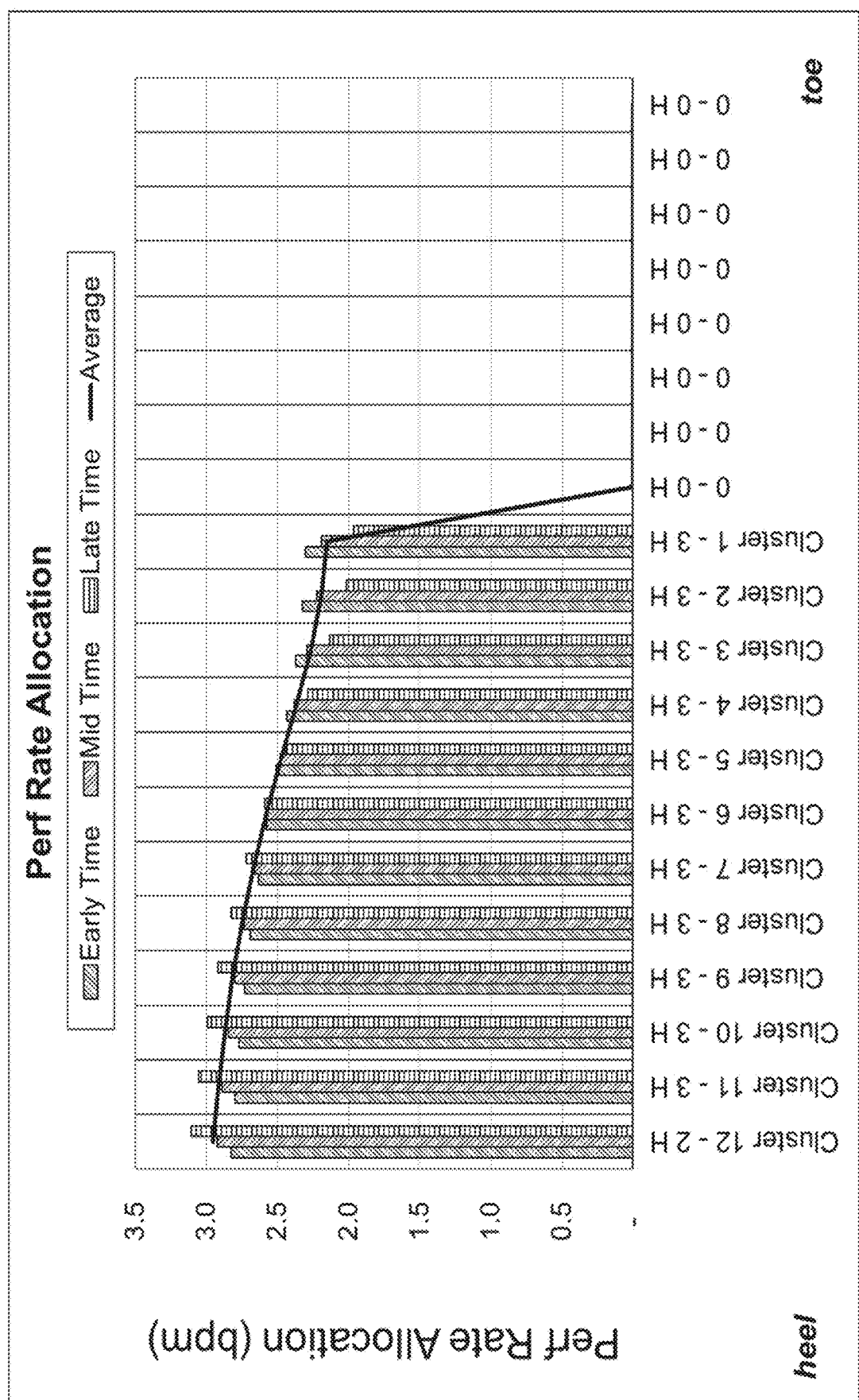
Figure 25:
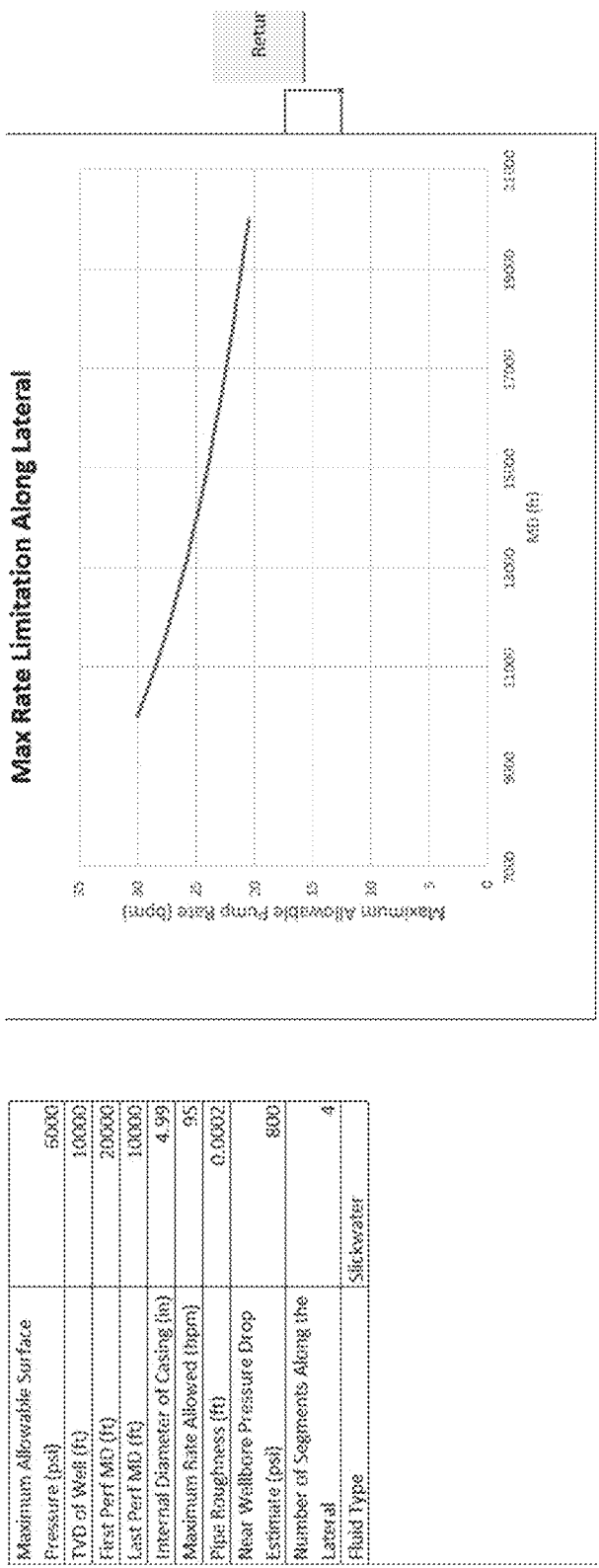
Figure 27A:
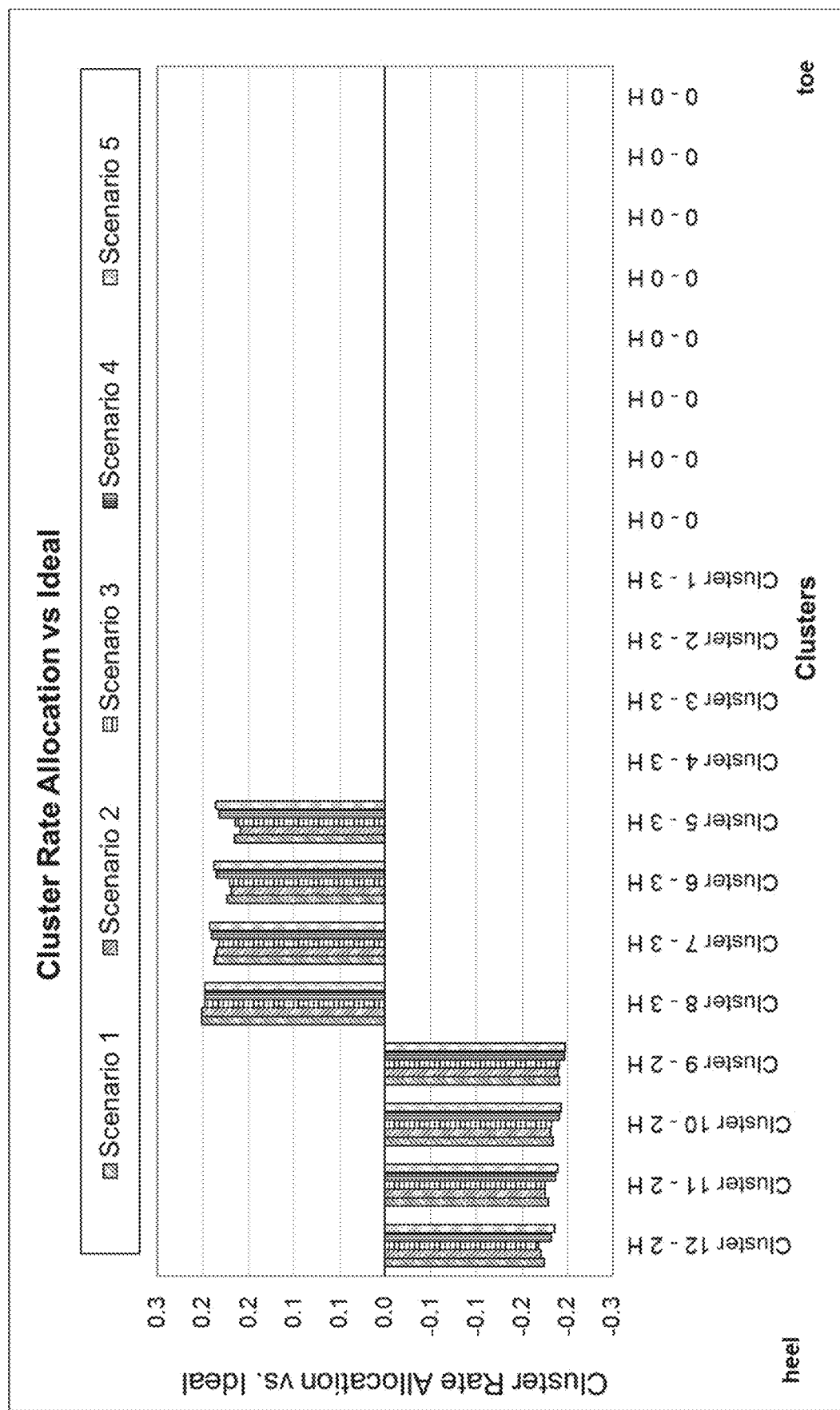
Figure 27B:
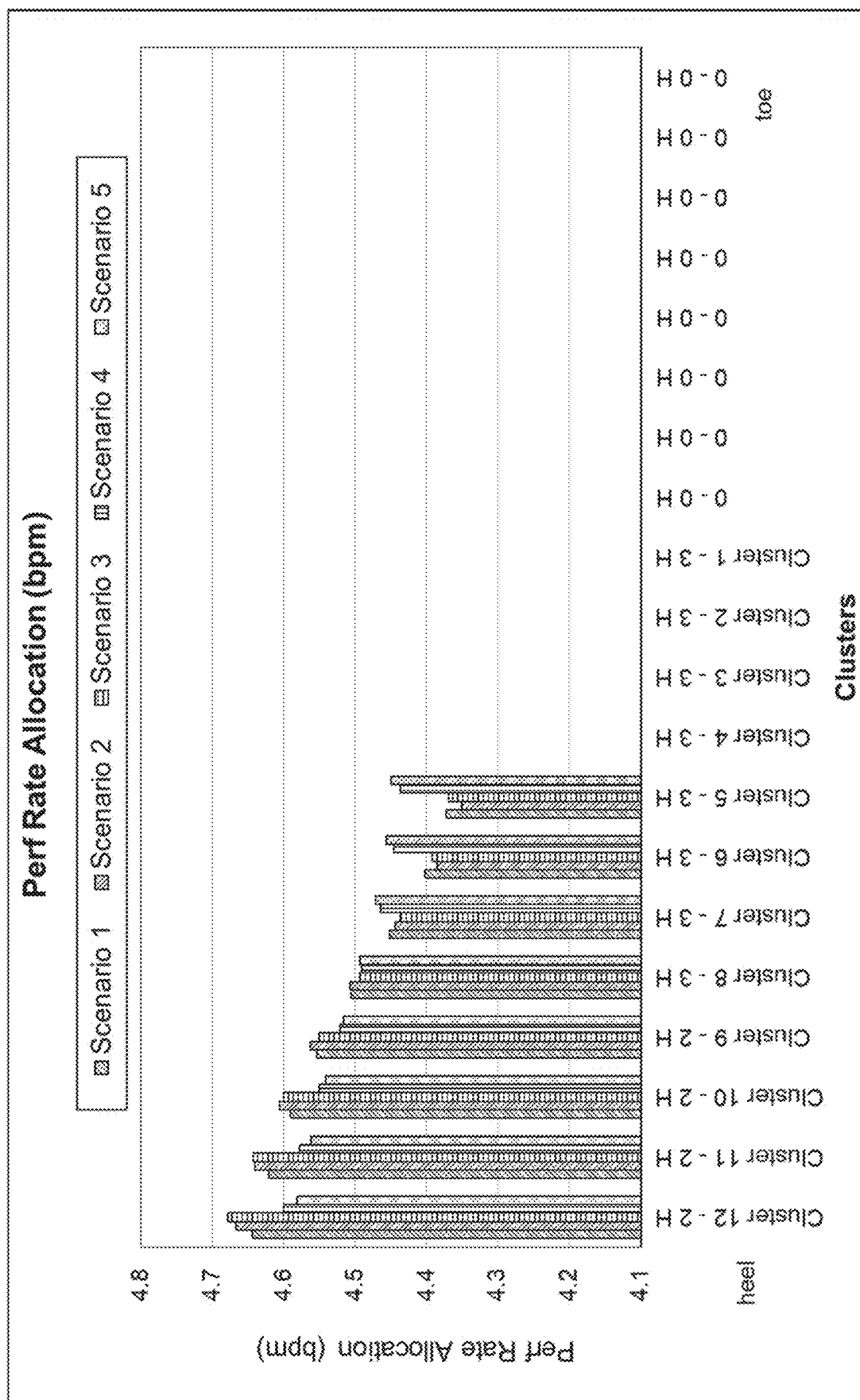
Figure 28:
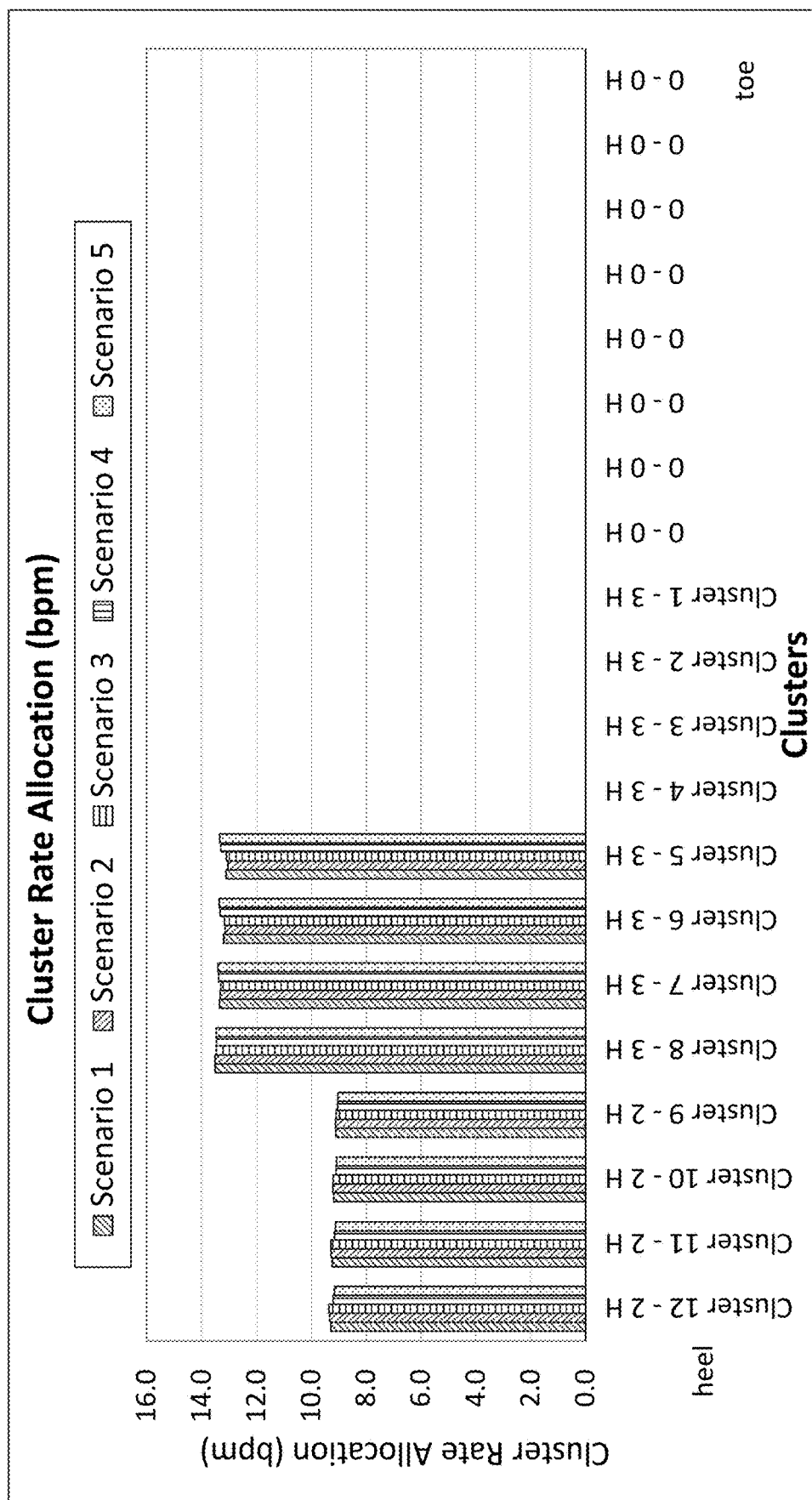

At 320, the method 300 may also include determining a layout for the perforation holes of each perforation cluster of the plurality of perforation clusters within the fracture stage for the hydraulic fracture completion configuration and/or determining a layout for the perforation holes of each perforation cluster of at least one other fracture stage for the hydraulic fracture completion configuration. In some embodiments, determining the layout includes determining orientation (e.g., azimuth) of at least one perforation hole. In some embodiments, determining the layout includes obtaining a more uniform fluid distribution across perforation clusters, obtaining a more uniform proppant distribution across perforation clusters, or any combination thereof. In some embodiments, determining the layout includes optimizing fluid distribution (e.g., towards more uniform), optimizing proppant distribution (e.g., towards more uniform), or any combination thereof. For example, determining the layout may include determining the location of the perforation holes on the wellbore. The term optimizing may include improving, determining (e.g., determining location of a perforation hole(s) that leads to more uniform), etc. In some embodiments, 320 may be performed after 315, as illustrated in FIG. 3. Layout examples are illustrated in the FIGS. 15A, 15B, 15C, and 15D. For example, FIG. 15B illustrates at cluster location2: four perforation holes with two perforation holes towards the top of wellbore crossection and with two perforation holes towards the bottom of the wellbore crossection. On the other hand, at cluster location5, four perforation holes are illustrated towards the bottom of the wellbore crossection. On the other hand, at cluster locations 1 and 3, four perforations holes are illustrated with one perforation hole towards the top of the wellbore crossection and three perforation holes towards the bottom of the wellbore crossection.

FIG. 1B illustrates one example with an aim to create equal fracture geometry with equal fluid distribution in each cluster. FIGS. 16-28 illustrate various screenshots and output that may be generated consistent with the instant disclosure. FIGS. 4A-4G illustrate various flowcharts of various embodiments of methods consistent with the principles of the present disclosure. Furthermore, embodiments consistent with the principles of the present invention may be performed after one or more perforations holes have been made in the wellbore (e.g., after a fracture stage has been completed) so as to improve the subsequent fracture stage or subsequent fracture stages, and in this scenario, data from this wellbore may be utilized. Additionally, embodiments consistent with the principles of the present invention may be performed before any perforations holes have been made in the wellbore so as to improve the first fracture stage (and potentially the subsequent fracture stage or subsequent fracture stages), and in this scenario, data from a neighboring wellbore(s) and/or from the subterranean formation may be utilized.

Additionally, FIGS. 16-28 illustrate various screenshots and output that may be generated consistent with the instant disclosure. Indeed, a person of ordinary skill in the art may appreciate the negative impact of non-uniform fracture fluid distribution/placement across each cluster due to variation in stress profile across each cluster behind wellbore in formation because of stress shadow and other heterogeneity. The different stress across each cluster location results in varying fluid distribution/placement across each cluster and inside each fracture during hydraulic fracturing treatment. However, the embodiments provided herein may be utilized for calculation of stress shadow for the given well completion design as function of fracture parameters (fracture height, net pressure) and fracture placement design (cluster spacing, number of clusters per fracture stage). Using the perforation design (perforation friction) to counter the stress shadow with aim to achieve uniform stress environment across all cluster so uniform fracture fluid distribution can be achieved. The key optimized parameters are perforation diameter, perforation hole count per cluster, fracture pump rate, and its variation accounting for change in perforation diameter with proppant erosion.

PROPPANT DISTRIBUTION: Multi-stage fracturing is one of the most commonly used completion methods for horizontal wellbores in unconventional reservoirs. However, the proppant is commonly unevenly distributed across the perforation clusters in each stage, with a few clusters taking most of the injected proppant. This inefficient proppant placement is very likely to result in inadequate reservoir stimulation and poor well performance. Computational Fluid Dynamics (CFD) is a numerical method capable of modeling proppant transport in horizontal wellbores with great detail. CFD can be used to improve perforation and fracturing designs and achieve near-uniform proppant distribution along a stimulation stage. However, regardless of its robustness, conducting a DOE (design of experiments) using CFD modeling of two-phase fluid-solid flow is challenged by the very expensive computational cost when a full-scale stage with long laterals is modeled. Although some conventional processes can be used to accelerate CFD calculations and DOE, these conventional processes do not really account for the full impact of azimuth.

Indeed, non-uniform proppant distribution/placement as compared to fracture fluid distribution/placement across each cluster in wellbore due to variation in fluid and proppant dynamics in horizontal wellbore because of combined effect of gravity settling and proppant particle momentum (proppant and fluid not travelling together) and its variation across wellbore is challenging. In a horizontal wellbore, fluid and mixed proppant do not travel together as gravity settling and momentum mechanism of proppant impact the proppant particle's distribution within the fracture fluid slurry, and results in variation in concentration of proppant particles across cross-section as well as along wellbore (from toe to heel). With multiple perforation clusters and multiple perforation hole in each cluster, as the fluid and proppant exit wellbore through each perforation hole, it changes the flow dynamics (reduced velocity) impacting the proppant settling rate along with proppant momentum. The location of perforation across wellbore circumference (perforation azimuth such as top, bottom or any other angle from top) significantly impact the ratio of proppant particle in fluid exiting each of perforation hole.

CFD model can be used to study the impact of fluid and proppant dynamics in horizontal wellbore for well-defined cluster design (cluster spacing), perforation design (location, count, diameter), flow parameters (injection rate and fluid distribution across each perforation), fracture fluid properties (viscosity) and proppant properties (diameter, specific gravity, concentration) to evaluate the proppant and fluid distribution ratio for individual perforation and cluster. But, this modeling process takes 3-5 days to evaluate each specific case, and finding an optimum solution of perforation azimuth (location across circumference) for each perforation in each cluster to achieve uniform proppant distribution in addition to uniform fluid distribution is challenging. To reduce the modeling process time and thereby achieving optimum solution of perforation azimuth (location across circumference) for each perforation in each cluster to achieve uniform proppant distribution in addition to uniform fluid distribution, the embodiments provided herein have made some changes.

Provided herein are various embodiments of determining proppant distribution for a plurality of clusters within a fracture stage of a wellbore. The embodiments discussed herein may more efficiently determine proppant distribution during hydraulic fracture along a full multi-cluster stage based on correlations (e.g., model) developed from CFD modeling results from a single perforation. First, the embodiments provided herein model a horizontal pipe with only a single perforation or several perforations at the same azimuth to calculate proppant efficiency with various input parameters. The proppant efficiency for perforations at other azimuths can be determined quickly and accurately based on the obtained concentration and velocity profiles along transverse cross-sections. Thus, a single cluster CFD model and methodology may be utilized to determine proppant efficiency for any perforation azimuth. Secondly, in embodiments provided herein, CFD models have a long lateral at the inlet to ensure an equilibrium state is achieved before reaching the perforation(s). This allows the effect of perforation azimuth on proppant efficiency to be sufficiently incorporated into the developed correlations. The capability of determining proppant distribution along a multi-cluster stage based on single perforation CFD modeling may accelerate the CFD modeling and decision-making processes for unconventional assets.

Advantageously, embodiments consistent with the instant disclosure may utilize a CFD Model setup of at least one opening along a single azimuth to provide answers in seconds instead of days. The setup includes at least 100-ft long pipe before the perforations, for example. The single azimuth may be used to determine proppant efficiency at arbitrary azimuth based on CFD modeling results. The number of CFD models required for correlation development may even be reduced by about 85%. The model (correlation) between proppant efficiency and key parameters was developed based on machine learning. This model has been validated against full stage CFD modeling results. By using this model, proppant distribution along a stage may be obtained seconds, as compared to several days by running full stage CFD models.

One embodiment of a computer-implemented method of determining proppant distribution for a plurality of clusters within a fracture stage of a wellbore is illustrated in FIG. 29 as a method 2900. The method 2900 may be executed by the system of FIG. 2. The system 200 may include a proppant distribution module 250 that execute the operations of the methods shown in the figures related to proppant distribution. The proppant distribution module 250 may include a CFD sub-module 290, a proppant efficiency sub-module 270, a model sub-module 280, a proppant distribution sub-module 260, a multiplier sub-module 296, a data module or sub-module 295.

In some embodiments, the CFD sub-module 290 sub-module 290 contains a set of instructions 290-1 and accepts metadata and parameters 290-2 that will enable it to perform computational fluid dynamics modeling on at least a portion of a wellbore without any openings and a portion of the wellbore comprising at least one opening along a single azimuth to determine proppant efficiency for the at least one opening along the single azimuth while simulating flow of fluid, proppant, or any combination thereof through the wellbore, an equilibrium proppant concentration profile for the portion of the wellbore without any openings, and an equilibrium velocity profile for the portion of the wellbore without any openings. In some embodiments, the proppant efficiency sub-module 270 contains a set of instructions 270-1 and accepts metadata and parameters 270-2 that will enable it to determine proppant efficiency for at least one other opening of the wellbore at a different azimuth using the determined proppant efficiency for the at least one opening along the single azimuth, the determined equilibrium proppant concentration profile for the portion of the wellbore without any openings, and the determined equilibrium velocity profile for the portion of the wellbore without any openings. In some embodiments, the model sub-module 280 contains a set of instructions 280-1 and accepts metadata and parameters 280-2 that will enable it to generate a model that correlates the single azimuth, the determined proppant efficiency for the at least one opening along the single azimuth, and the determined proppant efficiency for the at least one other opening of the wellbore at the different azimuth. In some embodiments, the proppant distribution sub-module 260 contains a set of instructions 260-1 and accepts metadata and parameters 260-2 that will enable it to use the model to determine proppant distribution for the plurality of clusters within the fracture stage of the wellbore. In some embodiments, the multiplier sub-module 296 contains a set of instructions 296-1 and accepts metadata and parameters 296-2 that will enable it to determine the multiplier to account for the cluster spacing between the plurality of clusters within the fracture stage of the wellbore.

The system 200 may also include at least one Data module or sub-module 295 (e.g., similar to Data module or sub-module 232), which handles the data. This data may be supplied by the Data module or sub-module 295 to other modules and/or sub-modules. For example, the data may be inputted by an operator via the user interface 205, received from one or more sensors or devices, received from one or more system of records, etc. In some embodiments, the output of each of the modules and/or sub-modules may be provided to an operator or to another system(s), for example, via the user interface 205, the network communication module 218, a printer, the display 205-1, a data storage device, any combination of thereof, etc.

Figure 30:
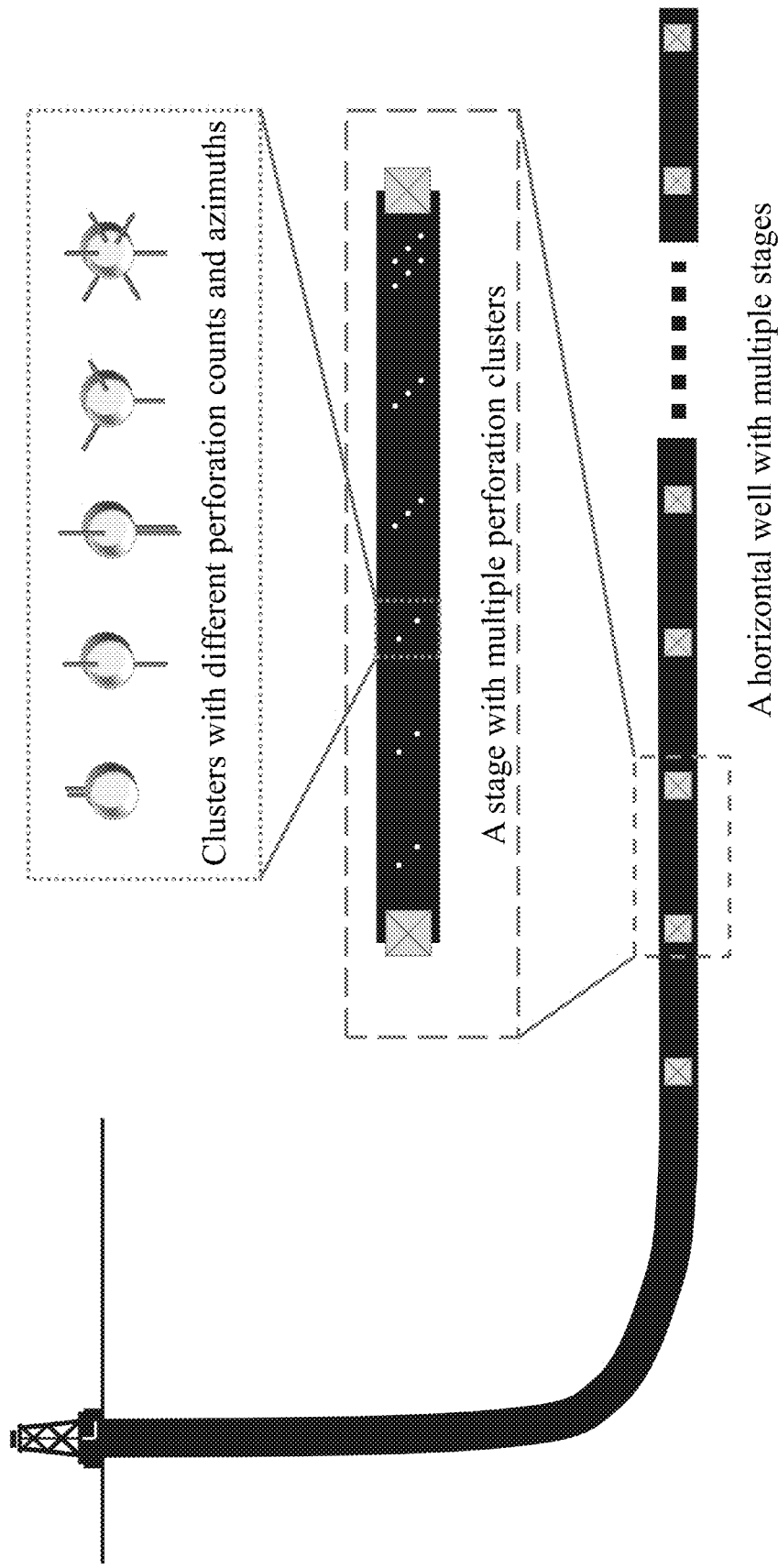
FIG. 30 illustrates one embodiment of a horizontal wellbore with multiple stages.
Figure 31A:
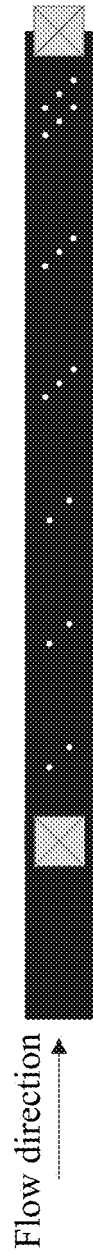
FIG. 31A illustrates a setup for conventional CFD modeling.
Figure 31B:
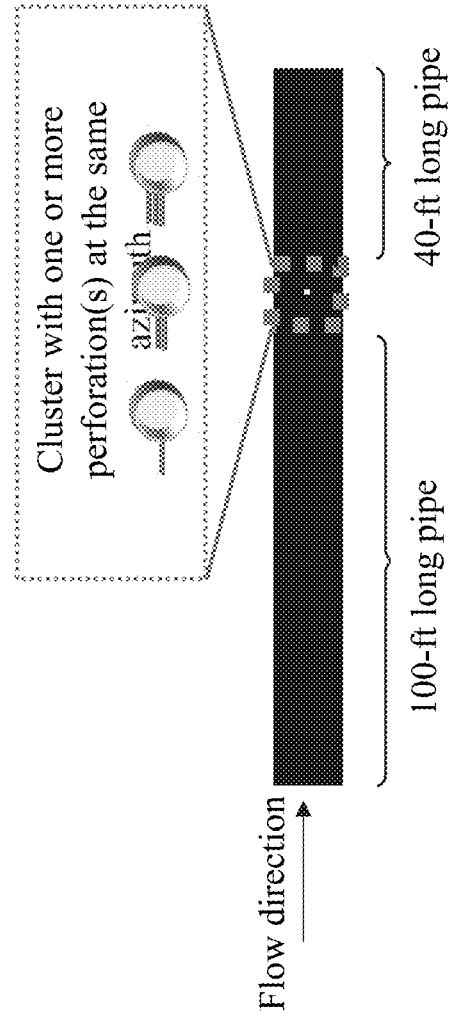
FIG. 31B illustrates a setup for the CFD modeling consistent with the disclosure.

Returning to the method 2900, FIG. 30 illustrates one embodiment of a horizontal wellbore with multiple stages. FIG. 30 also illustrates that each stage may have multiple perforation clusters and clusters may have different perforation counts and azimuths. As illustrated in FIG. 31A, conventionally, a CFD model of a full stage may be run to obtain the proppant distribution along this stage, but this typically very time-consuming and takes several days. However, as discussed further herein, the method 2900 may be utilized to develop a machine learning model that is used to obtain the proppant distribution along a full stage in seconds. In one embodiment, the method 2900 utilizes CFD models with a different setup, for example, as illustrated in FIG. 31B with a 100-ft long pipe. The discussion may utilize the term "perforation", "perf" or the like for simplicity, but the term "opening" in the method 2900 may be a perforation, an opening in a sleeve, an opening in a liner, etc.

Figure 32:
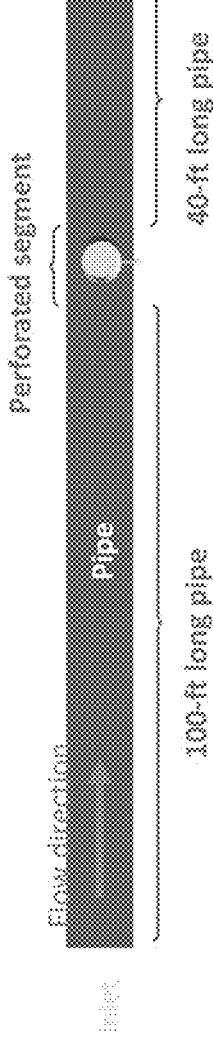
FIG. 32 illustrates a setup for the CFD modeling consistent with the disclosure.

At 2905, the method 2900 includes performing computational fluid dynamics modeling on at least a portion of a wellbore without any openings and a portion of the wellbore comprising at least one opening along a single azimuth to determine proppant efficiency for the at least one opening along the single azimuth while simulating flow of fluid, proppant, or any combination thereof through the wellbore, an equilibrium proppant concentration profile for the portion of the wellbore without any openings, and an equilibrium velocity profile for the portion of the wellbore without any openings. In one embodiment, determining the equilibrium proppant concentration profile and the equilibrium velocity profile by the CFD modeling includes a length condition. For example, the portion of the wellbore without any openings that is located upstream of the portion of the wellbore comprising the at least one opening along the single azimuth is at least 100 feet in length (e.g., at least 150 feet, at least 200 feet, at least 300 feet, at least 350 feet, or at least 400 feet) to provide an equilibrium state. In some embodiments, the length is 3000 feet or less (e.g., 2500 feet or less, 2000 feet or less, 1500 feet or less, 1000 feet or less, 750 feet or less, 450 feet or less, 400 feet or less, 350 feet or less, 300 feet or less, 250 feet or less, 200 feet or less, or 150 feet or less). The length can range from any of the minimum values described above to any of the maximum values described above. For example, in some embodiments, the length can be of from 100 feet to 3000 feet (e.g., of from 100 feet to 200 feet or of from 100 feet to 500 feet). In one embodiment, the length is about 100 feet as illustrated in FIG. 32. The single azimuth may be practically any degree, such as, but not limited to 0°, 30°, 60°, 90°, 120°, 150°, 180°, 210°, 240°, 270°, 300°, or 330°.

One embodiment may include using wellbore properties, fluid properties, and proppant properties in determining the proppant efficiency for the at least one opening along the single azimuth, determining the equilibrium proppant concentration profile for the portion of the wellbore without any openings, determining the equilibrium velocity profile for the portion of the wellbore without any openings, or any combination thereof. For example, the wellbore properties comprise wellbore diameter, perforation number, perforation diameter, flow rate through each perforation, and flow rate in the wellbore. For example, the fluid properties comprise fluid viscosity. The proppant properties comprise proppant concentration and proppant size. These examples are non-limiting and one property may be affiliated with a different category than illustrated.

For example, the CFD results may be generated by running single perf azimuth models with various combinations of the following parameters (DOE) in Table 1 below:

TABLE 1

Flow rate in wellbore, Q
Flow rate through each perf, q
Fluid viscosity (two values at two different shear rates), μ
Proppant concentration, c
Proppant size, $D_{prop}$

TABLE 1-continued

Perf diameter, $D_{perf}$
Wellbore diameter, $D_{well}$
Perf number, Perf_num
Perf azimuth, Perf_azimuth CFD modeling is discussed further in the following: (a) Bokane, A. B., Jain, S., & Crespo, F. (2014, Sep. 30). Evaluation and Optimization of Proppant distribution Multistage Fractured Horizontal Wells: A Simulation Approach. Society of Petroleum Engineers. SPE 171581-MS (b) Wu, C.-H, Yi, S. S., &. Sharma, NI M. (2017, Jan. 24). Proppant Distribution Among Multiple Perforation Clusters in a Horizontal Wellbore. Society of Petroleum Engineers. SPE 184861-MS, (c) Almulhim, A., Kebert, B., Miskimins, J., Hunter, W., & Soehner, G. (2020, Jan. 23). Field-Scale Computational Fluid Dynamics CM Modeling of Proppant Transport and Distribution Within a Horizontal Hydraulic Fracturing Stage. Society of Petroleum Engineers. SPE 199727-MS, each of which is incorporated by reference. Proppant efficiency refers to proppant concentration of slurry exiting from an opening (e.g., openingA) divided by proppant concentration in the wellbore upstream of the opening (e.g., openingA). FIG. 31B illustrates openings along a single azimuth. Proppant concentration equals proppant weight divided by fluid volume.

Figure 33:
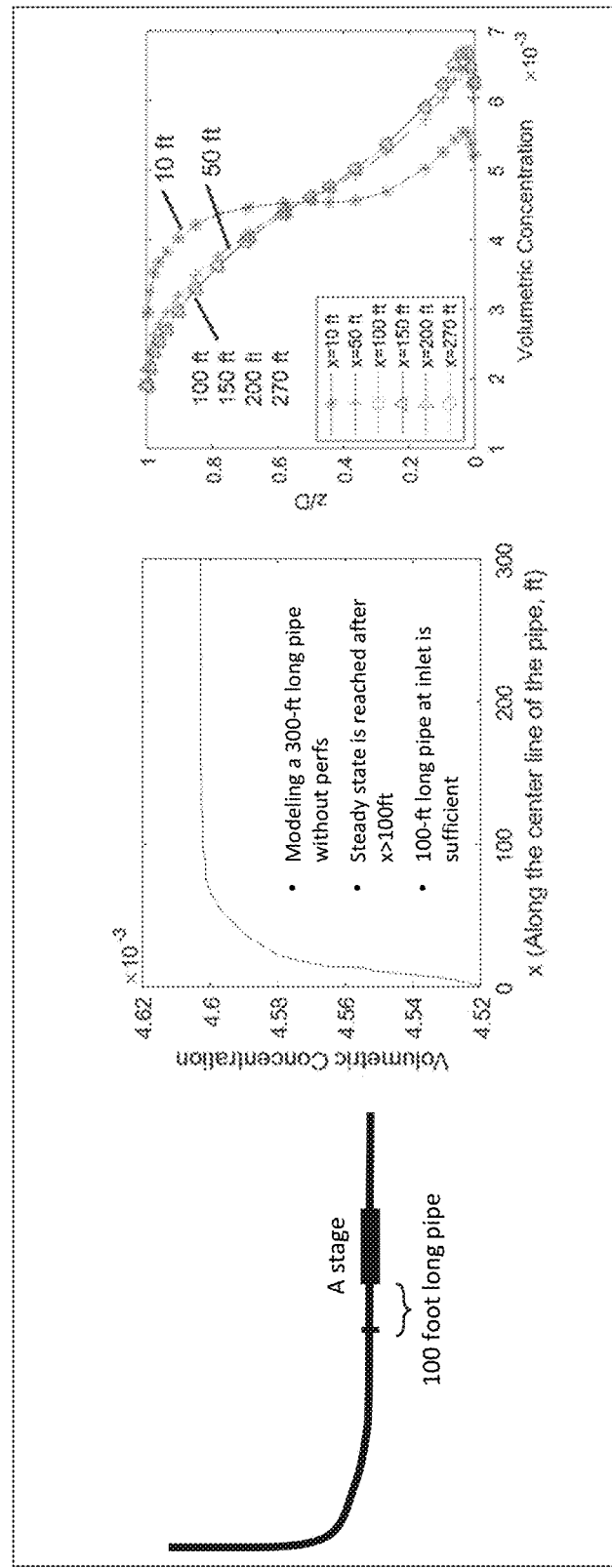
FIG. 33 illustrates that a 100-ft pipe segment ahead of each stage is sufficient

During hydraulic fracturing treatments in horizontal wellbores, proppant laden slurry travels thousands of feet along the vertical section of the wellbore before reaching the landing zone. From there, it continues to travel horizontally for many thousands of feet to reach the first stage at the toe or a few hundreds of feet to reach the last stage at the heel. Therefore, a long horizontal lateral prior to each stage is useful in the CFD computational domain. For that, a CFD model having a 300-ft horizontal pipe with an ID of 4.276-in was constructed to evaluate the minimum lateral length before each stage. The results in FIG. 33 illustrates that a 100-ft pipe segment ahead of each stage is sufficient.

At 2910, the method 2900 includes determining proppant efficiency for at least one other opening of the wellbore at a different azimuth using the determined proppant efficiency for the at least one opening along the single azimuth, the determined equilibrium proppant concentration profile for the portion of the wellbore without any openings, and the determined equilibrium velocity profile for the portion of the wellbore without any openings. For example, the proppant efficiency may be determined for arbitrary perf azimuth (Perf_azimuth) based on the CFD results of 2905. Streamline envelope size (SES) may be utilized as explained hereinbelow.

In one embodiment, determining the proppant efficiency for the at least one other opening of the wellbore at the different azimuth includes determining streamline envelope size of a fluid using an equation comprising:

$$\text{SES of fluid} \rightarrow Q_{perf} \times (1 - C_{perf}) = \int_{A_1} [v_{ep} \times (1 - c_{ep})] dA \quad \text{(i)}$$

where $Q_{perf}$ represents flowrate (e.g., slurry flowrate) through an opening, $C_{perf}$ represents proppant volumetric fraction exiting the opening (e.g., exiting the opening mentioned for $Q_{perf}$), $v_{ep}$ represents flow velocity at equilibrium, $c_{ep}$ represents proppant volumetric fraction at equilibrium, and $A_1$ represents cross-sectional area contained by a streamline envelope of the fluid. The equation (i) may be utilized for the opening at the single azimuth.

In one embodiment, determining the proppant efficiency for the at least one other opening of the wellbore at the different azimuth includes determining streamline envelope size of proppant using an equation comprising:

$$\text{SES of proppant} \rightarrow Q_{perf} \times C_{perf} = \int_{A_2} (v_{ep} \times c_{ep}) dA \quad \text{(ii)}$$

where $Q_{perf}$ represents flowrate (e.g., slurry flowrate) through an opening, $C_{perf}$ represents proppant volumetric fraction exiting the opening (e.g., exiting the opening mentioned for $Q_{perf}$), $v_{ep}$ represents the flow velocity at equilibrium, $c_{ep}$ represents proppant volumetric fraction at equilibrium, and $A_2$ represents the cross-sectional area contained by a streamline envelope of the proppant. The equation (i) may be utilized for the opening at the single azimuth.

In one embodiment, both equations (i) and (ii) may be utilized for determining proppant efficiency for at least one other opening of the wellbore at a different azimuth.

Figure 35:
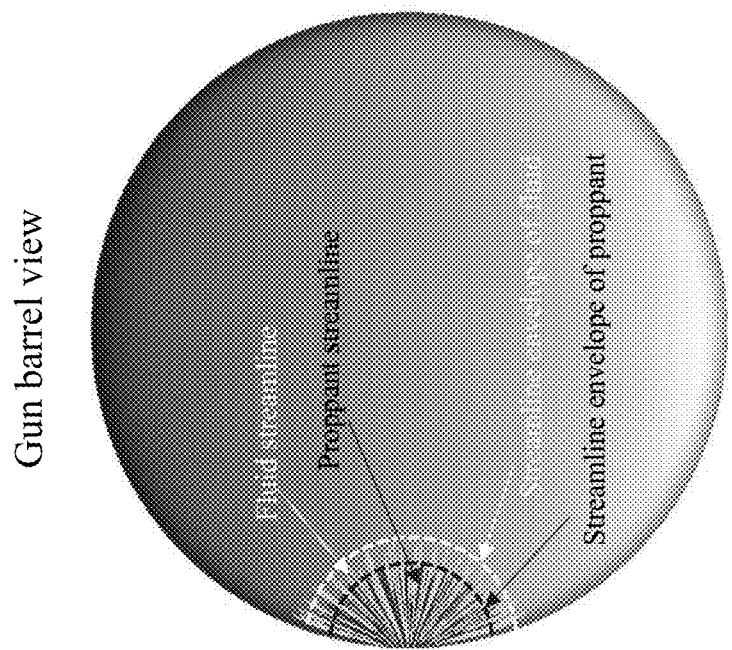
FIG. 35 illustrates SES of both proppant and fluid do not change with perforation azimuth, if the other parameters are the same.
Figure 34:
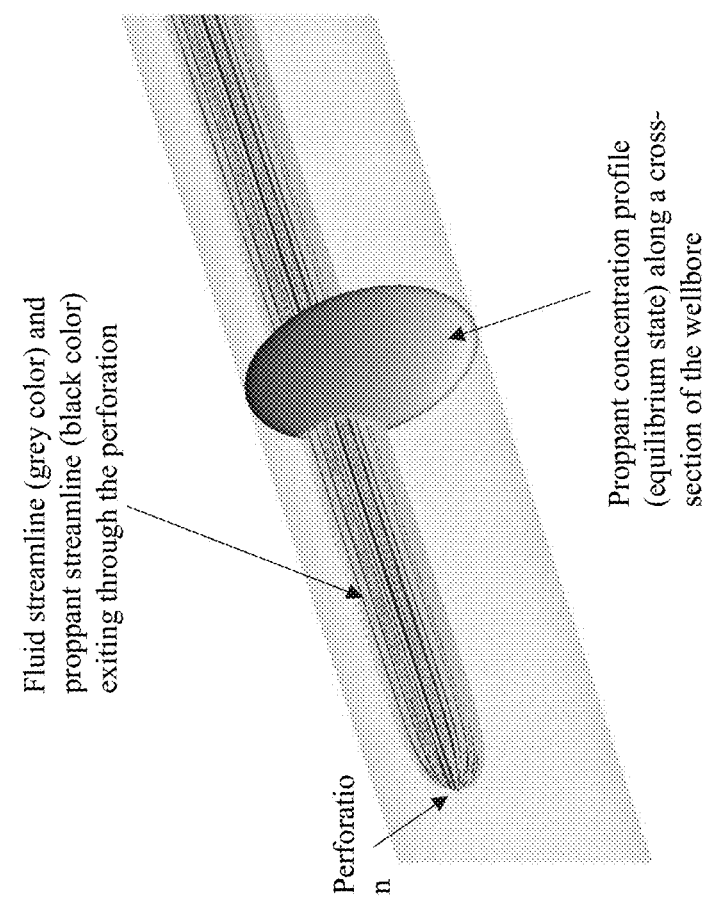
FIG. 34 illustrates fluid streamline (grey color) and proppant streamline (black color) exiting through the perforation, as well as proppant concentration profile (equilibrium state) along a cross-section of the wellbore.

FIG. 34 illustrates fluid streamline (grey color) and proppant streamline (black color) exiting through the perforation, as well as proppant concentration profile (equilibrium state) along a cross-section of the wellbore. FIG. 35 illustrates SES of both proppant and fluid do not change with perforation azimuth, if the other parameters are the same. The streamline envelope size (SES) of the proppant is always smaller than that of fluid in the illustrated embodiment.

Figure 36:
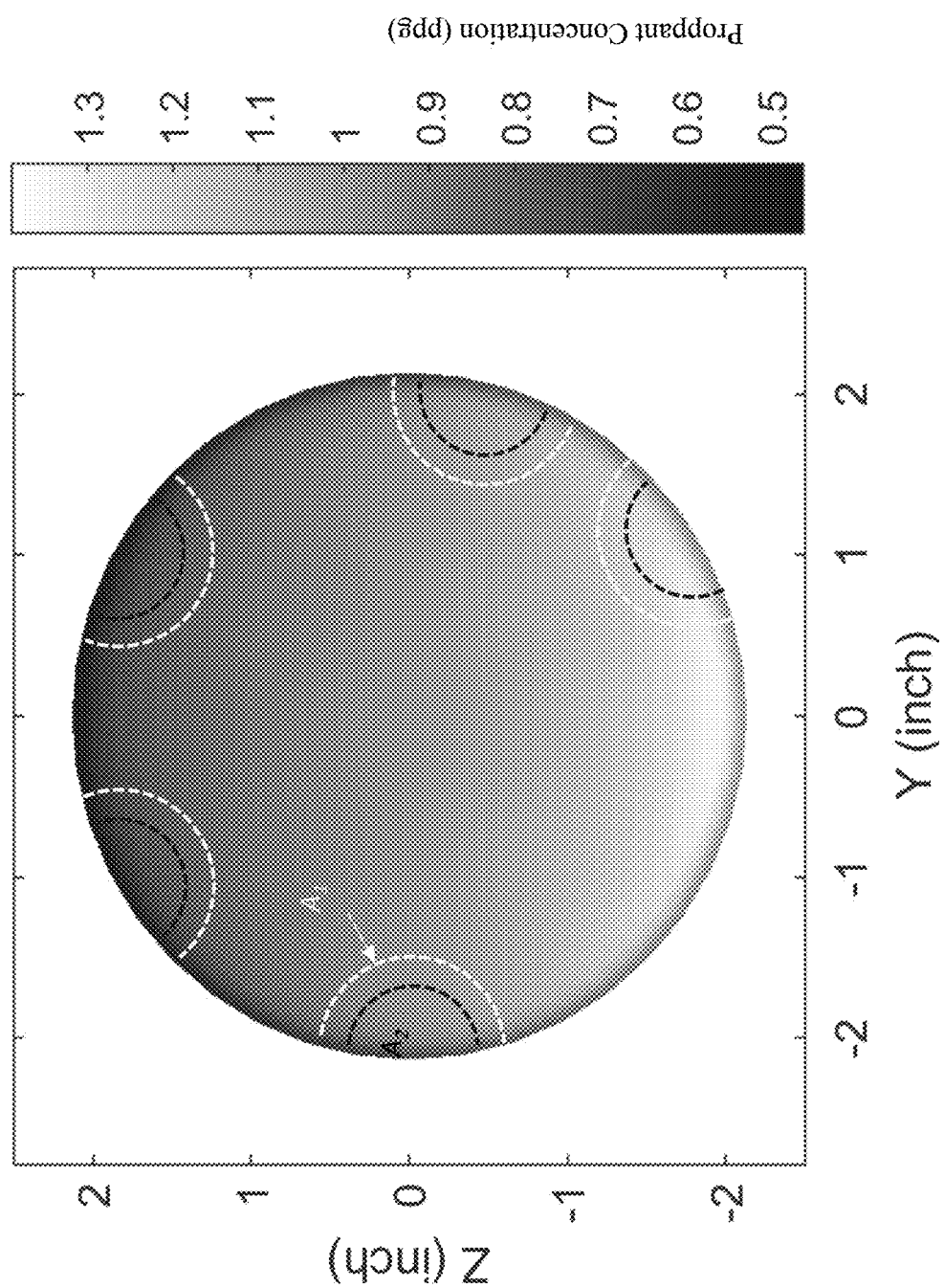
FIG. 36 illustrates one embodiment of an equilibrium proppant concentration profile for the portion of the wellbore without any openings, as well as one embodiment of an equilibrium velocity profile for the portion of the wellbore without any openings.

FIG. 36 illustrates one embodiment of an equilibrium proppant concentration profile for the portion of the wellbore without any openings. FIG. 36 illustrates one embodiment of $A_1$ and $A_2$, with $A_1$ being the streamline envelope of the fluid and $A_2$ being the streamline envelope of the proppant. SES of both fluid and proppant are constant for different perforation azimuths. FIG. 36 illustrates one embodiment of an equilibrium velocity profile for the portion of the wellbore without any openings.

Figure 37:
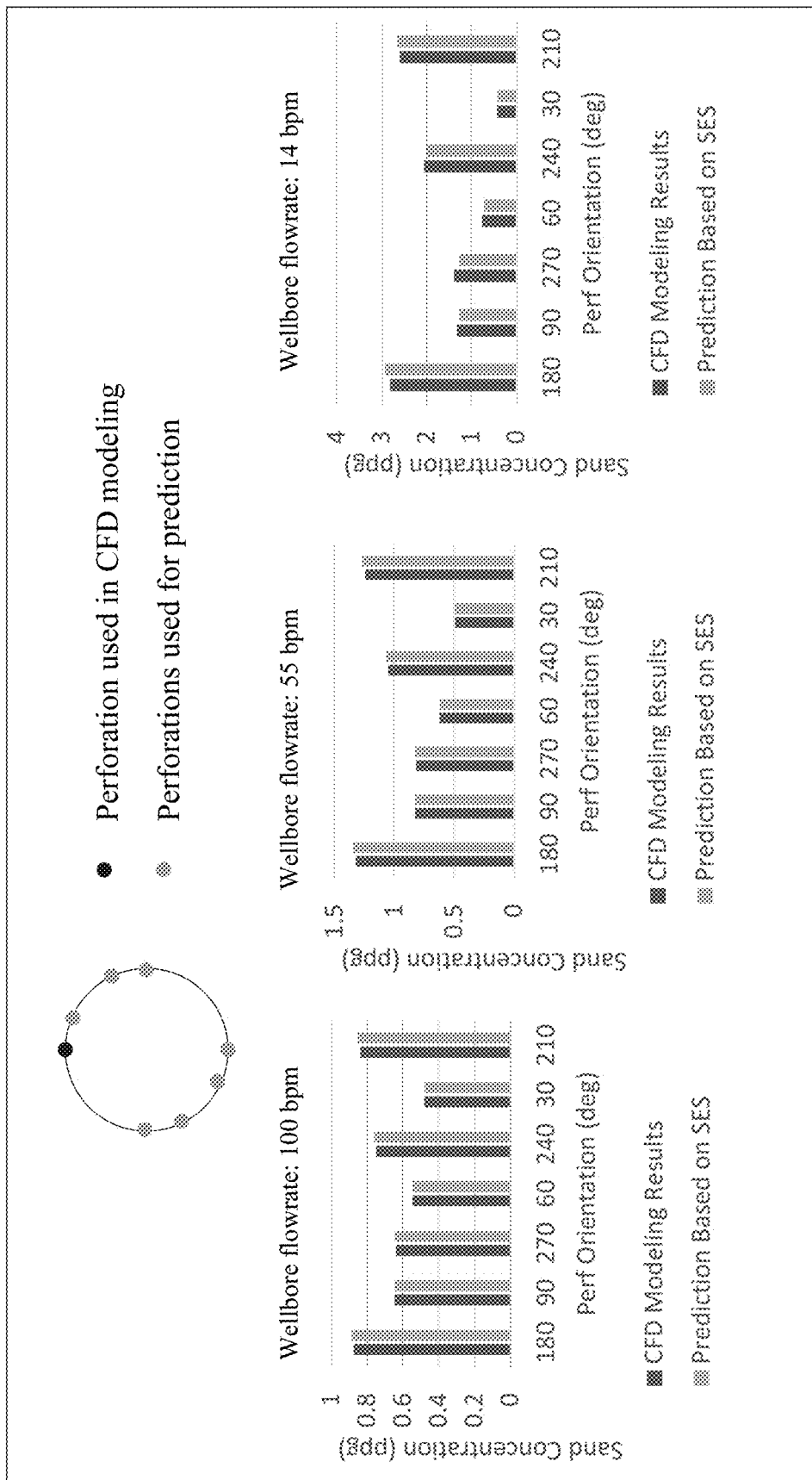
FIG. 37 illustrates examples validating proppant efficiency determined for at least one other opening of the wellbore at a different azimuth.

FIG. 37 illustrates examples validating proppant efficiency determined for at least one other opening of the wellbore at a different azimuth. Based on CFD results with perf of 0° phasing, FIG. 37 predicts sand concentration for perfs of different orientations, and then compared the predicted results with the CFD modeling results.

At 2915, the method 2900 includes generating a model that correlates the single azimuth, the determined proppant efficiency for the at least one opening along the single azimuth, and the determined proppant efficiency for the at least one other opening of the wellbore at the different azimuth. The model may be generated, including trained and/or retrained, in a variety of ways. In one embodiment, the model is generated using a machine learning algorithm. In one embodiment, the model comprises a supervised machine learning algorithm. In one embodiment, the supervised machine learning algorithm comprises Gaussian process regression. In one embodiment, the supervised machine learning algorithm comprises a neural network.

One embodiment may include using wellbore properties, fluid properties, and proppant properties in generating the model. For example, the wellbore properties comprise wellbore diameter, perforation number, perforation diameter, flow rate through each perforation, and flow rate in the wellbore. For example, the fluid properties comprise fluid viscosity. The proppant properties comprise proppant concentration and proppant size. These examples are non-limiting and one property may be affiliated with a different category than illustrated. In one embodiment, the model is generated using the following as defined in Table 1 below:

$f(Q, q, \mu, c, D_{prop}, D_{perf}, D_{well}, \text{Perf}_{num}, \text{Perf\_azimuth})$

TABLE 1

Flow rate in wellbore, Q
Flow rate through each perf, q
Fluid viscosity (two values at two different shear rates), μ

TABLE 1-continued

Figure 38:
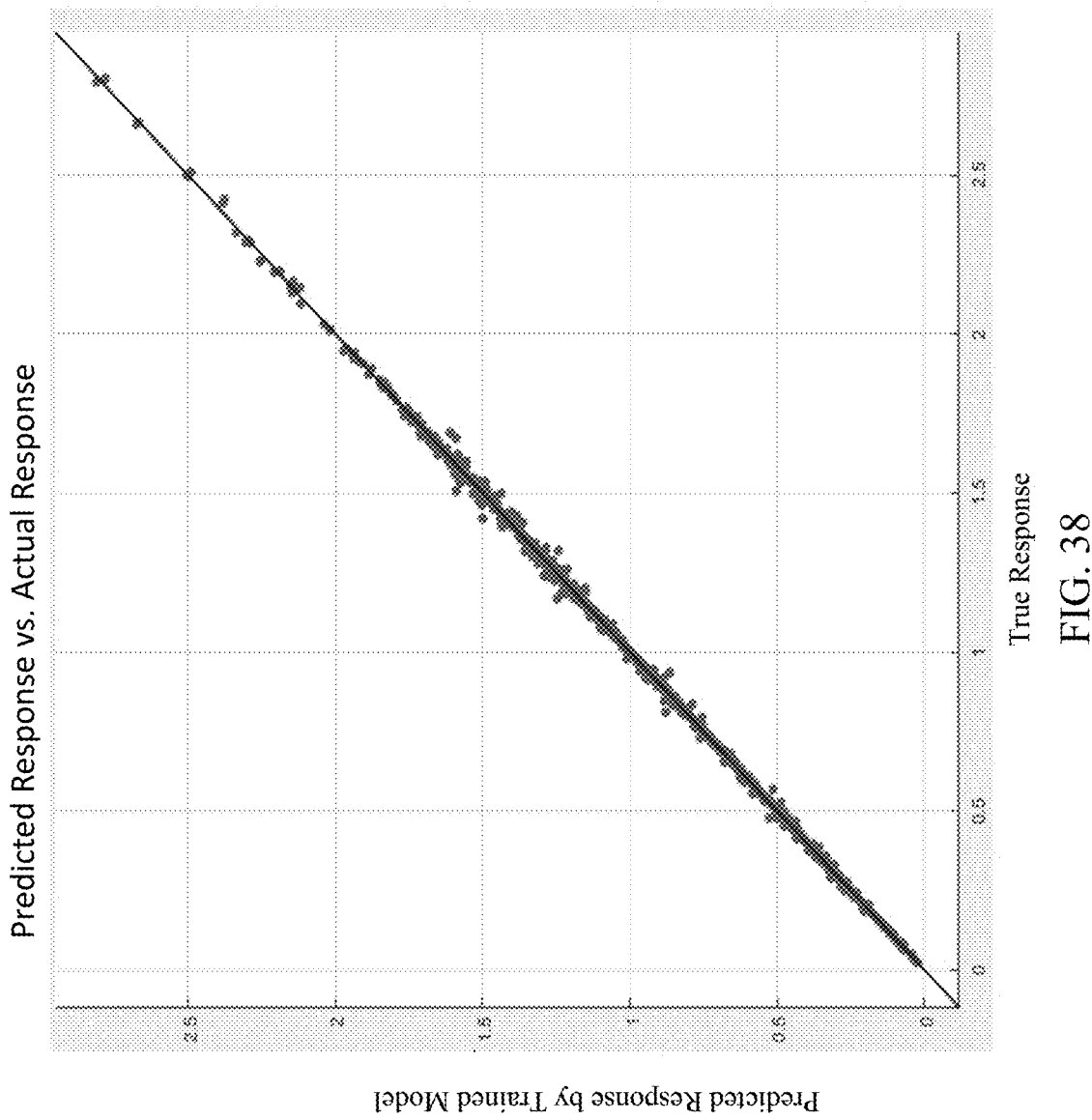
FIG. 38 illustrates one embodiment of response time of a machine learning model.

Proppant concentration, c
Proppant size, $D_{prop}$
Perf diameter, $D_{perf}$
Wellbore diameter, $D_{well}$
Perf number, Perf_num
Perf azimuth, Perf_azimuth FIG. 38 illustrates one embodiment of response time of a machine learning model. A machine learning model was developed between proppant efficiency and key parameters (e.g., as in Table 1) based on a sufficiently large amount of data. For example, a large amount of data is a dataset that is large enough to ensure a high accuracy of the trained model, e.g. R2>0.95. About 6000 cases were utilized in the dataset that led to the model of FIG. 38. Gaussian process regression was chosen to train the model, and the model of FIG. 38 had a R2 that was close to 1.

Figure 39:
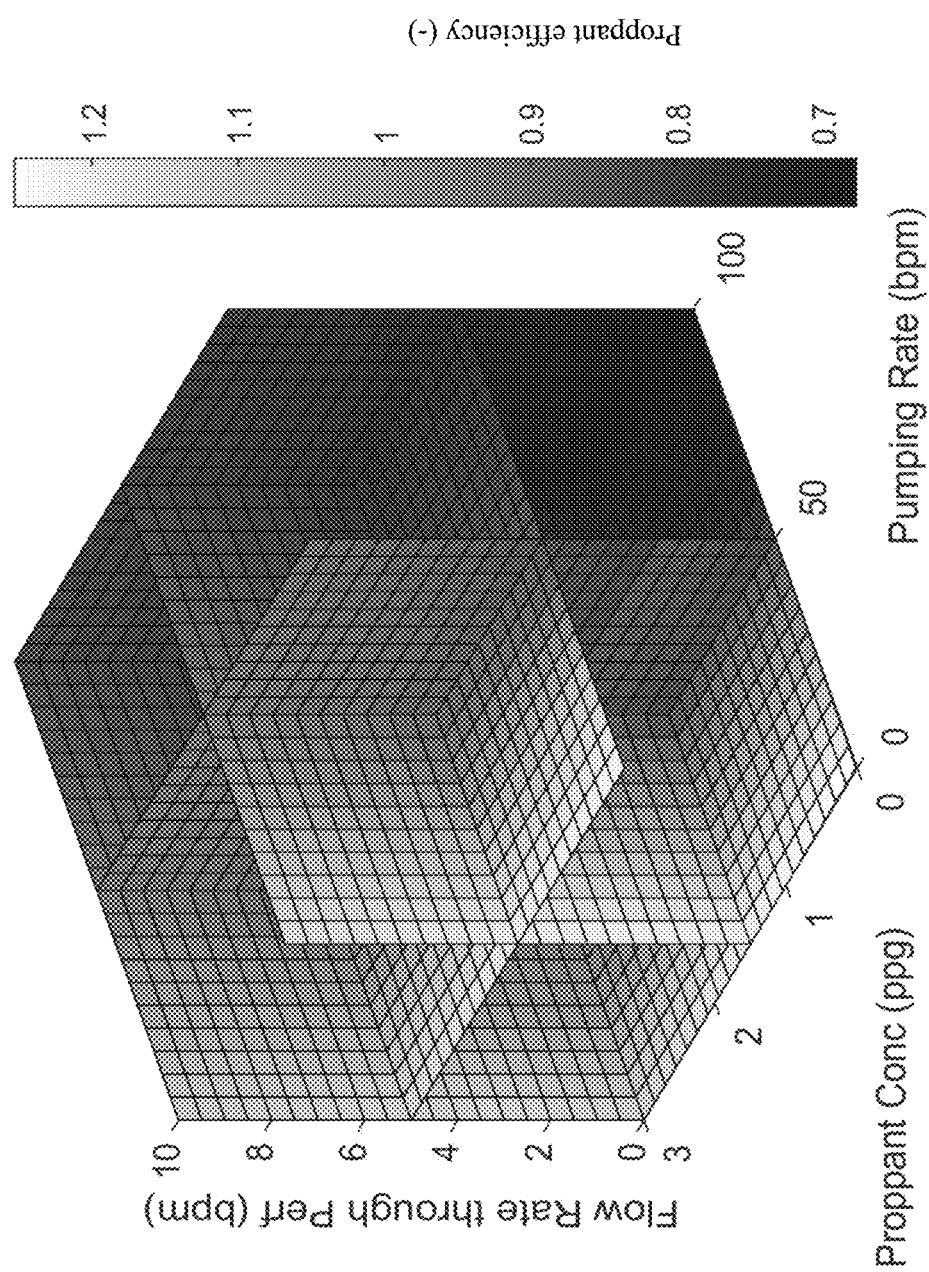
FIG. 39 illustrates example results of a trained model.

FIG. 39 illustrates example results of a trained model. Proppant efficiency for different pumping rate, flow rate through perforation, and proppant concentration are illustrated in FIG. 39. Other parameters of FIG. 39 include: (a) Viscosity: 3 cp (@511 l/s); (b) Viscosity: 4 cp (@170 l/s); (c) Prop size: 100 mesh; (d) Wellbore diameter: 4.28 in; (e) Perf number: 1; (f) Perf_azimuth: 180°; and (g) Perf diameter: 0.3 in.

Figure 40:
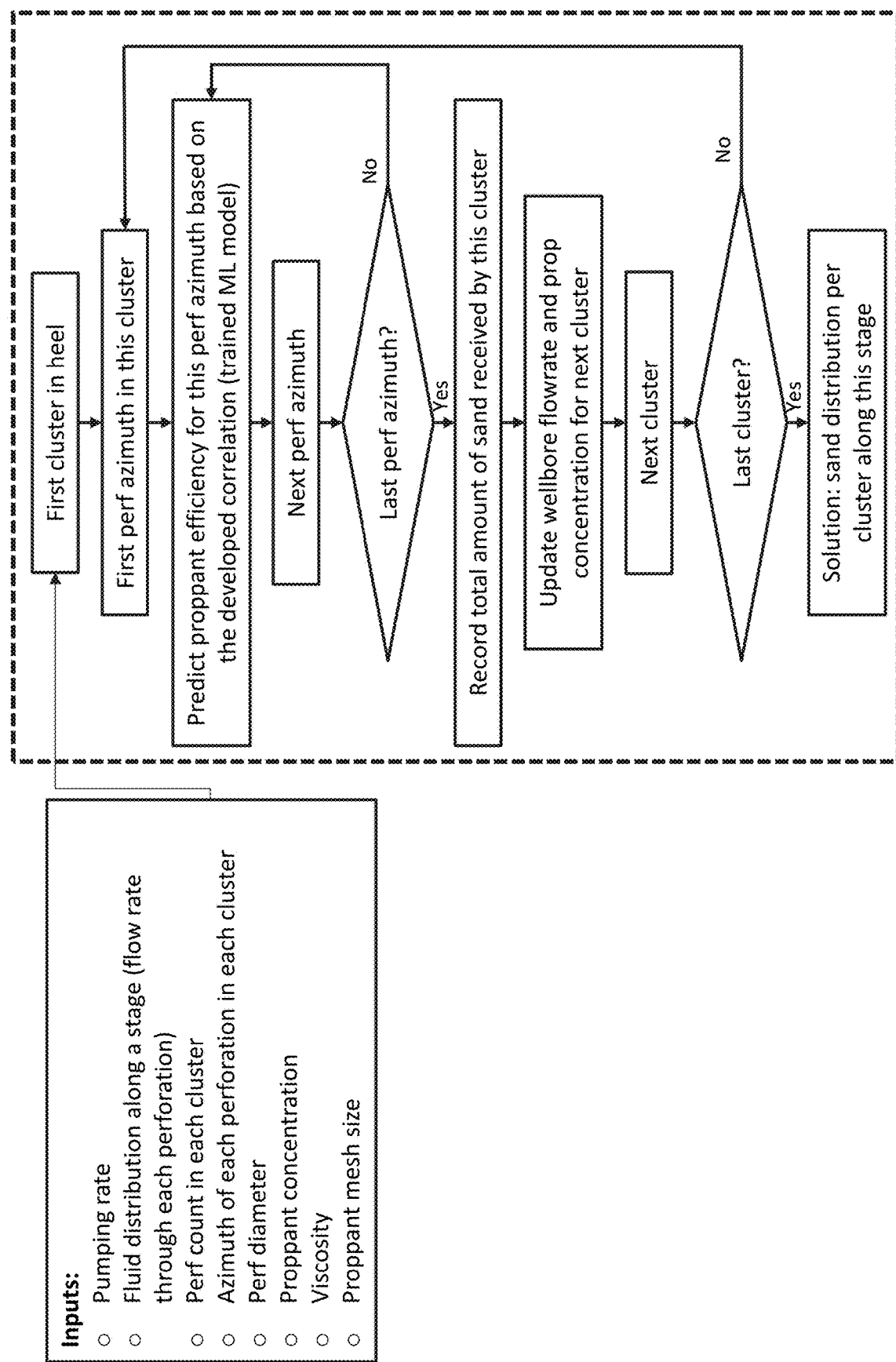
FIG. 40 illustrates a flowchart of one embodiment of a method of using a model to determine the proppant distribution for the plurality of clusters within the fracture stage of the wellbore without a multiplier.

At 2920, the method 2900 includes using the model to determine proppant distribution for the plurality of clusters within the fracture stage of the wellbore. FIG. 40 illustrates one embodiment of a flowchart of using the model to determine proppant distribution for the plurality of clusters within the fracture stage of the wellbore.

Figure 41:
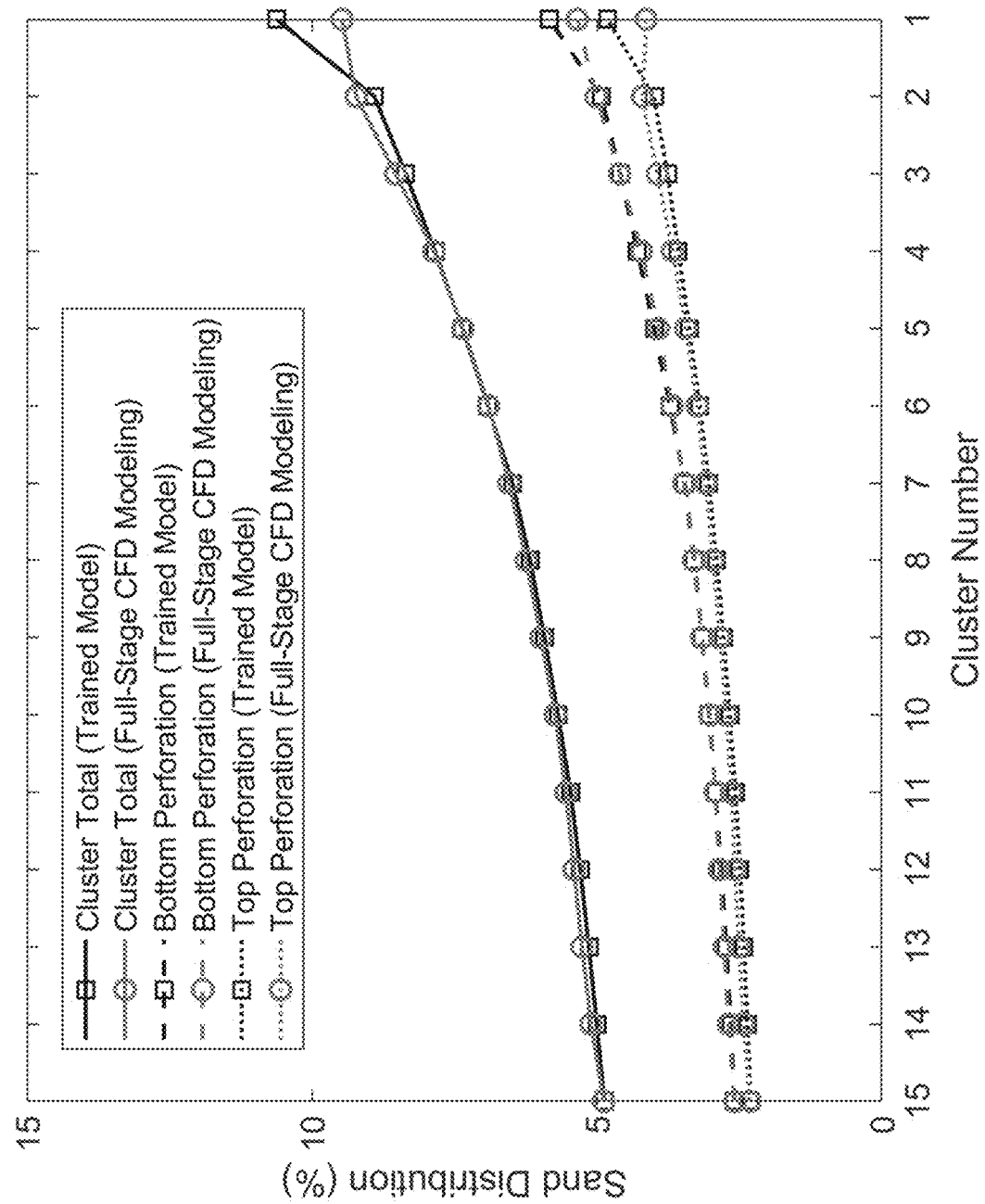
FIG. 41 illustrates a graph with three examples (Cluster Total, Bottom Perforation, and Top Perforation) showing proppant distributions.

FIG. 41 illustrates a graph with three examples (Cluster Total, Bottom Perforation, and Top Perforation) showing proppant distributions determined in a manner consistent with 2905-2920 (e.g., using the trained model) and proppant distributions determined by conventional full stage CFD modeling. The examples of FIG. 41 include proppant distribution along a full stage with 15 clusters and each cluster has two perforations—one at the top (0°) and one at the bottom (180°). Moreover, the validation case parameters include the following: (a) 15 ft*15 clusters, (b) 2 perfs each cluster (0°, 180°), (c) pumping rate: 80 bpm, (d) Viscosity: 3 cp (@511 l/s), (e) Viscosity: 4 cp (@170 l/s), (f) Prop size: 100 mesh, (g) Prop conc: 1 ppg, (h) Wellbore diameter: 4.28 in, and (i) Perf diameter: 0.42 in. The two curves for the Cluster Total illustrate agreement between the trained model and the full stage CFD modelling. The two curves for the Bottom Perforation illustrate agreement between the trained model and the full stage CFD modelling. The two curves for the Top Perforation illustrate agreement between the trained model and the full stage CFD modelling.

Optionally, at 2925, the model (of 2915) may be utilized to determine a second proppant distribution for a second plurality of clusters within a second fracture stage of the wellbore or a second wellbore.

Optionally, at 2930, where using the model to determine the proppant distribution for the plurality of clusters within the fracture stage of the wellbore includes applying a multiplier to account for cluster spacing between the plurality of clusters within the fracture stage of the wellbore. Optionally, at 2935, the method 2900 includes determining the multiplier to account for the cluster spacing between the plurality of clusters within the fracture stage of the wellbore. In one embodiment, the portion of the wellbore without any openings that is located downstream of the portion of the wellbore comprising the at least one opening along the single azimuth is at least 40 feet in length. The 40 foot length is utilized to determine the multiplier.

In one embodiment, the portion of the wellbore without any openings that is located downstream of the portion of the wellbore comprising the at least one opening along the single azimuth is at least 40 feet in length (e.g., at least 50 feet, at least 55 feet, at least 60 feet, at least 65 feet, at least 70 feet, or at least 75 feet) to provide an equilibrium state. In some embodiments, the length is 100 feet or less (e.g., 75 feet or less, 70 feet or less, 65 feet or less, 60 feet or less, 55 feet or less, 50 feet or less, or 45 feet or less). The length can range from any of the minimum values described above to any of the maximum values described above. For example, in some embodiments, the length can be of from 40 feet to 100 feet (e.g., of from 40 feet to 60 feet or of from 40 to 75 feet). In one embodiment, the length is about 100 feet as illustrated in FIG. 32.

Figure 42:
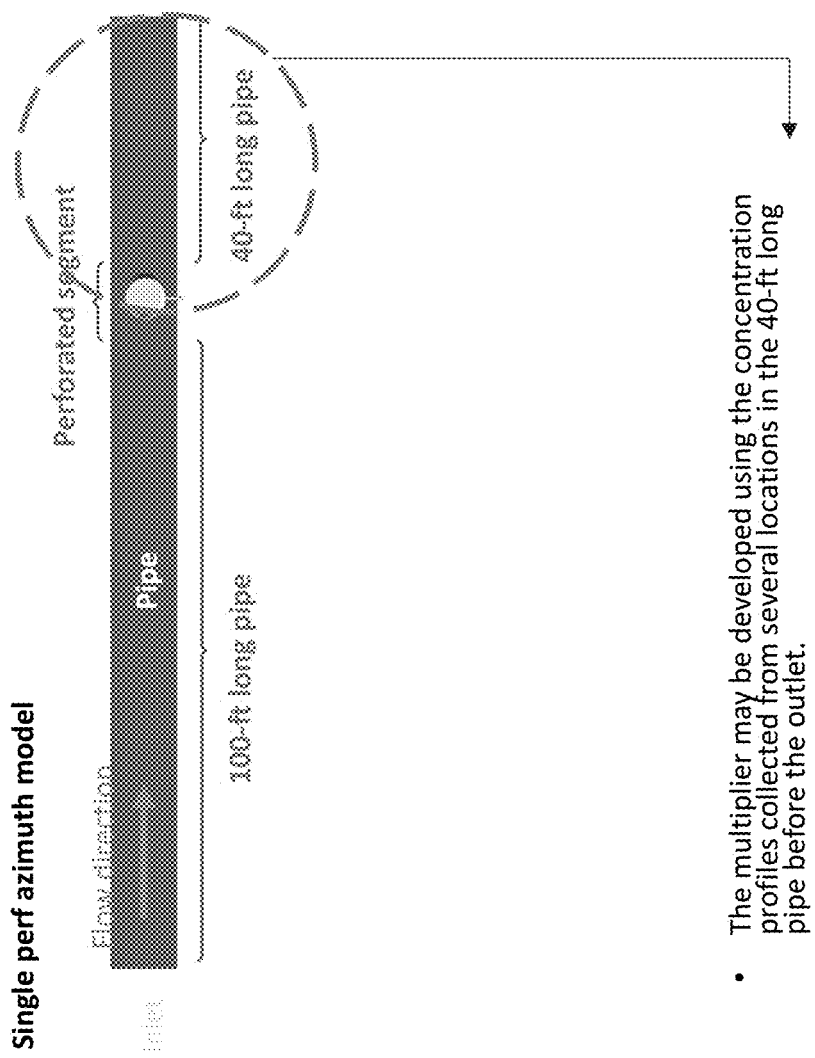
FIG. 42 illustrates a setup for determining a multiplier.

The model generated at 2915 assumes that an equilibrium state is achieved before the slurry arrives at each cluster along the full stage. For cases with relatively short cluster spacing (e.g., <10 ft) and low fluid viscosity (e.g., <2 cP at 511 l/s of shear rate), a concentration multiplier may be used to relax this assumption. The multiplier may be determined using the concentration profiles collected from several locations (e.g., six equally spaced locations) in the 40-ft long pipe before the outlet, as illustrated in FIG. 42. In one embodiment, the multiplier is a function of distance from previous cluster, flow rate in wellbore, flow rate through previous cluster, fluid viscosity, proppant concentration, proppant size, or any combination thereof.

Figure 43:
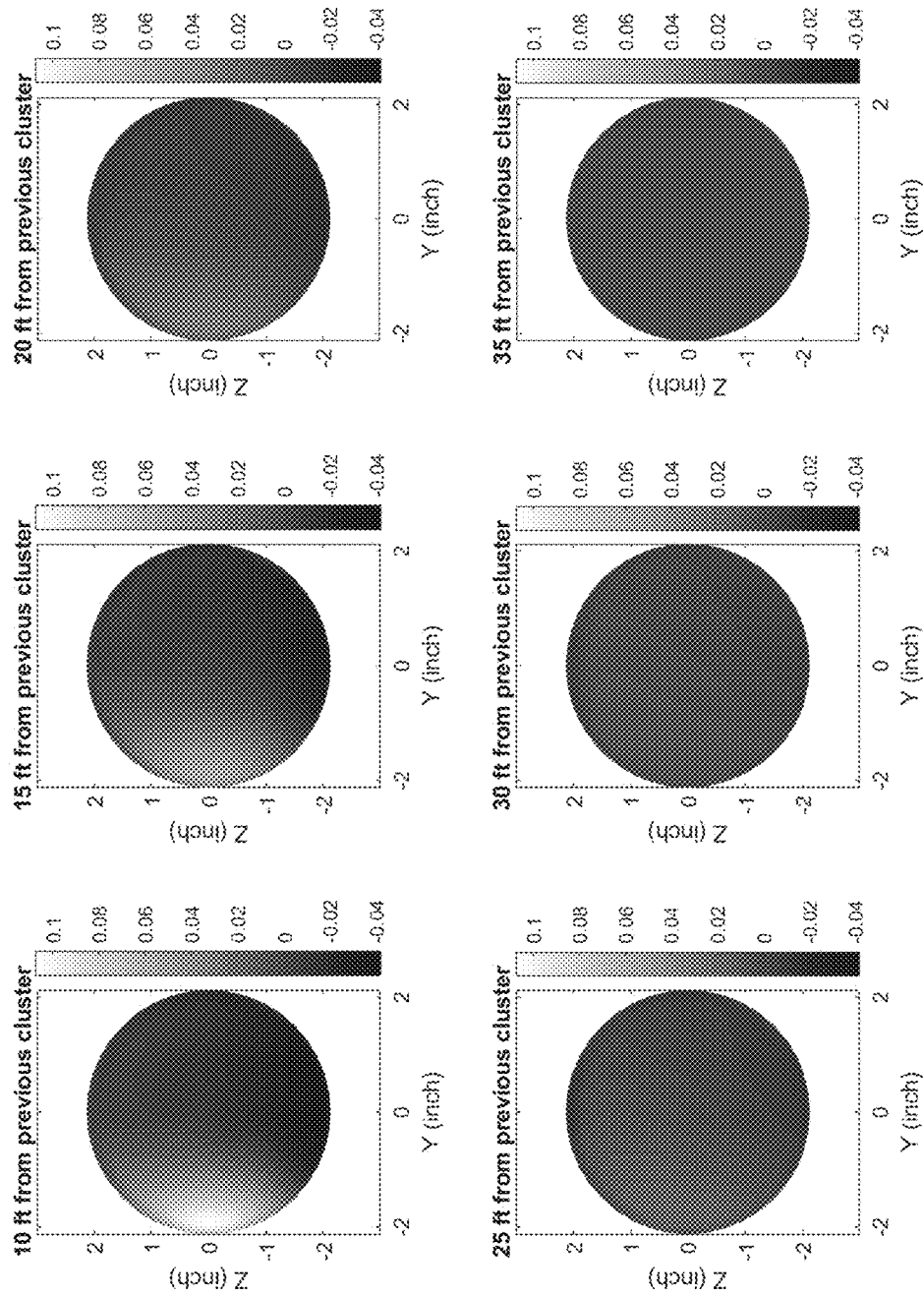
FIG. 43 illustrates the difference in proppant concentration from equilibrium state in one example.

In one embodiment, determining the multiplier and applying the multiplier may include: (a) concentration profiles may be collected from six locations after the cluster, (b) the difference of these concentration profiles from the equilibrium state may be calculated (see FIG. 43), (c) multiplier may be developed based on the collected data (e.g., the multiplier is a function of distance from previous cluster, flow rate in wellbore, flow rate through previous cluster, fluid viscosity, proppant concentration, proppant size, or any combination thereof), and (d) update proppant efficiency of each perforation by multiplying the multiplier and the original proppant efficiency (i.e., multiplier×original proppant efficiency). FIG. 43 illustrates the difference in proppant concentration from equilibrium state in one example.

Figure 44:
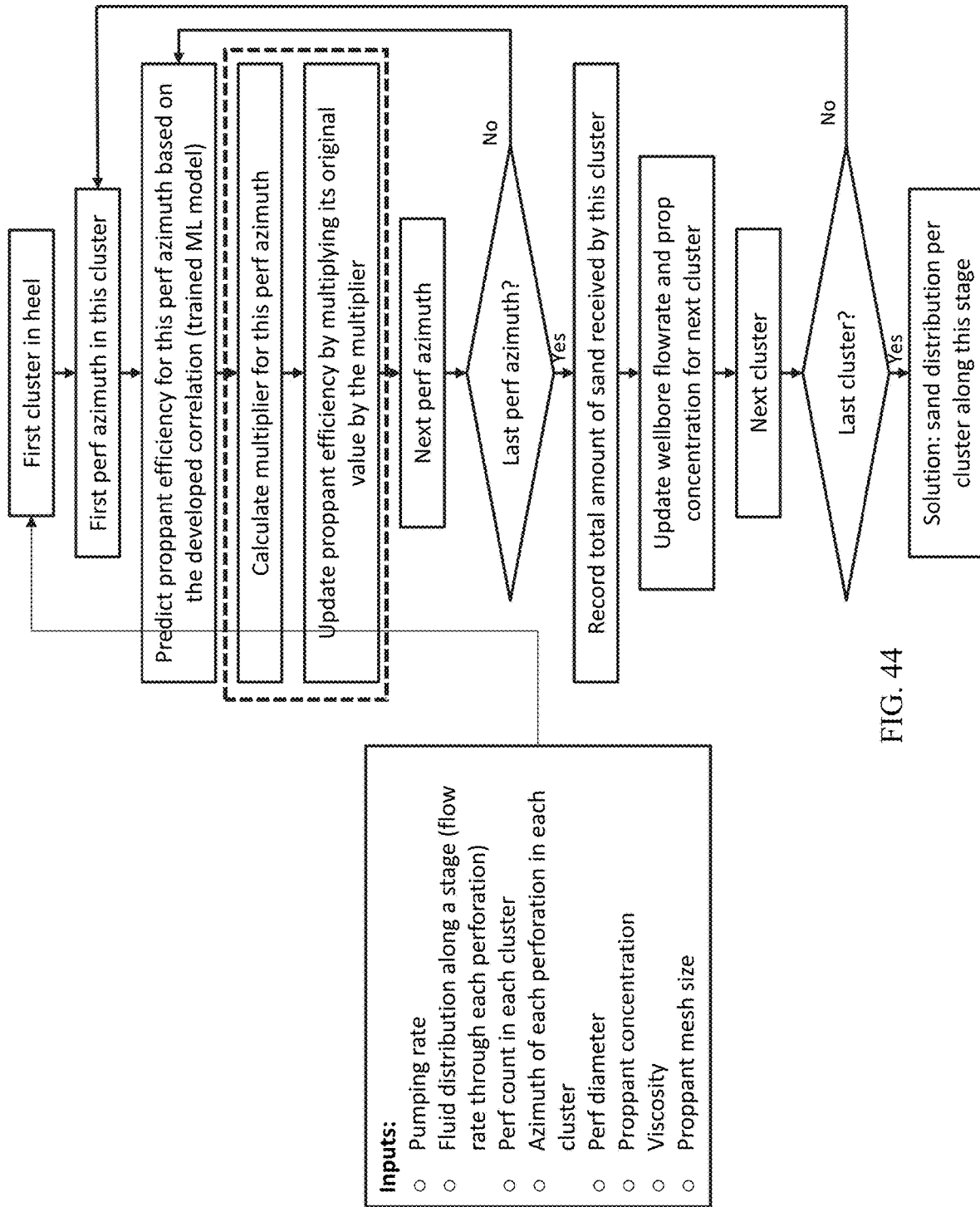
FIG. 44 illustrates a flowchart of one embodiment of a method of using a model to determine the proppant distribution for the plurality of clusters within the fracture stage of the wellbore with a multiplier.

FIG. 44 illustrates a flowchart of one embodiment of a method of using a model to determine the proppant distribution for the plurality of clusters within the fracture stage of the wellbore includes applying a multiplier to account for cluster spacing between the plurality of clusters within the fracture stage of the wellbore. Flowchart (with multiplier) in FIG. 44 is a modified version of the embodiment of FIG. 40.

A more thorough example is also provided below. The CFD model geometry is comprised of three parts: (i) a 100-ft long horizontal unperforated pipe at the inlet, (ii) a short pipe segment perforated at the phasing of 270°, and (iii) another 40-ft long pipe following the perforated segment and before the outlet, such as the CFD model geometry in FIG. 42. The EGM approach is used for the CFD modeling. Equilibrium concentration and velocity profiles are collected at the transverse plane about 95 ft away from the inlet for all the CFD models. These 2D profiles are utilized to estimate proppant efficiency of perforations at arbitrary azimuth by the following steps: (a) After CFD modeling is finished, collect slurry flowrate (Q_perf) and proppant volumetric fraction (C_perf) through the perforation(s) as well as the equilibrium concentration (conc) and velocity (velocity) profiles; (b) Determine streamline envelope size (SES) of fluid using equation (i); and (c) Determine SES of proppant using equation (ii). It is found that both of fluid SES and proppant SES remain nearly unchanged with varying perforation azimuth for the same input parameters. By utilizing this finding, the proppant efficiency for perforation with arbitrary azimuth is calculated based on the two equations. This methodology significantly reduces the number of CFD models required to develop the correlations.

After completing CFD modeling with 270° perforation(s) with all designed parameters, proppant efficiencies for perforation of 0°-180° are calculated using the method introduced above. Both the CFD modeling results and the calculated results are employed to correlate proppant efficiency with key parameters, including pumping rate, flowrate through the perforation(s), proppant size, proppant concentration, fluid viscosity, perforation azimuth, perforation diameter, perforation number, and wellbore diameter. The developed correlations are used to calculate proppant distribution along a full stage with arbitrary perforation number and azimuth for given fluid distribution values. The procedure is summarized below: Based on operational parameters and fluid and proppant properties, calculate proppant efficiency for perforations in the first heel cluster; Record the amount of proppant received by this cluster and update the downstream wellbore flowrate and proppant concentration; Go to the subsequent cluster until the last one in toe is reached.

The process assumes that equilibrium state is achieved before slurry arriving at each cluster along the full stage. However, for relatively short cluster spacing, concentration multipliers (developed using the concentration profiles collected from several locations in the 40-ft long pipe before the outlet) is used to relax this assumption and make this process more robust.

WELLBORE TO FRACTURE CONNECTIVITY APPARATUS: Conventional approaches have suffered from an inability to predict plugging (e.g., partial plugging and complete plugging) of a perforation to fracture connected region, which has resulted in non-uniform fluid and proppant distribution and/or placement. In multistage horizontal wellbore fracturing, multiple hydraulic fractures are generated from each perforation and cluster. The designed diameter of the perforation is in a range of 0.2-0.5 inch, whereas the fracture width is in a range of 0.02-0.2 inch. As the fluid and proppant travel through the horizontal wellbore, especially across the different perforations and clusters, variation in proppant concentration across the cross-section as well as along the horizontal wellbore (from toe to heel) tend to occur. The non-uniform fluid and proppant distribution and/or placement may thereby be caused by proppant settling and concentration variation for different cluster design (e.g., cluster spacing), perforation design (e.g., location, count, diameter), flow parameters (e.g., injection rate and fluid distribution across each perforation), fracture fluid properties (e.g., viscosity), and proppant properties (e.g., diameter, specific gravity, concentration).

Indeed, in unconventional horizontal wellbores, a typical hydraulic fracturing treatment is pumped through 5-15 perforation clusters in each stage of plug-n-perf completion. For many of these unconventional fracturing treatments, slickwater is commonly used as a carrier fluid to transport proppant. Due to low viscosity of slickwater and proppant gravity effects, proppant segregation (proppant concentration profile variation within wellbore) and settling at the workstring bottom take place in the wellbore; in addition, proppant does not always follow the fluid streamline due to large inertia while entering a fracture through a perforation from wellbore.

Figure 45:
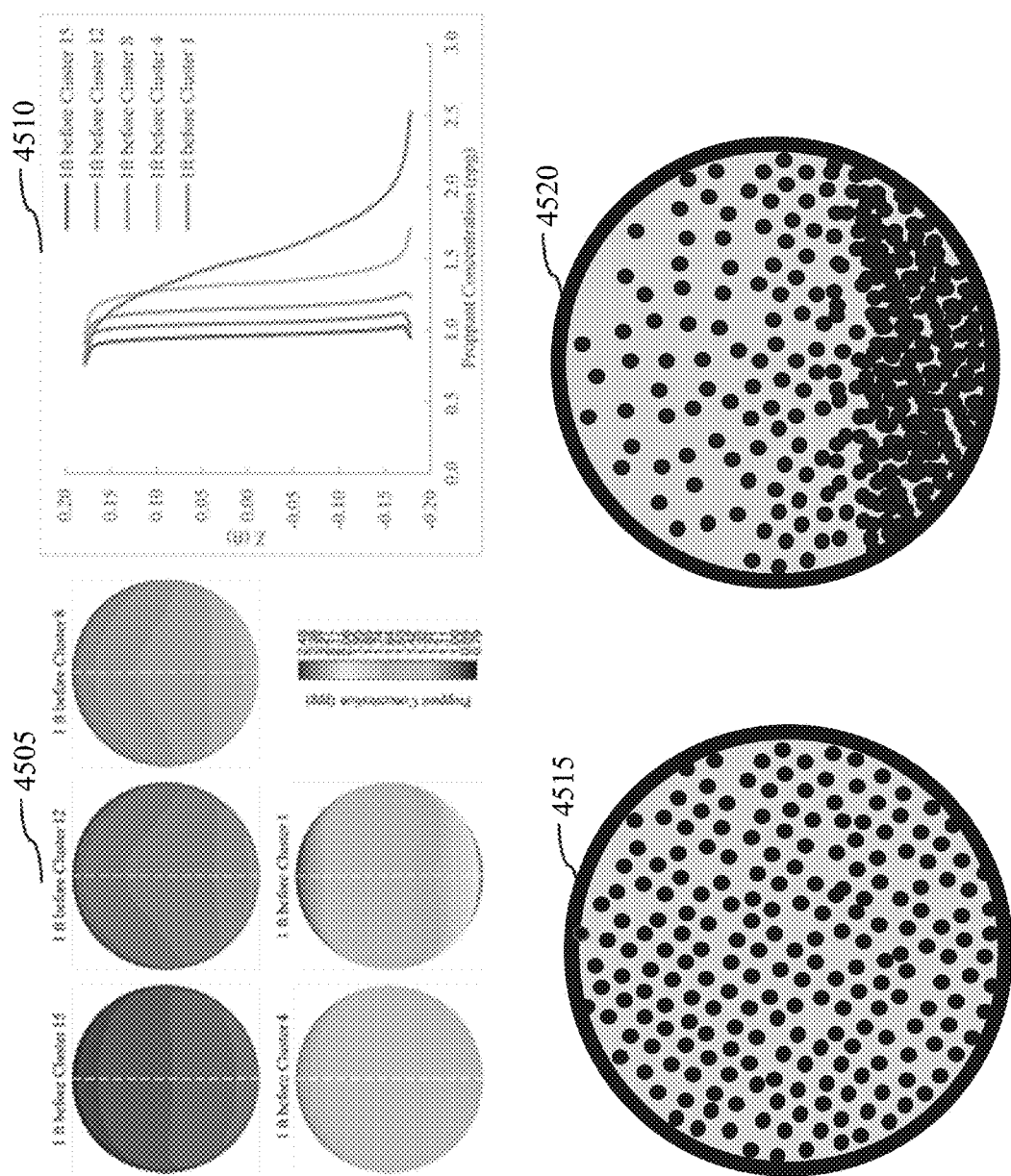
FIG. 45 illustrates the distribution of proppant concentration across the cross-section of a wellbore at different perforation clusters along the wellbore

FIG. 45 illustrates the distribution of proppant concentration across the cross-section of a wellbore at different perforation clusters along the wellbore. For example, 4505 demonstrates proppant concentration across the cross-section of the wellbore at 1 ft before different clusters where cluster 15 is the heel cluster, which is closest to the initial injection where the proppant is likely to be uniformly distributed in frac fluid across the cross-section as illustrated in 4515. With fluid and proppant exiting through at least one perforation opening of each subsequent perforation cluster in flow direction from heel to toe (for example, from cluster 15 to 14 to 13 and thereof), the flow rate or velocity inside the wellbore decreases and proppant settling increases due to gravity effects. As illustrated in 4505, the proppant concentration is increasing towards the bottom of the wellbore with clusters closer to the toe side (smaller cluster number, for example from 12 to 8 to 4 to 1) as illustrated in 4520, which illustrates increased proppant concentration towards the bottom.

The change in proppant concentration across the cross-section of the wellbore for different clusters as it moves from heel to toe is expected with higher concentration towards the bottom. For example, graph 4510 illustrates the proppant concentration on the X-axis and distance from center of the cross-section of wellbore (Z-ft) on the Y-axis, and demonstrates that proppant concentration is uniform and close to 1 ppg from top to bottom at 1 ft before cluster 15, which will be the first cluster from flow direction and at the heel of stage. On the other hand, there is continuous increase in bottom concentration, and the concentration at the bottom can increase (e.g., up to 2.5 ppg) at the bottom at 1 ft before the cluster number 1, which is the last cluster and at the toe of the fracture stage with the lowest velocity inside the wellbore. The increasing proppant concentration at the toe cluster (cluster 1) of the frac stage as illustrated by 4520, which has more plugging of the wellbore to fracture connectivity as compared to uniform proppant concentration distribution at the heel cluster (cluster 15) as illustrated by 4515.

Figure 46:
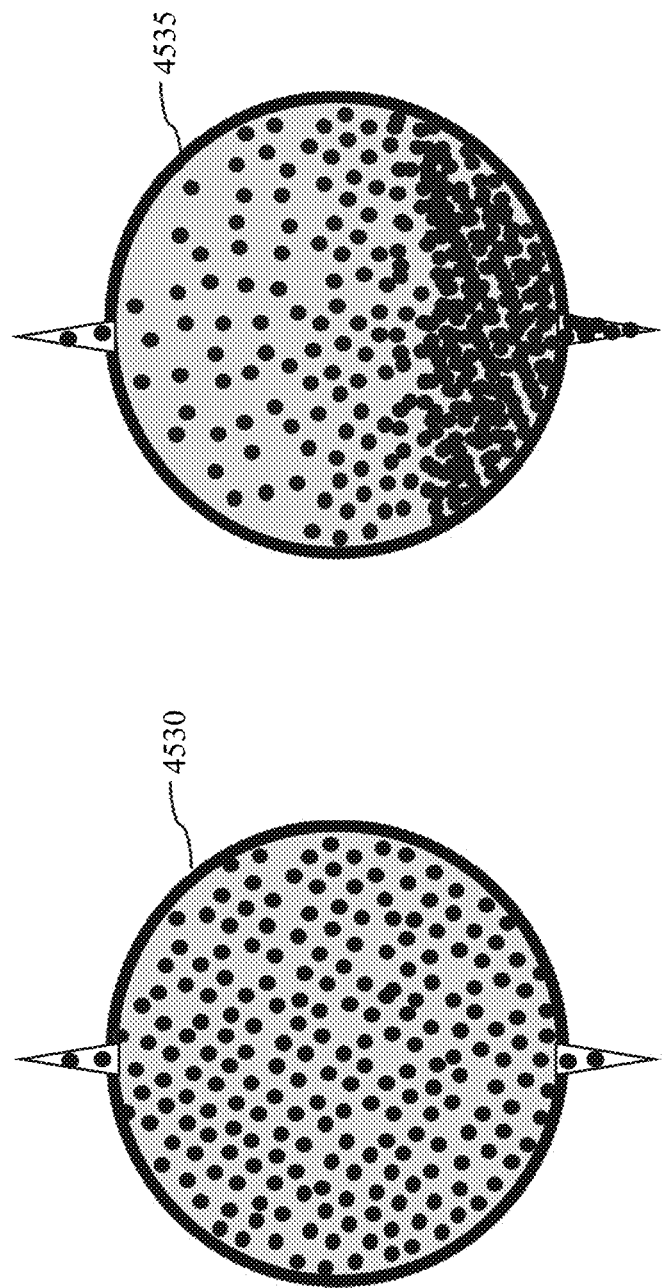
FIG. 46 illustrates an examples of no plugging (left) and plugging (right).

FIG. 46 illustrates proppant concentration entering the opening perforation at the wellbore at different perforation location along circumference and at different perforation clusters because of proppant settling and segregation with gravity and dependent on frac design parameters, such as fracture fluid viscosity, pump rate, proppant size, perforation opening dimension, etc. For example, 4530 illustrates a uniform proppant concentration distribution across the cross-section of the wellbore resulting in lower proppant concentration exiting the wellbore and entering the fracture through the wellbore to fracture connectivity region. With lower concentration and uniform distribution exiting all perforation opening irrespective of their location, there is a lower chance of plugging (partial or complete plugging). On the other hand, 4535 illustrates increasing proppant concentration towards the bottom of the cross-section of the wellbore resulting in higher proppant concentration exiting the wellbore and entering the fracture through the perforation opening located at the bottom and lower proppant concentration exiting the wellbore and entering the fracture through the perforation opening located at top. The higher proppant concentration exiting the wellbore through the bottom perforation opening has more plugging (partial or complete) of the wellbore to fracture connectivity region thereby resulting in non-uniform distribution of fluid and proppant through each perforation opening and perforation clusters, as well as potential risks of complete plugging of opening perforation restricting fluid and proppant entry to the fracture.

Provided herein are various embodiments of a wellbore to fracture connectivity apparatus that may be utilized to represent a wellbore (e.g., perforation of a wellbore) to fracture connection region, for example, to determine the impact of these various factors on plugging (e.g., partial plugging or complete plugging). As an example, laboratory testing of proppant transport in a horizontal wellbore setup, with inclusion of the wellbore to fracture connectivity apparatus representing the perforation to fracture connected region, may be utilized to evaluate the impact of various downhole design variables on plugging (e.g., partial plugging and/or complete plugging) of the perforation to fracture connected region of the horizontal wellbore. The design variables for the multistage horizontal wellbore fracture may include different cluster design (e.g., cluster spacing), perforation design (e.g., location, count, and diameter), flow parameters (e.g., injection rate and fluid distribution across each perforation), fracture fluid properties (e.g., viscosity) and proppant properties (e.g., diameter, specific gravity, and concentration), or any combination thereof.

Advantageously, the wellbore to fracture connectivity apparatus may be utilized to avoid plugging of the wellbore to fracture connected region. For example, the wellbore to fracture connectivity apparatus may be utilized to select parameters to avoid partial plugging or avoid complete plugging of the perforation to fracture connected region for different design variables, which may be referred to as optimizing the parameters. The apparatus may be utilized to select the following parameters to avoid partial plugging or avoid complete plugging: (a) perforation azimuth (e.g., location across circumference), (b) number of cluster per stage, (c) cluster design (e.g., cluster spacing), (d) perforation design (e.g., location, count, and diameter), (e) flow parameters (e.g., injection rate in the wellbore and fluid distribution across each perforation), (f) fracture fluid properties (e.g., viscosity), (g) proppant properties (e.g., diameter, specific gravity, and concentration), or any combination thereof. The improved or optimum designs and correlations developed may be used in the design of perforation and frac completions for formations involving hydraulic fracturing, such as unconventional formations, to avoid partial plugging or avoid complete plugging.

Advantageously, the wellbore to fracture connectivity apparatus may be utilized to avoid plugging of the wellbore to fracture connected region for a perforation of the wellbore as well as other types of openings of the wellbore. Although perforations are discussed throughout this disclosure, the wellbore to fracture connectivity apparatus may be utilized when the opening of the wellbore is an opening in a liner or an opening in a sleeve in a similar manner.

The wellbore to fracture connectivity apparatus includes an opening portion, a coupling portion, and a fracture portion with the coupling portion coupling both the opening portion and the fracture portion. In some embodiments, the wellbore to fracture connectivity apparatus includes a plurality of one or more of the portions. Some embodiments may include a plurality of coupling portions (e.g., two coupling portions). Some embodiments may include a plurality of opening portions (e.g., two opening portions) and a plurality of coupling portions (e.g., two coupling portions). The apparatus may be created using three dimensional (3D) printing in some embodiments. The portions may be integral with each other and/or coupled to each other (e.g., screwing together or using connectors) depending on the embodiment.

For example, a particular apparatus may be manufactured with the portions being integral by using 3D printing. Alternatively, 3D printing may be utilized to print separate portions, and then the separate portions may be coupled together. The portions of the apparatus may be made from practically any material or combination of materials that can withstand the fluid (e.g., fracture fluid, slick water, etc.), the proppant (e.g., sand, manufactured proppant, etc.), or any combination thereof that will flow through the portions. For example, the portions of the apparatus may be made from the following materials: plastic, metal, thermoplastic, PLA (polylactic acid), fiber, polycarbonate, polypropylene, or any combination thereof.

In operation, the wellbore to fracture connectivity apparatus may be coupled to an opening of a wellbore portion that represents the wellbore to create a representative near wellbore environment in a laboratory setting. In operation, a plurality of the wellbore to fracture connectivity apparatus may even be coupled to a plurality of openings of the wellbore portion to create the representative near wellbore environment in the laboratory setting. For example, after one or more of the apparatus is coupled to the wellbore portion, proppant slurry can flow through the wellbore portion and out the one or more apparatuses to simulate proppant slurry entering from the perforation to generate at least one fracture.

For example, the 3D printed cell or other manmade hardware, which represents the wellbore perforation to fracture connectivity profile, can be used in laboratory testing or attached to the wellbore lab model directly or indirectly to study the impact of perforation and frac design to fracture interaction on proppant transport in wellbore and distribution. The study may involve optimization of perforation design parameter along with frac design parameters and various near wellbore fracture connectivity properties.

The 3D printed cell or other manmade hardware representing wellbore perforation to fracture connectivity profile can have different strength, dimension and roughness, etc. to better represent the field conditions. Attaching this equipment directly or indirectly to the wellbore model (referred to as wellbore portion herein) may allow study of the impact of near wellbore interaction of perforation and fracture, and optimize perforation and frac parameters to not only avoid screen out or sand out, but also to determine improved (or perhaps) optimum perforation azimuth location, etc. Thus, a wellbore perforation to fracture connectivity profile may be determined to test and optimize perforation and frac design with considerations of fluid and proppant transport mechanisms and interactions near wellbore.

OPENING PORTION: The opening portion of the wellbore to fracture connectivity apparatus represents the opening of the wellbore for receiving the fluid, the proppant, or any combination thereof to generate the at least one fracture in the formation. The opening of the wellbore may be a perforation of the wellbore an opening in a sleeve of the wellbore, an opening in a liner of the wellbore, or other opening of the wellbore for receiving the fluid, the proppant, or any combination thereof to generate the at least one fracture in the formation.

For simplicity, the discussion will focus on the perforation, but the wellbore to fracture connectivity apparatus may be utilized in a similar manner for other types of openings. The perforation may be created with a perforation gun, for example, through the casing of the wellbore, through the cement of the wellbore, and through the formation near the wellbore. The opening portion may represent the perforation within the casing, the perforation within the cement, or both.

As such, the opening portion may include a casing portion to represent the perforation within the casing, a cement portion to represent the perforation within the cement, or both. The perforation within the formation will be discussed in the context of the coupling portion of the wellbore to fracture connectivity apparatus.

The opening portion may have a variety of shapes such as a spherical shape (e.g., a cylindrical shape, a conical shape, etc.) or a nonspherical shape. In some embodiment, the shape of the opening portion may be substantially the same shape from the inlet of the opening portion to the outlet of the opening portion. For example, the opening portion may have a circular shape from the inlet of the opening portion through the outlet of the opening portion to form a cylinder. In some embodiments, a particular perforation may have atypical shape due to erosion such as a nonspherical shape, and therefore, the shape of the opening portion may be substantially the same as the atypical shape of the particular perforation for analysis.

However, in some embodiment, the shape of the opening portion may change from the inlet to the outlet of the opening portion depending on the analysis to be conducted. For example, the opening portion may start with a circular shape at the inlet of the opening portion to correspond with a circular perforation in the casing and the cement of the wellbore, and the shape of the opening portion tapers inwards towards the outlet of the opening portion.

The inner width or inner diameter of the opening portion may vary. As the apparatus may be coupled directly or indirectly with the perforation, the inner width or the inner diameter of the inlet of the opening portion may be substantially the same as the inner width or inner diameter of the perforation in the casing, in the cement, or both. In some embodiments, the inner width or inner diameter of the opening portion may be substantially the same from the inlet of the opening portion to the outlet of the opening portion.

However, in some embodiment, the inner width or inner diameter of the opening portion may change from the inlet of the opening portion to the outlet of the opening portion. For example, the inner width or inner diameter of the casing portion of the opening portion may be different than the inner width or inner diameter of the cement portion of the opening portion. For example, the inner width or inner diameter of a particular perforation may become larger or distorted due to erosion, and therefore, the inner width or the inner diameter of the opening portion may be substantially the same as the larger or distorted inner width or inner diameter of the particular perforation for analysis.

Of note, the terms "inner width" and "inner diameter" are both utilized because the shape of the opening portion may vary. The term "inner diameter" is appropriate when the shape of the opening portion has an inner diameter while the term "inner width" is appropriate when the shape of the opening portion has an inner width instead of an inner diameter.

In some embodiments, the opening portion has an inner width or inner diameter of at least 0.20 inch from the inlet to the outlet of the opening portion (e.g., at least 0.25 inch, at least 0.3 inch, at least 0.35 inch, at least 0.4 inch, at least 0.45 inch, at least 0.5 inch, at least 0.55 inch, at least 0.6 inch, at least 0.65 inch, at least 0.7 inch, at least 0.75 inch, at least 0.8 inch, at least 0.85 inch, at least 0.9 inch, at least 0.95 inch, at least 1 inch, at least 1.25 inches, at least 1.5 inches, or at least 1.75 inches). In some embodiments, the opening portion has an inner width or inner diameter of 2.0 inches or less from the inlet to the outlet of the opening portion (e.g., 1.75 inches or less, 1.5 inches or less, 1.25 inches or less, 1 inch or less, 0.95 inch or less, 0.9 inch or less, 0.85 inch or less, 0.8 inch or less, 0.75 inch or less, 0.7 inch or less, 0.65 inch or less, 0.6 inch or less, 0.55 inch or less, 0.5 inch or less, 0.45 inch or less, 0.4 inch or less, 0.35 inch or less, 0.3 inch or less, or 0.25 inch or less). The inner width or inner diameter of the opening portion from the inlet to the outlet can range from any of the minimum values described above to any of the maximum values described above. For example, in some embodiments, the inner width or inner diameter of the opening portion from the inlet to the outlet of the opening portion can be of from 0.2 inch to 2 inches (e.g., of from 0.3 inch to 0.4 inch, of from 0.3 inch to 0.5 inch, of from 0.3 inch to 0.8 inch, of from 0.2 inch to 1 inch, or of from 0.2 inch to 1.5 inch). In one embodiment, the opening portion has an inner width or inner diameter of about 0.5 inch from the inlet to the outlet of the opening portion.

The height of the opening portion may also vary. As the apparatus may be coupled directly or indirectly with the perforation, the height of the opening portion from the inlet of the opening portion to the outlet of the opening portion may be substantially the same as the height or thickness of the perforation within the casing, the perforation within the cement, or both. In some embodiments, the opening portion has a height of at least 0.25 inch from the inlet to the outlet of the opening portion (e.g., at least 0.3 inch, at least 0.35 inch, at least 0.4 inch, at least 0.45 inch, at least 0.5 inch, at least 0.55 inch, at least 0.6 inch, at least 0.65 inch, at least 0.7 inch, at least 0.75 inch, at least 0.8 inch, at least 0.85 inch, at least 0.9 inch, at least 0.95 inch, at least 1 inch, at least 1.25 inches, or at least 2 inches). In some embodiments, the opening portion has a height of 2.5 inches or less from the inlet to the outlet of the opening portion (e.g., 2 inches or less, 1.5 inches or less, 1.225 inch or less, 1 inch or less, 0.95 inch or less, 0.9 inch or less, 0.85 inch or less, 0.8 inch or less, 0.75 inch or less, 0.7 inch or less, 0.65 inch or less, 0.6 inch or less, 0.55 inch or less, 0.5 inch or less, 0.45 inch or less, 0.4 inch or less, 0.35 inch or less, or 0.3 inch or less). The height of the opening portion can range from any of the minimum values described above to any of the maximum values described above. For example, in some embodiments, the height of the opening portion from the inlet to the outlet of the opening portion can be of from 0.25 inch to 2.5 inches (e.g., of from 0.3 inch to 1 inch, of from 0.3 inch to 0.5 inch, or of from 0.3 inch to 1 inch). In one embodiment, the opening portion has a height of about 1.237 inches.

The opening portion includes at least one passageway within the opening portion to allow the fluid, the proppant, or any combination thereof to flow through the opening portion to the coupling portion. The opening portion includes an inner surface and an outer surface, and the size of the at least one passageway may depend on the inner surface of the opening portion. In one embodiment, at least a portion of the inner surface of the opening portion may be smooth. The smooth surface may be utilized to analyze injection of the fluid, the proppant, or any combination thereof through a new perforation of a casing and cement. In one embodiment, at least a portion of the inner surface of the opening portion may include an obstruction to represent erosion, inefficient perforation, poor performance of perforation gun charge, etc. The obstruction may include roughness on the inner surface, uniformity on the inner surface, layering on the inner surface, etc. As the fluid, the proppant, or any combination thereof will be passing through the passageway of the opening portion, the outer surface of the opening portion may be smooth.

The area of the passageway of the opening portion may vary. In some embodiments, the opening portion has an area of at least 0.01 inch2 (e.g., at least 0.03 inch2, at least 0.10 inch2, at least 0.20 inch2, or at least 1 inch2). In some embodiments, the passageway has an area of 5 inches2 or less (e.g., 4 inches2 or less, 3 inches2 or less, 1 inches2 or less, or 0.1 inch or less). The area of the passageway can range from any of the minimum values described above to any of the maximum values described above. For example, in some embodiments, the area of the passageway can be of from 0.01 inch2 to 5 inches2 (e.g., of from 0.01 inch2 to 1 inche2 or 0.01 inch2 to 3 inches2). In one embodiment, the passageway of the opening portion has an area of about 0.19635 inch2. Of note, these ranges and values may be used for the passageway of the coupling portion and the passageway of the fracture portion, but the reasoning and causes resulting in obstructions in the passageway will be different. Thus, the inner surface of for all three opening portion, coupling portion, and fracture portion may have options for different obstructions that affect the area of the respective passageway for different reasons, causes, etc.

Figure 47A:
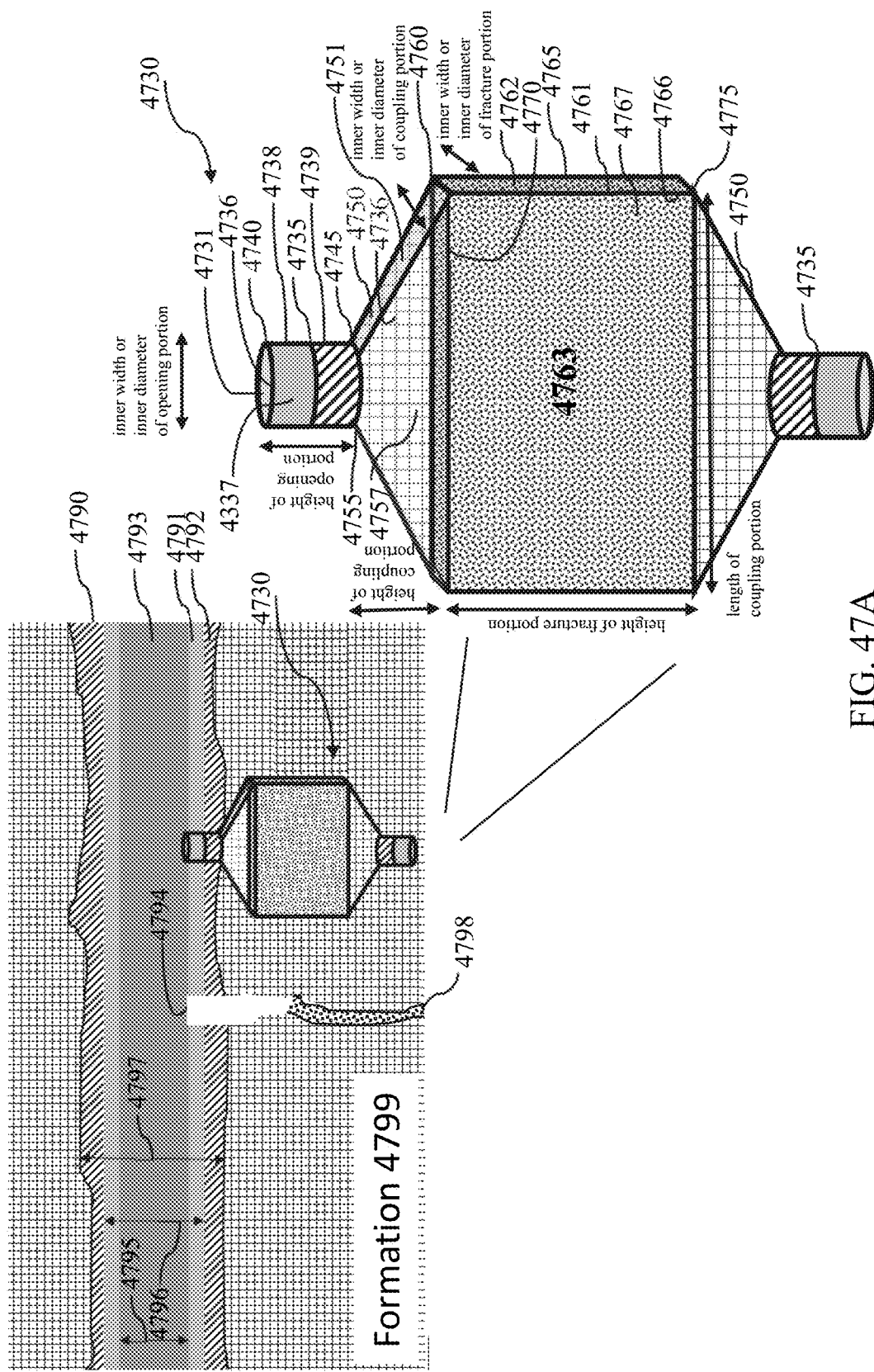
FIG. 47A illustrates one embodiment of a wellbore to fracture connectivity apparatus.

FIG. 47A illustrates one embodiment of the wellbore to fracture connectivity apparatus 4730 to represent a near wellbore environment 4790. The apparatus 4730 has an opening portion 4735 with an inlet 4740 and an outlet 4745. The opening portion 4735 has a circular shape from the inlet 4740 of the opening portion 4735 through the outlet 4745 of the opening portion 4735 to form a cylindrical shape. The opening portion 4735 includes a casing portion 4738 that represents casing 4791 of setup 4790 and a cement portion 4739 that represents cement 4792 of the near wellbore environment 4790. The gray color of the casing portion 4738 and the casing 4791 of the near wellbore environment 4790 illustrates that casing portion 4738 represents the casing 4791, including representing the height or thickness of the casing 4791. Similarly, the diagonal line pattern of the cement portion 4739 and the cement 4792 of the near wellbore environment 4790 illustrates that the cement portion 4739 represents the cement 4792, including representing the height or thickness of the cement 4792.

The near wellbore environment 4790 includes a pipe 4793 utilized in the horizontal section of a horizontal wellbore with at least one opening, such as perforation 4794. The near wellbore environment 4790 includes a diameter of about 4.276 inches for the pipe only as illustrated by line 4795, a diameter of about 5 inches for the pipe and casing only as illustrated by line 4796, and a diameter of about 6.75 inches for the pipe, casing, and cement as illustrated by line 4797. The inner diameter of the inlet 4740 of the opening portion 4735 is substantially the same as the inner diameter of the perforation 4794 of the pipe 4793 of the near wellbore environment 4790. As such, in FIG. 47A, the opening portion 4735 has a height of about 1.237 inches from the inlet 4740 to the outlet 4745 with the casing portion 4738 having a height of about 0.362 inch and the cement portion 4739 having a height of about 0.875 inch. In FIG. 47A, the opening portion 4735 has an inner diameter of about 0.5 inch from the inlet 4740 to the outlet 4745.

The opening portion 4735 includes an inner surface 4736 and an outer surface 4737. For simplicity, in FIG. 47A, the inner surface 4736 and the outer surface 4737 are essentially smooth from the inlet 4740 of the opening portion 4735 to the outlet 4745 of the opening portion 4750, and a passageway 4731 allows the fluid, the proppant, or any combination thereof to flow through the opening portion 4735 to a coupling portion 4750 of the apparatus 4730. In FIG. 47A, the passageway 4731 of the opening portion 4735 has an area of about 0.19635 square inch. However, the inner surface 4736 may substantially replicate the perforation 4794 in the casing 4791 and in the cement 4792 of the near wellbore environment 4790. For example, the inner surface 4736 may include an obstruction, such as roughness, unconformity, or layering, even replicating erosion, depending on the desired analysis. The inner surface 4736 may include an obstruction from the inlet 4740 of the opening portion 4735 to the outlet 4745 of the opening portion 4750. Those of ordinary skill in the art may appreciate that the opening portion 4735 may be utilized to analyze many sorts of scenarios such as those of the near wellbore environment 4790, what if scenarios, etc.

Figure 47B:
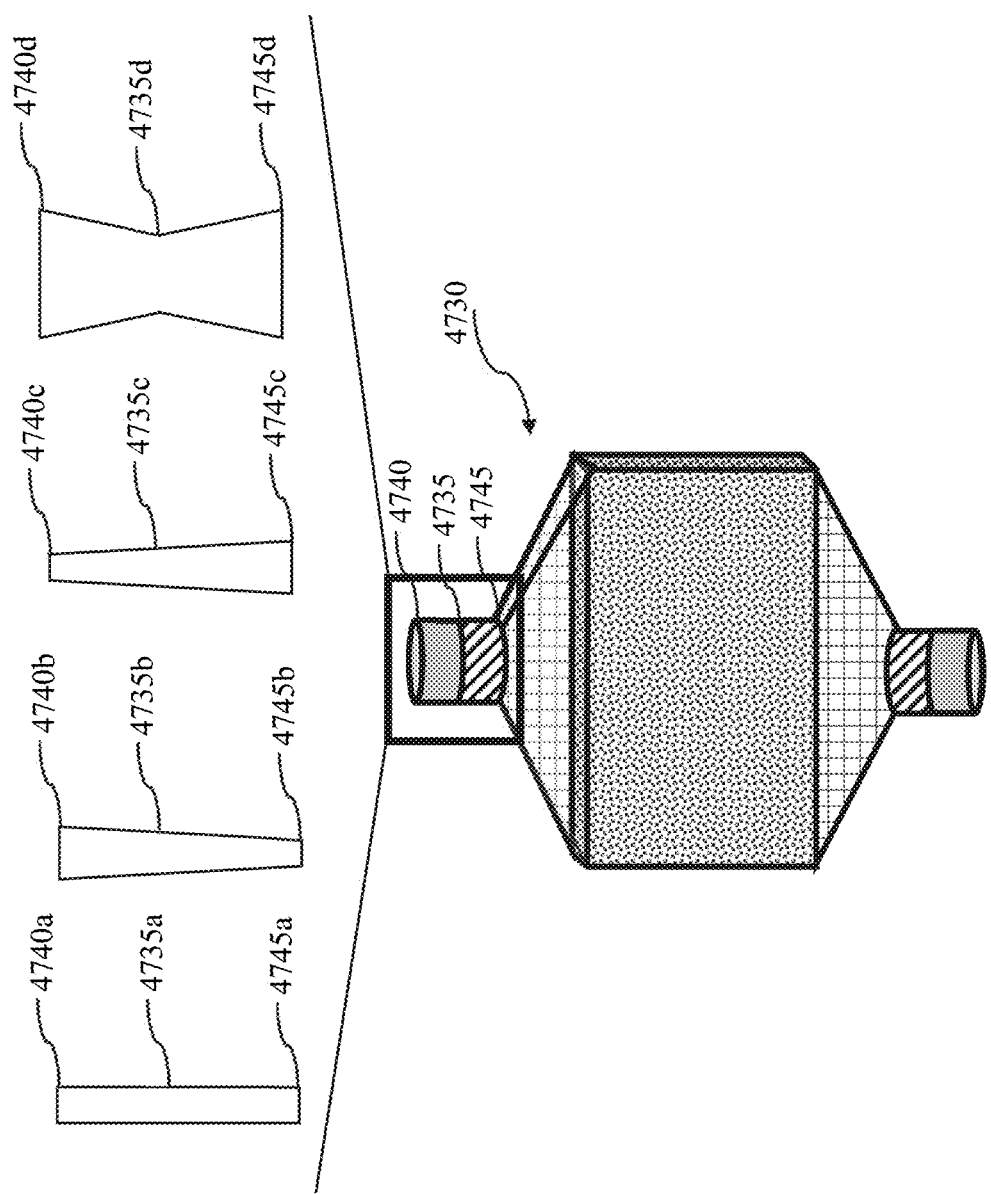
FIG. 47B illustrates various embodiments of the opening portion of the wellbore to fracture connectivity apparatus of FIG. 47A.

FIG. 47B illustrates various non-limiting embodiments of the opening portion 4735 from a side view perspective. The shape of the opening portion 4735a may be essentially the same from the inlet 4740a of the opening portion 4735a to the outlet 4745a of the opening portion 4735a. The shape of the opening portion 4735b tapers inward from the inlet 4740b towards the outlet 4745b. The opening portion 4735c illustrates that the shape of the opening portion 4735c tapers outward the inlet 4740c towards the outlet 4745c. The opening portion 4735d has essentially an hour glass from the inlet 4740d towards the outlet 4745d.

Figure 47C:
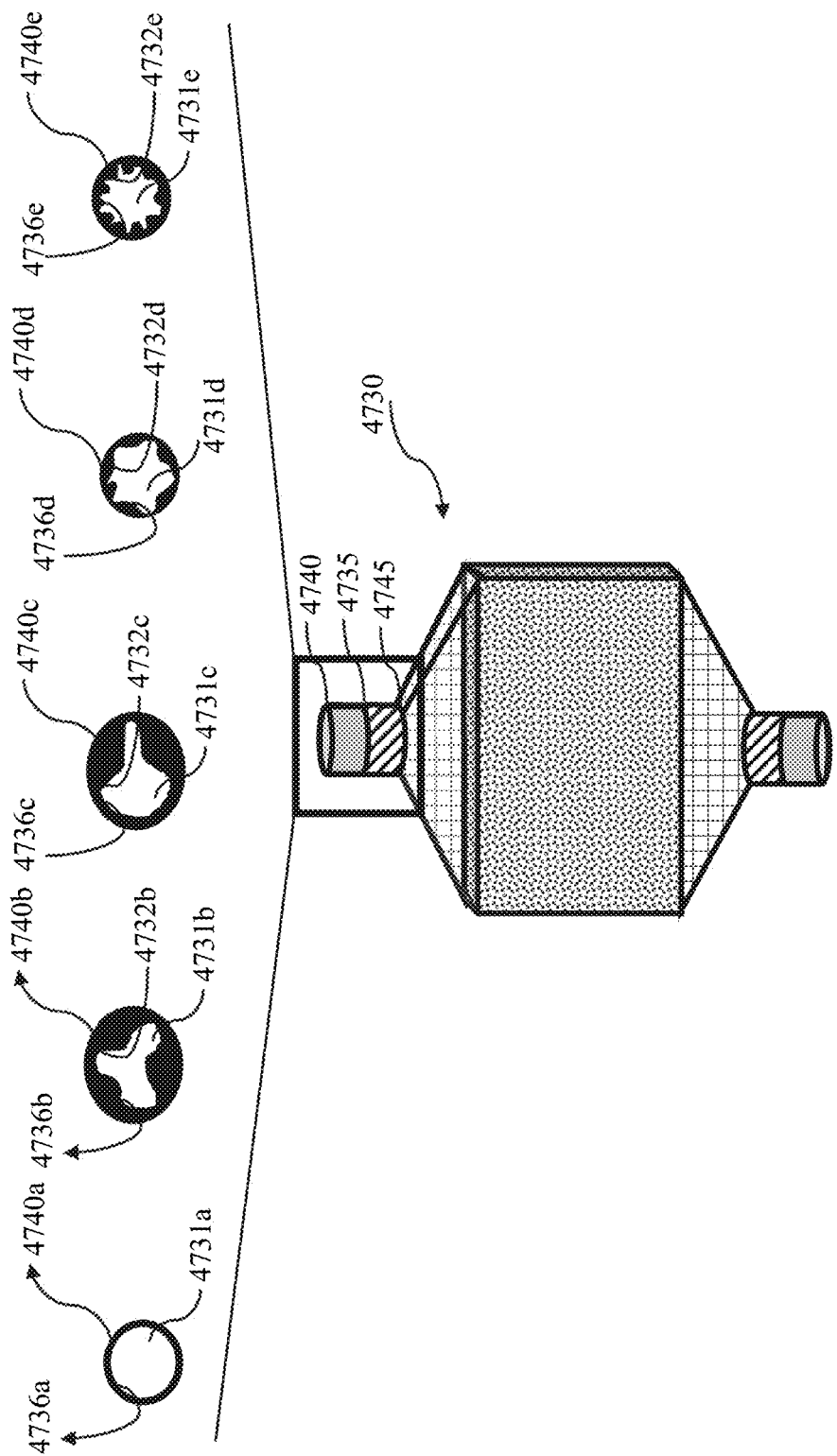
FIG. 47C illustrates various embodiments of the opening portion of the wellbore to fracture connectivity apparatus of FIG. 47A.

FIG. 47C illustrates various non-limiting embodiments of the opening portion 4735 from a top view perspective. The inlet 4740a has a circular shape, an inner surface 4736a that is smooth, and a passageway 4731a. The inlet 4740b has a circular shape, an inner surface 4736a that includes an obstruction 4732b (e.g., roughness, unconformity, or layering), and a passageway 4731b that is smaller than the passageway 4731a due to the obstruction 4732b. The inlet 4740c has a circular shape, an inner surface 4736c that includes an obstruction 4732c, and a passageway 4731c that is smaller than the passageway 4731a due to the obstruction 4732c. The inlet 4740d has a circular shape, an inner surface 4736d that includes an obstruction 4732d, and a passageway 4731d that is smaller than the passageway 4731a due to the obstruction 4732d. The inlet 4740e has a circular shape, an inner surface 4736e that includes an obstruction 4732e, and a passageway 4731e that is smaller than the passageway 4731a due to the obstruction 4732e. The obstruction may be present from the inlet to the outlet of the opening portion in some embodiments.

COUPLING PORTION: The coupling portion of the wellbore to fracture connectivity apparatus represents the wellbore to fracture connectivity between the opening portion and a fracture portion. In other words, the coupling portion represents the perforation within the formation. For simplicity, the discussion will mention the perforation, but the wellbore to fracture connectivity apparatus may be utilized in a similar manner for other types of openings such as an opening in a sleeve, an opening in a liner, or other opening for generating the at least one fracture. The fracture portion will be discussed separately hereinbelow.

The coupling portion may have a variety of shapes such as a spherical shape (e.g., a triangular shape, a conical shape, etc.) or a nonspherical shape. In some embodiment, the dimensions of the inlet of the coupling portion may be similar to the dimensions of the outlet of the opening portion so that the fluid, the proppant, or any combination thereof may flow from through the opening portion to the fracture portion. In some embodiment, the narrowest length of the coupling portion may be near the outlet of the opening portion (e.g., appearing as a triangular shape). However, in some embodiments, the narrowest length of the coupling portion may be near the inlet of the fracture portion (e.g., appearing as an upside triangular shape).

The inner width or inner diameter of the coupling portion may vary. As the apparatus may be coupled directly or indirectly with the perforation, the inner width or the inner diameter of the inlet of the coupling portion may be substantially the same as the inner width or inner diameter of the perforation within the formation. In some embodiments, the inner width or inner diameter of the coupling portion may be substantially the same from the inlet of the coupling portion to the outlet of the coupling portion. However, in some embodiment, the inner width or inner diameter of the coupling portion may change (e.g., increase or decrease) from the inlet of the coupling portion to the outlet of the coupling portion, for example, depending on the desired analysis.

In some embodiments, the coupling portion has an inner width or inner diameter of at least 0.02 inch from the inlet to the outlet of the coupling portion (e.g., at least 0.05 inch, at least 0.1 inch, at least 0.12 inch, at least 0.15 inch, at least 0.20 inch, at least 0.25 inch, or at least 0.3 inch). In some embodiments, the coupling portion has an inner width or inner diameter of 0.3 inch or less from the inlet to the outlet of the coupling portion (e.g., 0.25 inch or less, 0.20 inch or less, 0.15 inch or less, 0.10 inch or less, 0.05 inch or less, or 0.03 inch or less). The inner width or inner diameter of the coupling portion from the inlet to the outlet of the coupling portion can range from any of the minimum values described above to any of the maximum values described above. For example, in some embodiments, the inner width or inner diameter of the coupling portion from the inlet to the outlet of the coupling portion can be of from 0.02 inch to 0.3 inch (e.g., of from 0.05 inch to 0.15 inch or of from 0.1 inch to 0.2 inch). In one embodiment, the coupling portion has an inner width or inner diameter of about 0.1 inch.

The height of the coupling portion may also vary. As the apparatus may be coupled directly or indirectly with the perforation, the height of the coupling portion from the inlet of the coupling portion to the outlet of the coupling portion may be substantially the same as the height of the perforation within the formation. In some embodiments, the coupling portion has a height of at least 0.02 inch from the inlet to the outlet of the coupling portion (e.g., at least 0.03 inch, at least 0.04 inch, at least 0.05 inch, at least 0.06 inch, at least 0.07 inch, at least 0.08 inch, at least 0.09 inch, at least 0.1 inch, at least 0.5 inch, at least 1 inch, at least 1.5 inches, at least 2 inches, at least 2.5 inches, at least 3 inches, at least 3.5 inches, at least 4 inches, or at least 4.5 inches). In some embodiments, the coupling portion has a height of 5 inches or less from the inlet to the outlet of the coupling portion (e.g., 4.5 inches or less, 4 inches or less, 3.5 inches or less, 3 inches or less, 2.5 inches or less, 2 inches or less, 1.5 inches or less, 1 inch or less, 0.5 inch or less, 0.1 inch or less, 0.09 inch or less, 0.08 inch or less, 0.07 inch or less, 0.06 inch or less, 0.05 inch or less, 0.04 inch or less, or 0.03 inch or less). The height of the coupling portion can range from any of the minimum values described above to any of the maximum values described above. For example, in some embodiments, the height of the coupling portion from the inlet to the outlet of the coupling portion can be of from 0.02 inch to 5 inches (e.g., of from 0.02 inch to 1 inch, of from 0.02 inch to 2 inches, or of from 0.02 inch to 3 inches). In one embodiment, the coupling portion has a height of about 1 inch.

The length of the coupling portion may also vary. As the apparatus may be coupled directly or indirectly with the perforation, the length of the coupling portion from one side of the coupling portion across to the other side of the coupling portion may be substantially the same as the length of the perforation within the formation. In some embodiments, the coupling portion has a length of at least 0.20 inch from one side of the coupling portion across to the other side of the coupling portion (e.g., at least 0.30 inch, at least 0.40 inch, at least 0.50 inch, at least 0.60 inch, at least 0.70 inch, at least 0.80 inch, at least 0.90 inch, at least 1 inch, at least 2 inches, at least 2.5 inches, at least 3 inches, at least 3.5 inches, at least 4 inches, or at least 4.5 inches). In some embodiments, the coupling portion has a length of 5 inches or less from one side of the coupling portion across to the other side of the coupling portion (e.g., 4.5 inches or less, 4 inches or less, 3.5 inches or less, 3 inches or less, 2.5 inches or less, 2 inches or less, 1.5 inches or less, 1 inch or less, 0.5 inch or less, 0.4 inch or less, 0.3 inch or less, or 0.25 inch or less). The length of the coupling portion can range from any of the minimum values described above to any of the maximum values described above. For example, in some embodiments, the length of the coupling portion from one side of the coupling portion across to the other side of the coupling portion can be of from 0.20 inch to 5 inches (e.g., of from 0.1.5 inch to 2 inch, of from 0.1 inch to 3 inches, or of from 1.75 inch to 2 inches). In one embodiment, the coupling portion has a length of about 1.96 inches.

The coupling portion includes at least one passageway within the coupling portion to allow the fluid, the proppant, or any combination thereof to flow through the coupling portion to the fracture portion. The coupling portion includes an inner surface and an outer surface, and the size of the at least one passageway may depend on the inner surface of the coupling portion. In one embodiment, at least a portion of the inner surface of the coupling portion may be smooth. In one embodiment, at least a portion of the inner surface of the coupling portion may include an obstruction to represent the formation, crushed zone, etc. The obstruction may include roughness on the inner surface, unconformity on the inner surface, layering on the inner surface, etc. As the fluid, the proppant, or any combination thereof will be passing through the passageway of the coupling portion, the outer surface of the coupling portion may be smooth.

The area of the passageway of the coupling portion may vary. In some embodiments, the coupling portion has an area of at least 0.01 inch2 (e.g., at least 0.03 inch2, at least 0.10 inch2, at least 0.20 inch2, or at least 1 inch2). In some embodiments, the passageway has an area of 5 inches2 or less (e.g., 4 inches2 or less, 3 inches2 or less, 1 inches2 or less, or 0.1 inch or less). The area of the passageway can range from any of the minimum values described above to any of the maximum values described above. For example, in some embodiments, the area of the passageway can be of from 0.01 inch2 to 5 inches2 (e.g., of from 0.01 inch2 to 1 inche2 or 0.01 inch2 to 3 inches2). In one embodiment, the passageway of the coupling portion has an area of about 0.19635 inch2.

Returning to FIG. 47A, this figure illustrates one embodiment of the wellbore to fracture connectivity apparatus 4730 to represent the near wellbore environment 4790. The apparatus 4730 has a coupling portion 4750 with an inlet 4755 and an outlet 4760. The coupling portion 4750 has a triangular shape from the inlet 4755 of the coupling portion 4750 through the outlet 4760 of the coupling portion 4750. The square pattern of the coupling portion 4750 and formation 4799 of the near wellbore environment 4790 illustrates that the coupling portion 4750 represents the perforation 4794 within the formation. In FIG. 47A, the inner width, the height, and the length the coupling portion 4750 may be values provided hereinabove.

The coupling portion 4750 includes an inner surface 4756 and an outer surface 4757. For simplicity, in FIG. 47A, the inner surface 4756 and the outer surface 4757 are essentially smooth from the inlet 4755 of the coupling portion 4750 to the outlet 4760 of the coupling portion 4750, and a passageway 4751 allows the fluid, the proppant, or any combination thereof to flow through the coupling portion 4750 to a fracture portion 4760 of the apparatus 4730. However, the inner surface 4756 may substantially replicate the perforation 4794 in the formation 4799 of the near wellbore environment 4790. For example, the inner surface 4756 may include an obstruction, such as roughness, unconformity, or layering, even replicating the crushed zone, depending on the desired analysis. The inner surface 4756 may include an obstruction from the inlet 4755 of the coupling portion 4750 to the outlet 4760 of the coupling portion 4750. If the coupling portion 4750 includes an obstruction, the obstruction may be similar or different from an obstruction in the opening portion 4735 depending on the desired analysis. Those of ordinary skill in the art may appreciate that coupling portion 4750 may be utilized to analyze many sorts of scenarios such as those of the near wellbore environment 4790, what if scenarios, etc.

FIGS. 47D, 47E, and 47F illustrate various non-limiting embodiments of the coupling portion 4750 from a front view perspective. In FIG. 47D, the shape of the coupling portion 4750a is essentially an inverted triangle from the inlet 4755a of the coupling portion 4750a to the outlet 4760a of the coupling portion 4750a. In FIG. 47E, the shape of the coupling portion 4750b is essentially an hourglass from the inlet 4755b of the coupling portion 4750b to the outlet 4760b of the coupling portion 4750b. In FIG. 47F, the shape of the coupling portion 4750c is essentially triangular from the inlet 4740c of the coupling portion 4750c towards the outlet 4745c of the coupling portion 4750c, but a different triangular shape than illustrated in FIG. 47A.

FRACTURE PORTION—The fracture portion of the wellbore to fracture connectivity apparatus represents at least one fracture generated in the formation. For simplicity, the discussion will mention on the perforation, but the wellbore to fracture connectivity apparatus may be utilized in a similar manner for other types of openings such as an opening in a sleeve, an opening in a liner, or other opening for generating the at least one fracture. The fracture portion will be discussed separately hereinbelow.

The fracture portion may have a variety of shapes such as a spherical shape (e.g., a quadrilateral shape, a rectangular shape, a cube shape, etc.) or a nonspherical shape. In some embodiment, the dimensions of the inlet of the fracture portion may be similar to the dimensions of the outlet of the coupling portion so that the fluid, the proppant, or any combination thereof may flow from through the coupling portion to the fracture portion. In some embodiment, the length of the fracture portion may be substantially the same from the inlet to the outlet of the fracture portion (e.g., appearing as a rectangular shape). In some embodiments, it may be desirable that the length and width of the fracture portion are able to generate substantially the same flow area as the inner diameter of the perforation.

The inner width or inner diameter of the fracture portion may vary. As the apparatus may be coupled directly or indirectly with the perforation, the inner width or the inner diameter of the inlet of the fracture portion may be substantially the same as the inner width or inner diameter of the at least one fracture within the formation. In some embodiments, the inner width or inner diameter of the fracture portion may be substantially the same from the inlet of the fracture portion to the outlet of the fracture portion. However, in some embodiment, the inner width or inner diameter of the fracture portion may change (e.g., increase or decrease) from the inlet of the fracture portion to the outlet of the fracture portion, for example, depending on the desired analysis.

In some embodiments, the fracture portion has an inner width or inner diameter of at least 0.02 inch from the inlet to the outlet of the fracture portion (e.g., at least 0.05 inch, at least 0.1 inch, at least 0.12 inch, at least 0.15 inch, at least 0.20 inch, at least 0.25 inch, or at least 0.3 inch). In some embodiments, the fracture portion has an inner width or inner diameter of 0.3 inch or less from the inlet to the outlet of the fracture portion (e.g., 0.25 inch or less, 0.20 inch or less, 0.15 inch or less, 0.10 inch or less, 0.05 inch or less, or 0.03 inch or less). The inner width or inner diameter of the fracture portion from the inlet to the outlet of the fracture portion can range from any of the minimum values described above to any of the maximum values described above. For example, in some embodiments, the inner width or inner diameter of the fracture portion from the inlet to the outlet of the fracture portion can be of from 0.02 inch to 0.3 inch (e.g., of from 0.05 inch to 0.15 inch or of from 0.1 inch to 0.2 inch). In one embodiment, the fracture portion has an inner width or inner diameter of about 0.1 inch.

The height of the fracture portion may also vary. As the apparatus may be coupled directly or indirectly with the perforation, the height of the fracture portion from the inlet of the fracture portion to the outlet of the fracture portion may be substantially the same as the height of the perforation and near wellbore fracture complex fracture region within the formation. In some embodiments, the fracture portion has a height of at least 0.2 inch from the inlet to the outlet of the fracture portion (e.g., at least 0.3 inch, at least 0.4 inch, at least 0.5 inch, at least 0.6 inch, at least 0.7 inch, at least 0.8 inch, at least 0.9 inch, at least 1 inch, at least 1.5 inch, at least 2 inch, at least 2.5 inches, at least 3 inches, at least 3.5 inches, at least 4 inches, or at least 4.5 inches). In some embodiments, the fracture portion has a height of 5 inches or less from the inlet to the outlet of the fracture portion (e.g., 4.5 inches or less, 4 inches or less, 3.5 inches or less, 3 inches or less, 2.5 inches or less, 2 inches or less, 1.5 inches or less, 1 inch or less, 0.9 inch or less, 0.8 inch or less, 0.7 inch or less, 0.6 inch or less, 0.5 inch or less, 0.4 inch or less, or 0.3 inch or less). The height of the fracture portion can range from any of the minimum values described above to any of the maximum values described above. For example, in some embodiments, the height of the fracture portion from the inlet to the outlet of the fracture portion can be of from 0.2 inch to 5 inches (e.g., of from 0.2 inch to 1 inch, of from 0.2 inch to 2 inches, or of from 0.22 inch to 3 inches). In one embodiment, the fracture portion has a height of about 2 inches.

The length of the fracture portion may also vary. As the apparatus may be coupled directly or indirectly with the perforation, the length of the fracture portion from one side of the fracture portion across to the other side of the fracture portion may be substantially the same as the length of the perforation within the formation. In some embodiments, the fracture portion has a length of at least 0.2 inch from one side of the fracture portion across to the other side of the fracture portion (e.g., at least 0.3 inch, at least 0.4 inch, at least 0.5 inch, at least 0.6 inch, at least 0.7 inch, at least 0.8 inch, at least 0.9 inch, at least 1 inch, at least 1.5 inch, at least 2 inches, at least 2.5 inches, at least 3 inches, at least 3.5 inches, at least 4 inches, or at least 4.5 inches). In some embodiments, the fracture portion has a length of 5 inches or less from one side of the fracture portion across to the other side of the fracture portion (e.g., 4.5 inches or less, 4 inches or less, 3.5 inches or less, 3 inches or less, 2.5 inches or less, 2 inches or less, 1.5 inches or less, 1 inch or less, 0.9 inch or less, 0.8 inch or less, 0.7 inch or less, 0.6 inch or less, 0.5 inch or less, 0.4 inch or less, or 0.3 inch or less). The length of the fracture portion can range from any of the minimum values described above to any of the maximum values described above. For example, in some embodiments, the length of the fracture portion from one side of the fracture portion across to the other side of the fracture portion can be of from 0.2 inch to 5 inches (e.g., of from 0.2 inch to 1 inch, of from 0.2 inch to 2 inches, or of from 0.2 inch to 3 inches). In one embodiment, the fracture portion has a length of about 1.9635 inches.

The fracture portion includes at least one passageway within the fracture portion to allow the fluid, the proppant, or any combination thereof to flow through the fracture portion and exit the apparatus. Alternatively, the fluid, the proppant, or any combination thereof to flow through the fracture portion to another coupling portion then to another opening portion and then exit the apparatus. The fluid, the proppant, or any combination thereof that exits the apparatus may be collected in a container, for example, to compare the quantity that was injected in the apparatus compared to the quantity that exited the apparatus.

The fracture portion includes an inner surface and an outer surface, and the size of the at least one passageway may depend on the inner surface of the fracture portion. In one embodiment, at least a portion of the inner surface of the fracture portion may be smooth. In one embodiment, at least a portion of the inner surface of the fracture portion may include an obstruction to represent the formation. The obstruction may include roughness on the inner surface, unconformity on the inner surface, unconformity on the inner surface, layering on the inner surface, etc. As the fluid, the proppant, or any combination thereof will be passing through the passageway of the fracture portion, the outer surface of the fracture portion may be smooth.

The area of the passageway of the fracture portion may vary. In some embodiments, the fracture portion has an area of at least 0.01 inch2 (e.g., at least 0.03 inch2, at least 0.10 inch2, at least 0.20 inch2, or at least 1 inch2). In some embodiments, the passageway has an area of 5 inches2 or less (e.g., 4 inches2 or less, 3 inches2 or less, 1 inches2 or less, or 0.1 inch or less). The area of the passageway can range from any of the minimum values described above to any of the maximum values described above. For example, in some embodiments, the area of the passageway can be of from 0.01 inch2 to 5 inches2 (e.g., of from 0.01 inch2 to 1 inche2 or 0.01 inch2 to 3 inches2). In one embodiment, the passageway of the fracture portion has an area of about 0.19635 inch2.

Returning to FIG. 47A, this figure illustrates one embodiment of the wellbore to fracture connectivity apparatus 4730 to represent the near wellbore environment 4790. The apparatus 4730 has a fracture portion 4765 with an inlet 4770 and an outlet 4775. The fracture portion 4765 has a rectangular shape from the inlet 4770 of the fracture portion 4765 through the outlet 4775 of the fracture portion 4765. The dot pattern of the fracture portion 4765 and a fracture 4798 in the formation 4799 of the near wellbore environment 4790 illustrates that the fracture portion 4765 represents the fracture 4798. In FIG. 47A, the inner width, the height, and the length the fracture portion 4765 may be values provided hereinabove.

The fracture portion 4765 includes an inner surface 4766 and an outer surface 4767. For simplicity, in FIG. 47A, the inner surface 4766 and the outer surface 4767 are essentially smooth from the inlet 4770 of the fracture portion 4765 to the outlet 4775 of the fracture portion 4765, and a passageway 4761 allows the fluid, the proppant, or any combination thereof to flow through the fracture portion 4765 to a second coupling portion 4750 and then to a second opening portion 4735 of the apparatus 4730. However, the inner surface 4766 may substantially replicate the fracture 4798 in the formation 4799 of the near wellbore environment 4790. For example, the inner surface 4766 may include an obstruction, such as roughness, unconformity, or layering depending on the desired analysis. The inner surface 4766 may include an obstruction from the inlet 4766 of the fracture portion 4765 to the outlet 4775 of the fracture portion 4765. If the fracture portion 4765 includes an obstruction, the obstruction may be similar or different from an obstruction in the coupling portion 4750 depending on the analysis. Those of ordinary skill in the art may appreciate that fracture portion 4765 may be utilized to analyze many sorts of scenarios such as those of the near wellbore environment 4790, what if scenarios, etc.

Figure 47G:
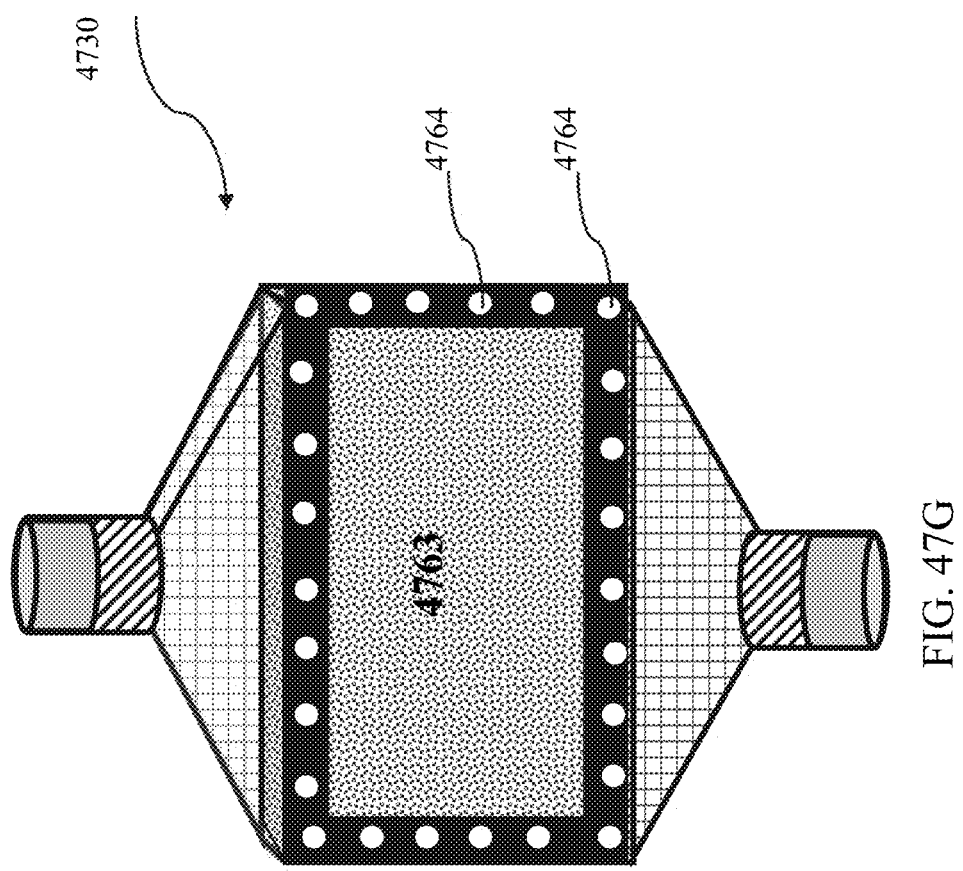
FIG. 47G illustrates one embodiment of the fracture portion of the wellbore to fracture connectivity apparatus of FIG. 47A.
Figure 47H:
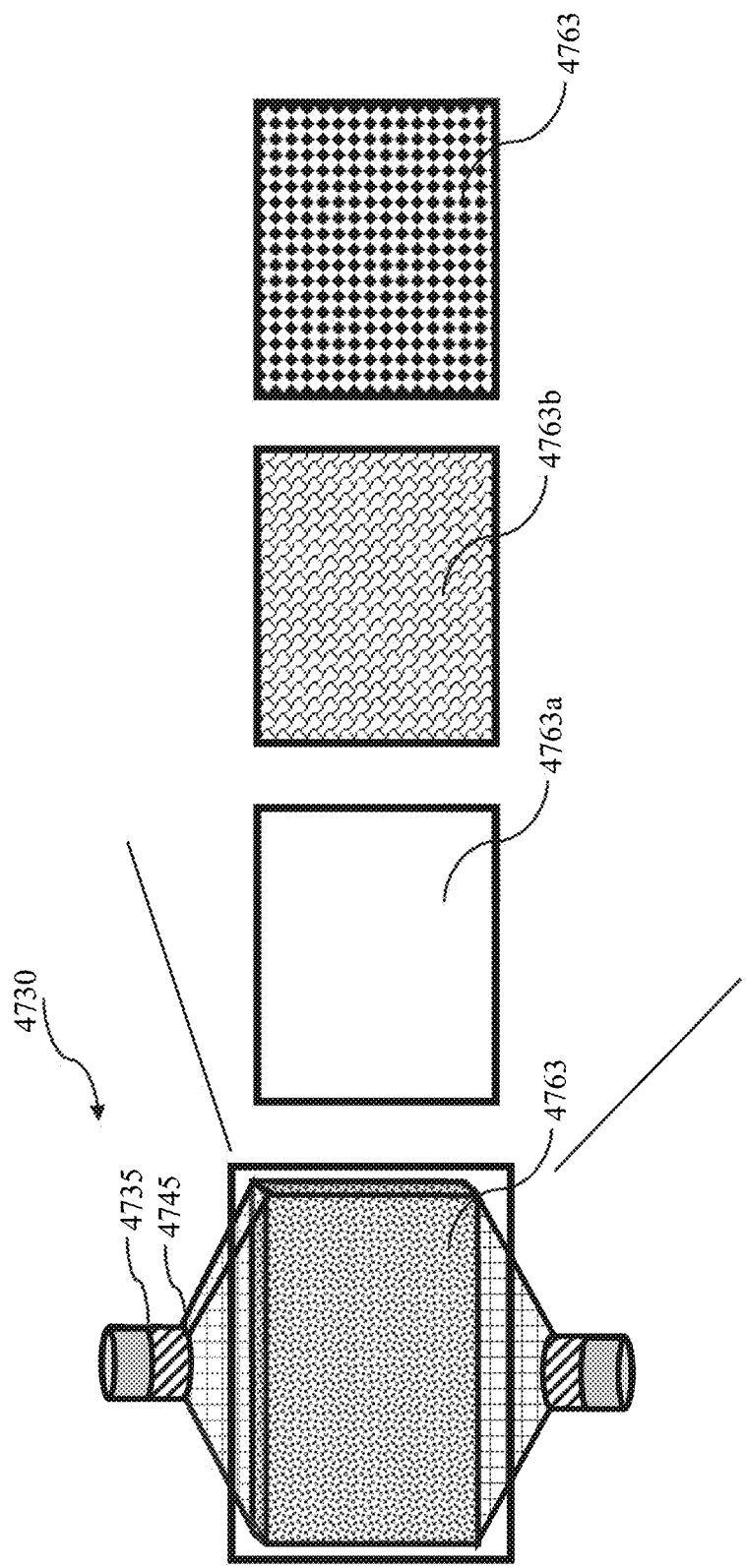
FIG. 47H illustrates various embodiments of the fracture portion of the wellbore to fracture connectivity apparatus of FIG. 47A.

Optionally, as illustrated in FIGS. 47A and 47G the fracture portion 4765 may include at least one removable panel, such as a panel 4763, to facilitate cleaning of the interior of the fracture portion 4765. At least one screw, nut and bolt, or other connector 4764 may be utilized for removing and securing the panel 4763. Furthermore, the fracture portion 4765 may include at least one transparent panel to facilitate viewing of the interior of the fracture portion 4765. The panel 4763 may be removable and transparent. FIG. 47H illustrates various non-limiting embodiments of the inner surface of the panel 4763, for example, to simulate different fracture roughness. The inner surface of the panel 4763a is smooth. The inner surface of the panel 4763b has roughness. The inner surface of the panel 4763c has a different type of roughness compared to the panel 4763c. Although illustrated in the context of the panel 4763, the inner surface of the other panel (not shown) that is located opposite of the panel 4763 may be similar or different than the panel 4763. FIGS. 47D and 47E illustrate alternative shapes for the fracture portion illustrated as 4765a and 4765b, respectively.

Figure 47I:
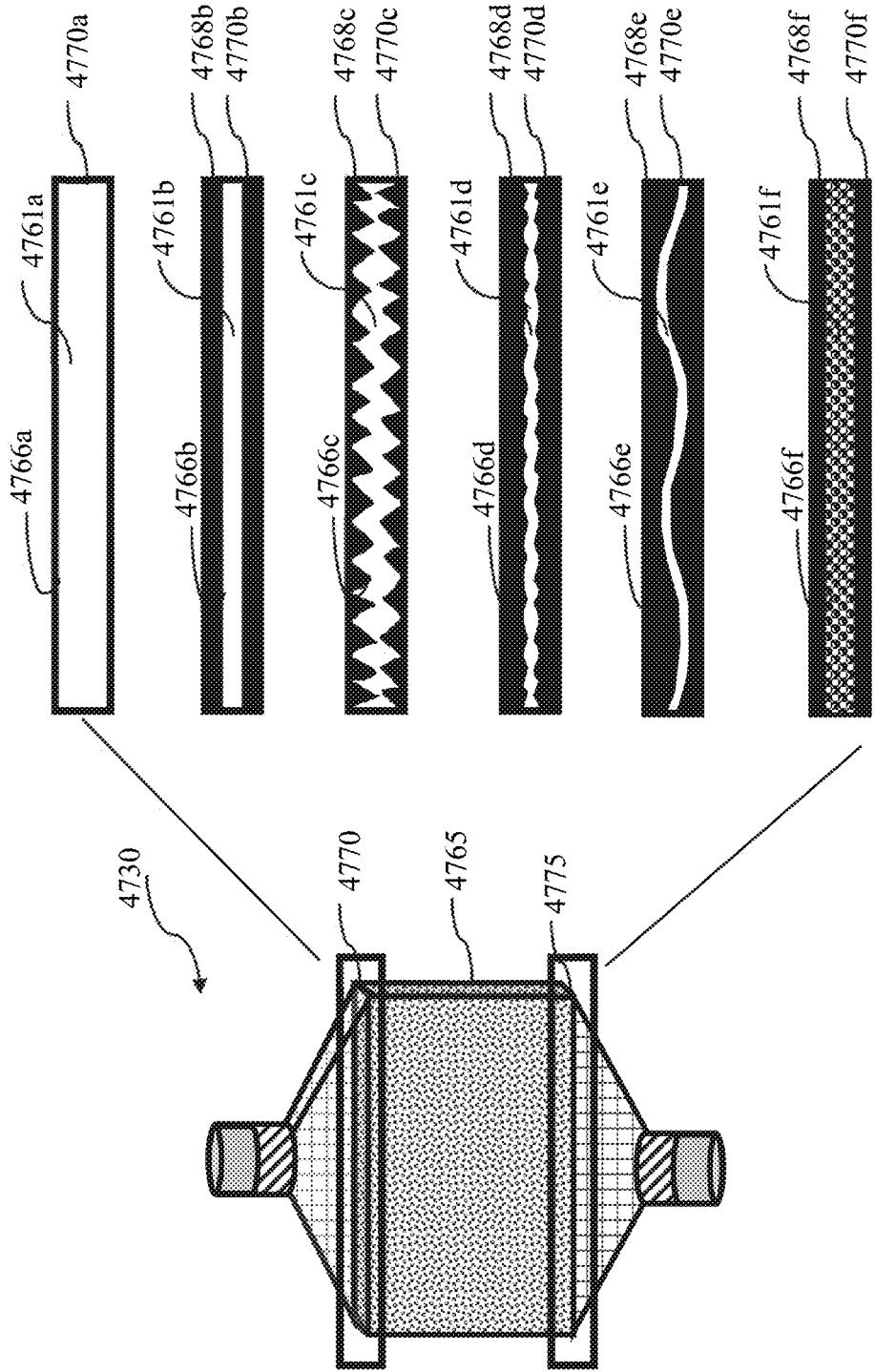
FIG. 47I illustrates various embodiments of the fracture portion of the wellbore to fracture connectivity apparatus of FIG. 47A.

FIG. 47I illustrates various non-limiting embodiments of the inlet 4770 of the fracture portion 4765 from a top view perspective. The inlet 4770a has a rectangular shape, an inner surface 4766a that is smooth, and a passageway 4761a. The inlet 4770b has a rectangular shape, an inner surface 4766b that includes an obstruction 4768b (e.g., roughness, unconformity, or layering), and a passageway 4761b that is smaller than the passageway 4761a due to the obstruction 4768b. The inlet 4770c has a rectangular shape, an inner surface 4766c that includes an obstruction 4768c, and a passageway 4761c that is smaller than the passageway 4761a due to the obstruction 4768c. The inlet 4740d has a rectangular shape, an inner surface 4766d that includes an obstruction 4768d, and a passageway 4731d that is smaller than the passageway 4761a due to the obstruction 4768d. The inlet 4770e has a rectangular shape, an inner surface 4766e that includes an obstruction 4768e, and a passageway 4761e that is smaller than the passageway 4761a due to the obstruction 4768e. The outlet 4775 may be the same or different than the inlet 4770 depending on the embodiment.

The obstruction may be present from the inlet to the outlet of the fracture portion in some embodiments.

Figure 47J:
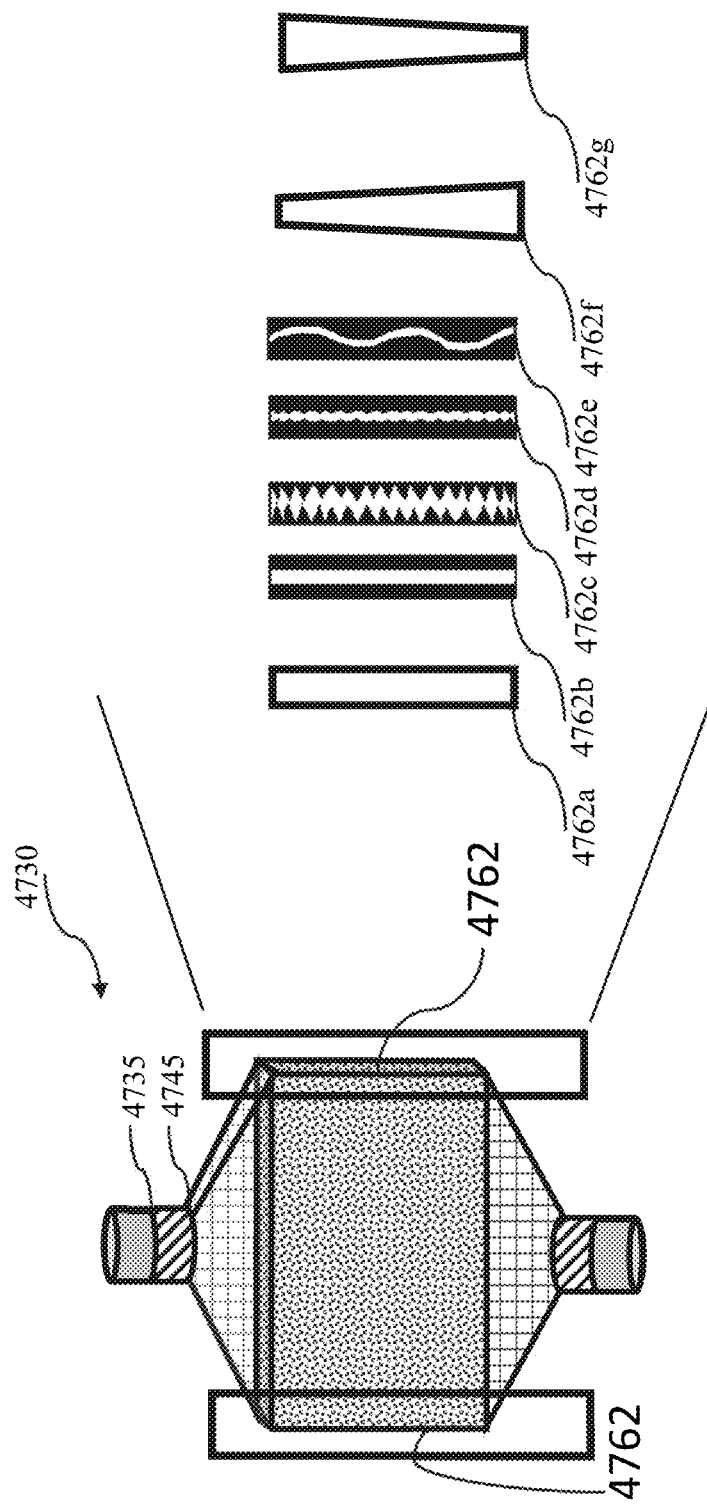
FIG. 47J illustrates various embodiments of the fracture portion of the wellbore to fracture connectivity apparatus of FIG. 47A.

FIG. 47J illustrates various non-limiting embodiments of the side panel 4762 of the fracture portion 4765 from a side view perspective. The panel 4762a has an inner width that is substantially the same throughout the panel 4762a, but the panels 4762f and 4762g illustrate that the width inner with may change. The panels 4762a, 4762f, and 4762g have inner surfaces that are smooth. In the other hand, the panels 4762b, 4762c, 4762d, and 4762e have rectangular shapes and their inner surfaces include various obstructions shown in black that reduce the passageways as compared to the passageways of panels 4762a, 4762f, and 4762g. One of ordinary skill in the art will appreciate that the various embodiments of the apparatus highlight the flexibility of the apparatus, for example, the panels 4762 may have roughness that may be the same or different than the roughness of the panels 4763 in FIG. 47H.

Figure 47L:
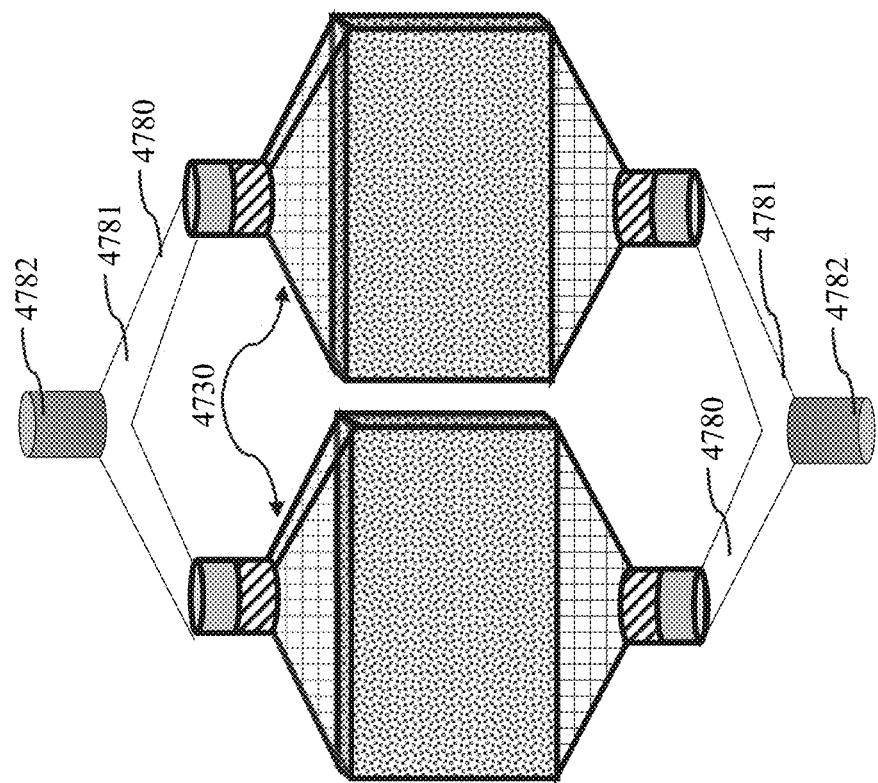
FIG. 47L illustrates another embodiment of a plurality of the wellbore to fracture connectivity apparatus of FIG. 47A that are coupled together.
Figure 47K:
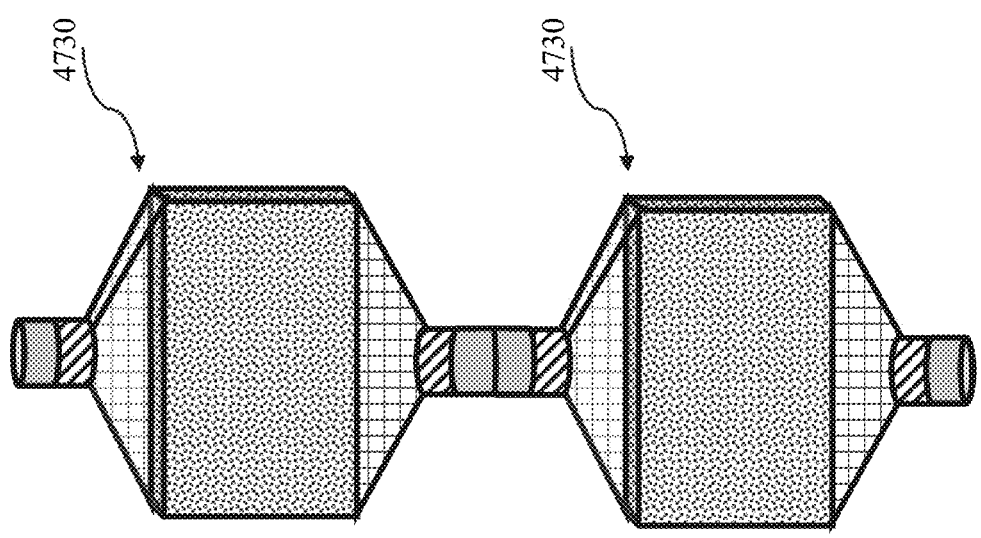
FIG. 47K illustrates one embodiment of a plurality of the wellbore to fracture connectivity apparatus of FIG. 47A that are coupled together.

FIGS. 47K and 47L illustrate that a plurality of the apparatus 4730 may be coupled together. FIG. 47K illustrates that two apparatuses 4730 may be coupled together, for example, screwed together. Alternatively, the two apparatuses 4730 may be manufactured as a single integral apparatus, for example, using 3D printing. In some embodiments, one or more of the dimensions may be different between the plurality of coupled apparatuses 4730. For example, the fracture portion of the bottom apparatus 4730 may be smaller than the fracture portion in the top apparatus 4730 to represent a larger fracture in the top apparatus 4730 and a represent a smaller fracture in the bottom apparatus 4730. FIG. 47K illustrates one embodiment of coupling a plurality of the apparatus in series.

FIG. 47L illustrates that a plurality of the apparatus 4730 may be coupled via a coupling apparatus, such as a coupling apparatus 4780. For example, the coupling apparatus may include tubing, such as tubing 4781, and inlet 4782. The fluid, the proppant, or any combination thereof flows into the inlet 4782, flows into the tubing 4781, and flows into the two apparatuses. The components illustrated in FIG. 47L may be created as an integral piece, for example, by 3D printing. Alternatively, the components illustrated in FIG. 47L may be separate pieces that are coupled together, for example, by screwing or other connectors. FIG. 47L illustrates one embodiment of coupling a plurality of the apparatus in parallel.

Figure 47M:
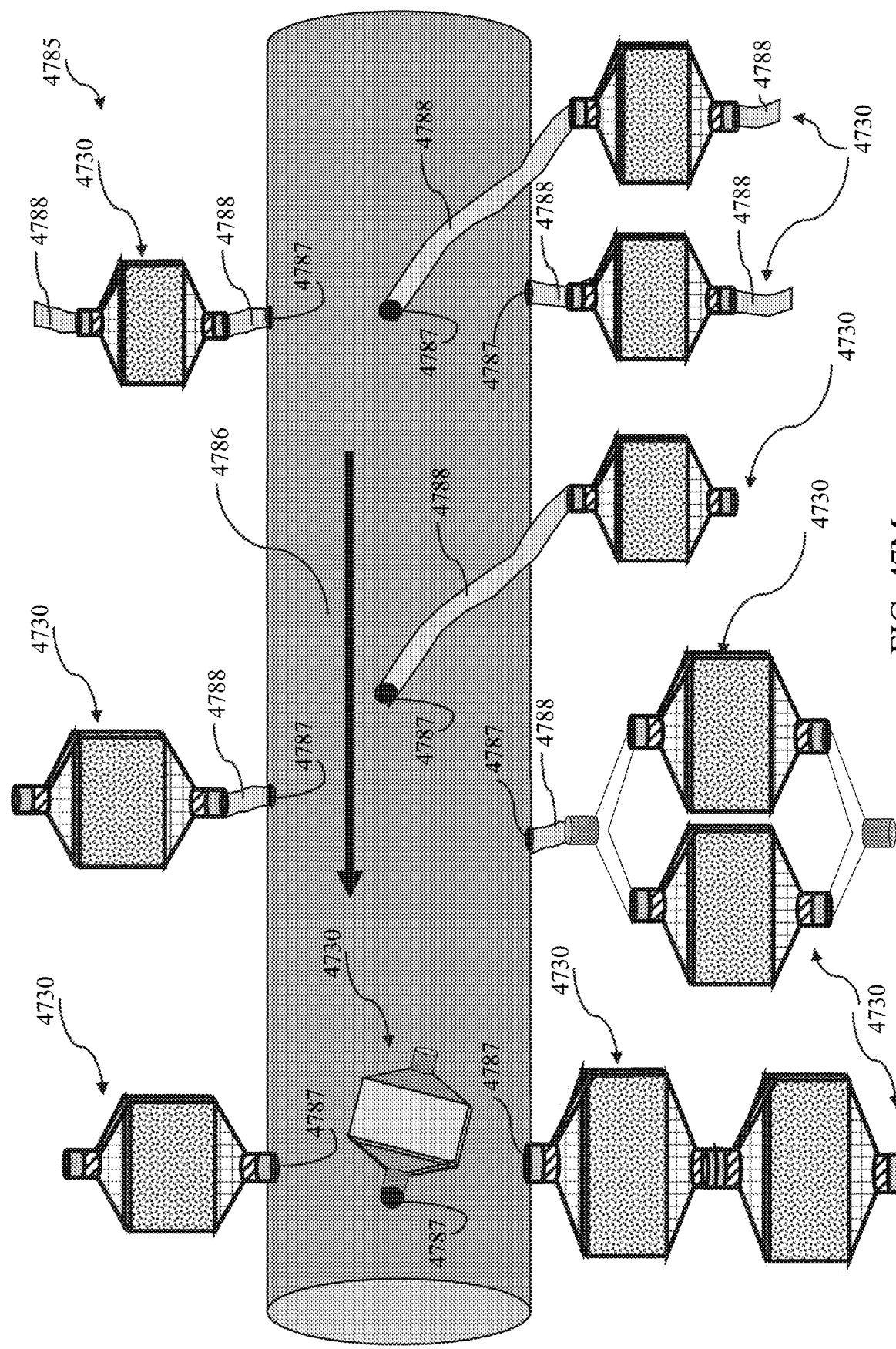
FIG. 47M illustrates one embodiment of a system that includes at least one of the wellbore to fracture connectivity apparatus of FIG. 47A coupled to a wellbore portion.

FIG. 47M illustrates one embodiment of a system comprising at least one wellbore to fracture connectivity, illustrated as a system 4785. The system 4785 includes a wellbore portion 4786 to represent a part of a wellbore. For example, the wellbore portion 4786 may be made of substantially the same material as the wellbore. The wellbore portion 4786 includes at least one opening 4787, such as a perforation, opening in a sleeve, opening in a liner, etc.), and the apparatus 4730 may be coupled directly or indirectly at each desired opening 4787. The apparatus 4730 may be coupled indirectly to the opening 4787 of the wellbore portion 4786 using a tubing, such as tubing 4788. The tubing 4788 may be similar to the tubing 4781 of FIG. 47N. The tubing 4788 and the tubing 4781 of FIG. 47N may be practically any tubing utilized for transporting the fluid, the proppant, or any combination thereof. The area of the passageway of the tubing/flow line is substantially the same as the area of the passageway of the opening portion in some embodiments.

In operation, the fluid, the proppant, or any combination thereof, such as a proppant slurry, may flow through the wellbore portion 4786 (as illustrated in the arrow in FIG. 47M) and then flows through at least one opening 4787 and into the coupled apparatus 4730 and out of the coupled apparatus 4730. For example, the flow rate of the proppant slurry that exits a particular coupled apparatus 4730, as well as the quantity of proppant and quantity of fluid that exit out of the particular apparatus 4730, may be determined and utilized to analyze the wellbore to fracture connectivity and plugging for those conditions. Flow meters, scales, and other conventional laboratory equipment may be utilized for the analysis.

Figure 47N:
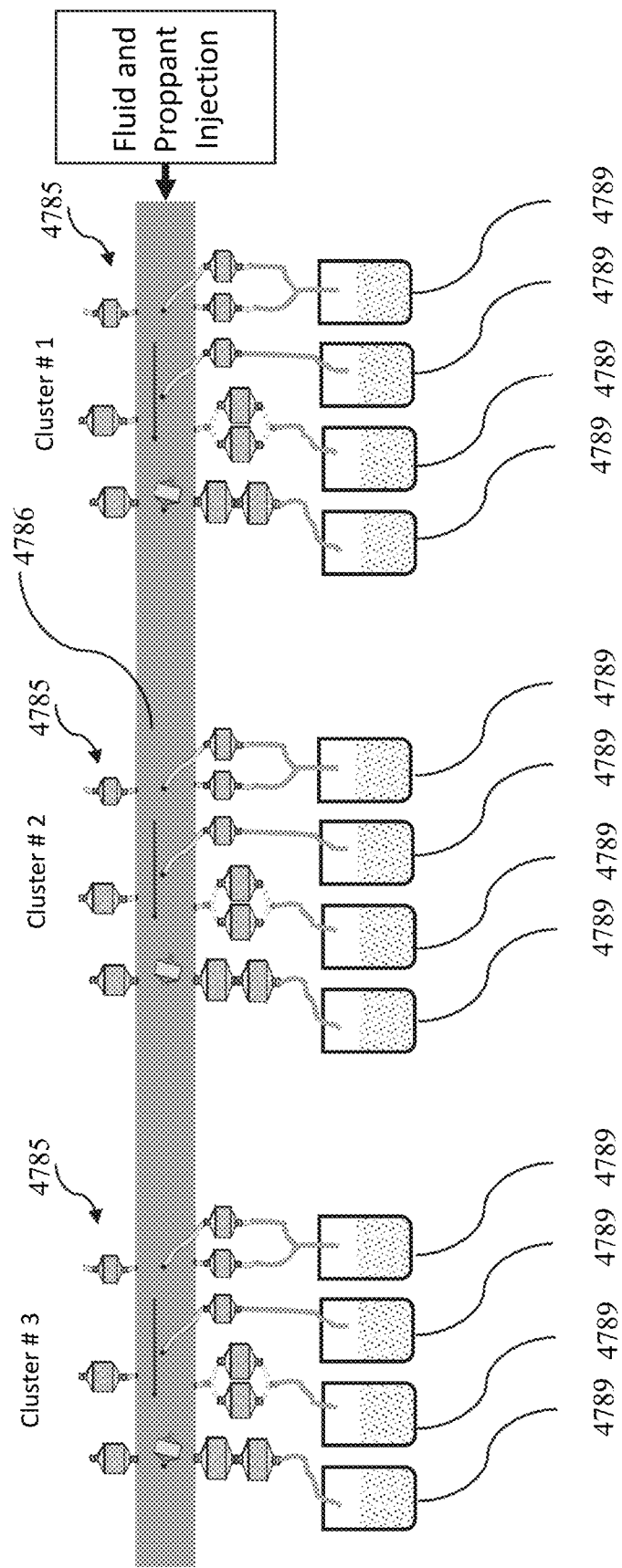
FIG. 47N illustrates a more detailed view of the system of FIG. 47M.

Turning more specifically to FIG. 47N, this setup represents a subsurface wellbore configuration with single or multiple perforation clusters during a hydraulic fracturing operation. The fluid and proppant slurry is pre-mixed or mixed on-the-fly and is being injected together into the wellbore in the direction shown by the arrows (from heel of the wellbore to toe of the wellbore). The fluid and proppant exit from the wellbore through at least one perforation opening and at least one perforation cluster representing fluid and proppant entry in fracture, to generate and extend the fracture through at least one perforation opening and at least one perforation cluster.

In each cluster, the perforation opening design can be the same or different, can be placed at the same or different location (circumference), and can have the same or different number or size.

The quantity of fluid and proppant exiting through each wellbore to fracture connectivity apparatus as well as resulted plugging (partial or complete plugging) may be measured and quantified, using flow measurement apparatus, or differential pressure measurement, or volume and weight measurement of collected fluid and proppant, or any combination thereof. FIG. 47N illustrates three clusters of the system 4785. Various receptacles 4789 are illustrated for collecting the fluid, the proppant, or any combination thereof that exit the corresponding apparatus.

Figure 48:
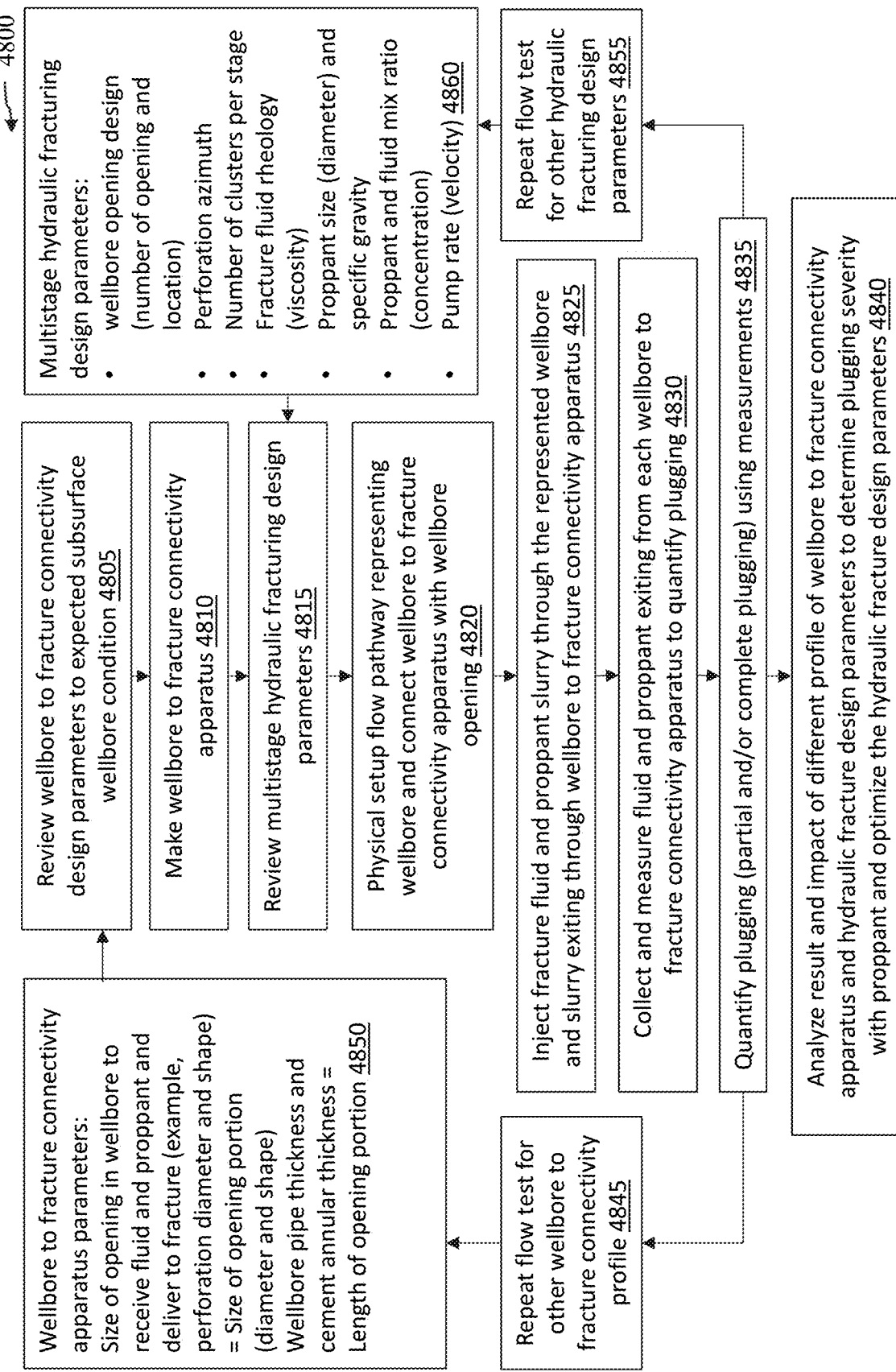
FIG. 48 is a flowchart of one embodiment of a method of using the wellbore to fracture connectivity apparatus of FIG. 47A.

FIG. 48 illustrates one embodiment of a process, such as a process 4800, for using a wellbore to fracture connectivity apparatus, such as using the setup illustrated in FIG. 47N. To study the impact of wellbore to fracture connectivity profile and multistage hydraulic fracture design parameters on plugging severity (partial or complete plugging) with proppant, laboratory testing may be conducted. Of note, if a new wellbore to fracture apparatus is to be made (e.g., via 3D printing), the method 4800 may proceed with 4805 and 4810. If a wellbore to fracture apparatus was previously made, then the method 4800 may proceed with 4815.

At 4805, the method 4800 includes: Review and define the wellbore to fracture connectivity design parameters for given and expected subsurface wellbore condition and completion design parameters such as size of opening perforation, thickness and size of casing, size of open hole and cement thickness, perforation gun charge and expected perforation penetrated depth, diameter and shape, expected fracture width and complexity for selected fracture fluid type and formation rock properties (geomechanical parameter and heterogeneity, etc.).

At 4810, the method 4800 includes: Manufacture or make the wellbore to fracture connectivity apparatus as per defined design specification at 4805.

The wellbore portion, such as 4786 in FIG. 47N, may be made using 4815 and 4820. At 4815, the method 4800 includes: Review and define multistage hydraulic fracture design parameters for given, planned and expected subsurface wellbore condition and completion design parameters such as wellbore opening design (number of opening and location), Perforation location along circumference (azimuth), Number of clusters per stage, Fracture fluid rheology (viscosity), Proppant size (diameter) and specific gravity, Proppant and fluid mix ratio (concentration), Pump rate (velocity), fluid and proppant exit rate through at least one perforation opening and fluid and at least one perforation cluster. In a laboratory setting, decisions may be made about the wellbore portion such as selection of a steel pipe, plastic pipe, a transparent pipe to facilitate visual confirmation of plugging, etc., as well as decisions about scaling down. The type of fluid, the type of proppant, concentration, etc. may also be selected.

At 4820, the method 4800 includes: Prepare suitable and representative physical laboratory setup of wellbore, completion design (number and location of perforation opening and perforation cluster), and connect wellbore to fracture connectivity apparatus directly or indirectly with wellbore opening. The user may create the openings in the transparent pipe with a drill or other tool in manner consistent with 4815, for example, drill openings in the desired location (azimuth), drill the desired number of holes, sizes of holes, etc. At least one wellbore to fracture connectivity apparatus may be physically coupled to the wellbore portion, tubing/flow lines may be physically added, a pump may be physically added for the upcoming injection, a tank may be physically added for providing the fluid and proppant, etc.

At 4825, the method 4800 includes: Inject fracture fluid and proppant slurry (pre-mixed or mixed on-the-fly) as per hydraulic fracture design parameters through the represented wellbore portion with the slurry exiting through the wellbore to fracture connectivity apparatus for test period of at least 1 minute and as long as field pumping time (estimated 2 hours). For example, the slurry may be injected into the wellbore portion and into each coupled wellbore to fracture connectivity apparatus.

At 4830, the method 4800 includes: Collect and measure the quantity of fluid and proppant exiting through each wellbore to fracture connectivity apparatus as well as resulted plugging (partial or complete plugging) using flow measurement apparatus, differential pressure measurement, or volume and weight measurement of collected fluid and proppant, or any combination thereof. For example, the fluid and proppant exiting each coupled wellbore to fracture connectivity apparatus may be collected and measured to generate measurement data. Each coupled apparatus may include a flow meter to measure flow rate. Each coupled apparatus may include a pressure gauge or pressure transducer at the inlet of the coupled apparatus and another at the outlet of the apparatus to determine a differential pressure. Volume and weight of the fluid and proppant exiting each coupled apparatus may be determined using scales, etc.

At 4835, the method 4800 includes: Quantify plugging (partial or complete plugging) for the wellbore to fracture connectivity design and parameters (as defined in 4805) and multistage hydraulic fracture design and parameters (as defined in 4815). Plugging may be quantified for each coupled apparatus via a decrease in the flow rate that indicates plugging, an increase in differential pressure that indicates plugging, lower quantity of proppant as compared to fluid volume indicates plugging, etc. Thus, plugging may be quantified using the flow rate, ratio, pressure, quantity of exiting fluid and proppant, etc.

For example, if the flow rate was X, then there's a decrease in flow rate in apparatus1, and then there's an additional decrease in apparatus2, etc., then this suggests partial plugging that is quantifiable via the changes in flow rate. There is complete plugging if the flow rate is about 0.

As another example, if there is a zero pressure differential, and then there's a 1 psi increase in apparatus1, and then there's a 2 psi increase in apparatus 2, etc. then this suggests at least partial plugging that is quantifiable via the changes in differential pressure. Quantifying plugging may include performing relative comparisons across different apparatuses, different locations, etc. including even comparisons with base cases without proppant.

All of the steps 4805 to 4835 can be repeated for different wellbore to fracture connectivity design and parameters (as defined in 4805) and different multistage hydraulic fracture design and parameters (as defined in 4815).

At 4840, the method 4800 includes: Analyze result and impact of different wellbore to fracture connectivity apparatus design and parameters (as defined in 4805) and different multistage hydraulic fracture design and parameters (as defined in 4815) to determine which hydraulic fracture design parameter(s) to alter to reduce plugging, which may be referred to as optimizing the hydraulic fracture design parameters. The hydraulic fracture design parameter(s) alteration may then be implemented in a hydraulic fracture operation. For example, plugging data for a particular wellbore to fracture apparatus may be compared to a base case having the same fluid but no proppant, and based on this comparison, decisions may be made to change the proppant, change the location (azimuth) of the opening, change the fluid, etc. to reduce plugging.

As another example, it may be identified that slickwater with 14 clusters per stage with a perforation inner diameter of 0.25 inch and proppant of 30-50 mesh size is causing plugging in the openings located at the bottom of the wellbore portion. Moreover, it may be identified that the plugging starts occurring after 10 clusters so only the last 4 clusters start showing the plugging. The decision may be made to use 10 clusters instead of 14 clusters or avoid the perforations at the bottom location.

If testing is run again with 100 mesh proppant and plugging is not identified in those 4 clusters with bottom perforations, then the decision may be made to switch to the 100 mesh proppant instead of the 30-50 mesh.

If testing didn't reveal plugging with the perforation of inner diameter 0.35, then the decision may be made to switch to 0.25 inch.

In some embodiments, the system further comprises at least one other wellbore to fracture connectivity apparatus coupled to at least one other opening of the wellbore portion; and further comprising varying design parameters of the wellbore to fracture connectivity apparatus, varying design parameters of the at least one other wellbore to fracture connectivity apparatus, varying hydraulic fracturing design parameters of the wellbore portion, or any combination thereof while repeating the steps of injecting, collecting, measuring, and quantifying. The embodiment may further include comparing the plugging data of the wellbore to fracture connectivity apparatus and the at least one other apparatus to determine impact of different profiles of wellbore to fracture connectivity apparatuses and hydraulic fracture design parameters to determine which hydraulic fracture design parameter to alter to reduce plugging. The embodiment may further include altering the hydraulic fracture design parameter in a hydraulic fracture operation. On the other hand, another embodiment includes varying design parameters of the wellbore to fracture connectivity apparatus, varying hydraulic fracturing design parameters of the wellbore portion, or any combination thereof while repeating the steps of injecting, collecting, measuring, and quantifying.

From 4835, the method 4800 may proceed to 4855, then to 4860, and then to 4815. At 4855, the method 4800 includes: Repeat flow test for other hydraulic fracturing design parameters. At 4860, multistage hydraulic fracturing design parameters: wellbore opening design (number of opening and location), Perforation azimuth, Number of clusters per stage, Fracture fluid rheology (viscosity), Proppant size (diameter) and specific gravity, Proppant and fluid mix ratio (concentration), Pump rate (velocity), or any combination thereof.

From 4835, the method 4800 may proceed to 4845, then to 4850, and then to 4805. At 4855, the method 4800 includes: Repeat flow test for other wellbore to fracture connectivity profile. At 4850, Wellbore to fracture connectivity apparatus parameters: Size of opening in wellbore to receive fluid and proppant and deliver to fracture (example, perforation diameter and shape)=Size of opening portion (diameter and shape); Wellbore pipe thickness and cement annular thickness=Length of opening portion; or any combination thereof.

Those of ordinary skill in the art will appreciate that various other embodiments are possible and the claims are not limited to the embodiments provided herein. Modifications may be made to an embodiment provided herein. For example, the term couple may include an integral scenario in which the opening portion, the coupling portion, and the fracture portion (and optional a second coupling portion and a second opening portion) form an integral three dimensional wellbore to fracture connectivity apparatus (e.g., the entire apparatus with all the portions is 3D printed as a single piece) as discussed hereinabove. Alternatively, the term couple may include screwing or using connectors to join physically separate portions together. Furthermore, the term "couple", "coupled", and the like may include fluidically coupled as the fluid, the proppant, or any combination thereof flows through the apparatus from portion to portion.

Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

The invention claimed is:

1. A wellbore to fracture connectivity apparatus comprising an opening portion, a coupling portion, and a fracture portion, the apparatus comprising:
   the opening portion representing an opening in a wellbore, wherein the opening portion is configured to receive fluid, proppant, or any combination thereof, and wherein the opening portion comprises at least one passageway within the opening portion for the fluid, the proppant, or any combination thereof to flow through the opening portion to the coupling portion;
   the coupling portion representing wellbore to fracture connectivity, wherein the coupling portion couples the opening portion and the fracture portion, and wherein the coupling portion is configured to receive the fluid, the proppant, or any combination thereof from the opening portion, and wherein the coupling portion comprises at least one passageway within the coupling portion for the fluid, the proppant, or any combination thereof to flow through the coupling portion to the fracture portion; and
   the fracture portion representing at least one fracture in a formation, wherein the fracture portion is configured to receive the fluid, the proppant, or any combination thereof from the coupling portion, and wherein the fracture portion comprises at least one passageway within the fracture portion for the fluid, the proppant, or any combination thereof to flow through the fracture portion.

2. The apparatus of claim 1, wherein the opening in the wellbore is a perforation, an opening in a sleeve, or an opening in a liner.

3. The apparatus of claim 1, wherein the opening in the wellbore is a perforation, and wherein the opening portion represents the perforation within casing of the wellbore, the perforation within the cement of the wellbore, or any combination thereof.

4. The apparatus of claim 1, wherein the opening in the wellbore is a perforation, and wherein the coupling portion represents the perforation within the formation.

5. The apparatus of claim 1, wherein the opening portion, the coupling portion, the fracture portion, or any combination thereof comprises an obstruction.

6. The apparatus of claim 1, wherein the opening portion, the coupling portion, and the fracture portion form an integral three dimensional wellbore to fracture connectivity apparatus.

7. The apparatus of claim 1, wherein three dimensional printing is utilized to make the apparatus of claim 1.

8. The apparatus of claim 1, further comprising at least one other wellbore to fracture connectivity apparatus coupled to the apparatus in series or in parallel.

9. The apparatus of claim 1, further comprising:
   a second opening portion representing a second opening in the wellbore, wherein the second opening portion is configured to receive the fluid, the proppant, or any combination thereof, and wherein the second opening portion comprises at least one passageway within the second opening portion for the fluid, the proppant, or any combination thereof to flow through the second opening portion and exit the wellbore to fracture connectivity apparatus; and
   a second coupling portion representing wellbore to fracture connectivity, wherein the second coupling portion couples the second opening portion and the fracture portion, and wherein the second coupling portion is configured to receive the fluid, the proppant, or any combination thereof from the fracture portion, and wherein the second coupling portion comprises at least one passageway within the second coupling portion for the fluid, the proppant, or any combination thereof to flow through the second coupling portion to the second opening portion.

10. The apparatus of claim 1, further comprising the fluid, the proppant, or any combination thereof to flow through the apparatus.

11. A system comprising:
a wellbore to fracture connectivity apparatus comprising an opening portion, a coupling portion, and a fracture portion, the apparatus comprising:
the opening portion representing an opening in a wellbore, wherein the opening portion is configured to receive fluid, proppant, or any combination thereof, and wherein the opening portion comprises at least one passageway within the opening portion for the fluid, the proppant, or any combination thereof to flow through the opening portion to the coupling portion;
the coupling portion representing wellbore to fracture connectivity, wherein the coupling portion couples the opening portion and the fracture portion, and wherein the coupling portion is configured to receive the fluid, the proppant, or any combination thereof from the opening portion, and wherein the coupling portion comprises at least one passageway within the coupling portion for the fluid, the proppant, or any combination thereof to flow through the coupling portion to the fracture portion; and
the fracture portion representing at least one fracture in a formation, wherein the fracture portion is configured to receive the fluid, the proppant, or any combination thereof from the coupling portion, and wherein the fracture portion comprises at least one passageway within the fracture portion for the fluid, the proppant, or any combination thereof to flow through the fracture portion; and
a wellbore portion coupled to the wellbore to fracture connectivity apparatus for providing the fluid, the proppant, or any combination thereof to the wellbore to fracture connectivity apparatus, wherein the wellbore portion represents the wellbore and the wellbore to fracture connectivity apparatus is coupled to an opening of the wellbore portion.

12. The system of claim 11, further comprising at least one other wellbore to fracture connectivity apparatus coupled to at least one other opening of the wellbore portion.

13. The system of claim 11, further comprising at least one other wellbore to fracture connectivity apparatus coupled to the wellbore to fracture connectivity apparatus in series or in parallel.

14. The system of claim 11, wherein the wellbore to fracture connectivity apparatus further comprises:
a second opening portion representing a second opening in the wellbore, wherein the second opening portion is configured to receive the fluid, the proppant, or any combination thereof, and wherein the second opening portion comprises at least one passageway within the second opening portion for the fluid, the proppant, or any combination thereof to flow through the second opening portion and exit the wellbore to fracture connectivity apparatus; and
a second coupling portion representing wellbore to fracture connectivity, wherein the second coupling portion couples the second opening portion and the fracture portion, and wherein the second coupling portion is configured to receive the fluid, the proppant, or any combination thereof from the fracture portion, and wherein the second coupling portion comprises at least one passageway within the second coupling portion for the fluid, the proppant, or any combination thereof to flow through the second coupling portion to the second opening portion.

15. The system of claim 11, further comprising the fluid, the proppant, or any combination thereof to flow through the wellbore portion to the wellbore to fracture connectivity apparatus.

16. A process comprising:
providing a system comprising:
(a) a wellbore to fracture connectivity apparatus comprising:
the opening portion representing an opening in a wellbore, wherein the opening portion is configured to receive fluid, proppant, or any combination thereof, and wherein the opening portion comprises at least one passageway within the opening portion for the fluid, the proppant, or any combination thereof to flow through the opening portion to the coupling portion;
the coupling portion representing wellbore to fracture connectivity, wherein the coupling portion couples the opening portion and the fracture portion, and wherein the coupling portion is configured to receive the fluid, the proppant, or any combination thereof from the opening portion, and wherein the coupling portion comprises at least one passageway within the coupling portion for the fluid, the proppant, or any combination thereof to flow through the coupling portion to the fracture portion; and
the fracture portion representing at least one fracture in a formation, wherein the fracture portion is configured to receive the fluid, the proppant, or any combination thereof from the coupling portion, and wherein the fracture portion comprises at least one passageway within the fracture portion for the fluid, the proppant, or any combination thereof to flow through the fracture portion; and
(b) a wellbore portion coupled to the wellbore to fracture connectivity apparatus for providing the fluid, the proppant, or any combination thereof to the wellbore to fracture connectivity apparatus, wherein the wellbore portion represents the wellbore and the wellbore to fracture connectivity apparatus is coupled to an opening of the wellbore portion;
injecting the fluid, the proppant, or any combination thereof through the wellbore portion and the wellbore to fracture connectivity apparatus;
collecting and measuring the fluid, the proppant, or any combination thereof exiting the wellbore to fracture connectivity apparatus; and
quantifying plugging of the wellbore to fracture connectivity apparatus using the measurements to generate plugging data for the wellbore to fracture connectivity apparatus.

17. The process of claim 16, further comprising varying design parameters of the wellbore to fracture connectivity apparatus, varying hydraulic fracturing design parameters of the wellbore portion, or any combination thereof while repeating the steps of injecting, collecting, measuring, and quantifying.

18. The process of claim 16, wherein the system further comprises at least one other wellbore to fracture connectivity apparatus coupled to at least one other opening of the wellbore portion; and further comprising varying design parameters of the wellbore to fracture connectivity apparatus, varying design parameters of the at least one other wellbore to fracture connectivity apparatus, varying hydraulic fracturing design parameters of the wellbore portion, or any combination thereof while repeating the steps of injecting, collecting, measuring, and quantifying.

19. The process of claim 18, further comprising comparing the plugging data of the wellbore to fracture connectivity apparatus and the at least one other apparatus to determine impact of different profiles of wellbore to fracture connectivity apparatuses and hydraulic fracture design parameters to determine which hydraulic fracture design parameter to alter to reduce plugging.

20. The process of claim 19, further comprising altering the hydraulic fracture design parameter in a hydraulic fracture operation.

* * * * *